United States Patent
Stewart

(10) Patent No.: US 10,521,092 B2
(45) Date of Patent: Dec. 31, 2019

(54) METHODS AND DEVICES FOR ADJUSTING CHART MAGNIFICATION ASYMMETRICALLY

(71) Applicant: Tableau Software Inc., Seattle, WA (US)

(72) Inventor: Robin Stewart, Washington, DC (US)

(73) Assignee: Tableau Software, Inc., Seattle, WA (US)

(*) Notice: Subject to any disclaimer, the term of this patent is extended or adjusted under 35 U.S.C. 154(b) by 66 days.

(21) Appl. No.: 14/603,312

(22) Filed: Jan. 22, 2015

(65) Prior Publication Data
US 2017/0010792 A1    Jan. 12, 2017

Related U.S. Application Data

(60) Provisional application No. 62/047,429, filed on Sep. 8, 2014.

(51) Int. Cl.
*G06F 3/0484* (2013.01)
*G06T 11/20* (2006.01)
(Continued)

(52) U.S. Cl.
CPC ........ *G06F 3/04845* (2013.01); *G06F 3/0481* (2013.01); *G06F 3/0485* (2013.01);
(Continued)

(58) Field of Classification Search
CPC .................. G06F 17/246; G06F 3/017; G06F 2203/04808; G06T 11/206
(Continued)

(56) References Cited

U.S. PATENT DOCUMENTS 5,414,809 A * 5/1995 Hogan ................ G06F 3/0481
345/440
5,717,939 A * 2/1998 Bricklin ............... G06F 17/211
345/173
(Continued)

FOREIGN PATENT DOCUMENTS

EP        2386940 A1    11/2011

OTHER PUBLICATIONS

Drucker et al., *Touch Viz: A Case Study Comparing Two Interfaces for Data Analytics on Tablets*, CHI'13, Apr. 27-May 2, 2013, Paris, France, downloaded from http://research.microsoft.com/jump/189003, 10 pgs.
(Continued)

*Primary Examiner* — Cesar B Paula
*Assistant Examiner* — Yahao Chen
(74) *Attorney, Agent, or Firm* — Morgan, Lewis & Bockius LLP

(57) ABSTRACT

A method is performed at an electronic device with a touch-sensitive surface and a display. The method includes displaying a chart on the display. The chart has a horizontal axis and a vertical axis. The horizontal axis includes first horizontal scale markers. The vertical axis includes first vertical scale markers. The method also includes detecting a first touch input at a location on the touch-sensitive surface that corresponds to a location on the display of the chart. The method further includes, while detecting the first touch input: horizontally expanding a portion of the chart such that a distance between first horizontal scale markers increases; and maintaining a vertical scale of the chart such that a distance between first vertical scale markers remains the same.

15 Claims, 93 Drawing Sheets

(51) Int. Cl.
*G06F 3/0488* (2013.01)
*G06F 3/0481* (2013.01)
*G06F 3/0486* (2013.01)
*G06T 13/00* (2011.01)
*G06T 3/40* (2006.01)
*G06F 3/0485* (2013.01)

(52) U.S. Cl.
CPC .......... *G06F 3/0486* (2013.01); *G06F 3/0488* (2013.01); *G06F 3/04842* (2013.01); *G06F 3/04883* (2013.01); *G06T 3/40* (2013.01); *G06T 11/206* (2013.01); *G06T 13/00* (2013.01); *G06F 2203/04806* (2013.01); *G06F 2203/04808* (2013.01)

(58) Field of Classification Search
USPC ............... 715/212, 215, 863; 345/440, 440.2
See application file for complete search history.

(56) References Cited

U.S. PATENT DOCUMENTS

| | | | |
|---|---|---|---|
| 5,806,078 A * | 9/1998 | Hug | G06F 17/2288 707/999.202 |
| 5,874,965 A * | 2/1999 | Takai | G06F 3/0481 345/667 |
| 6,400,366 B1 | 6/2002 | Davies et al. | |
| 6,529,217 B1 | 3/2003 | Maguire, III et al. | |
| 7,345,688 B2 * | 3/2008 | Baudisch | G06F 17/212 345/467 |
| 7,420,562 B2 | 9/2008 | Shinohara et al. | |
| 7,469,381 B2 * | 12/2008 | Ording | G06F 3/0485 715/702 |
| 8,106,856 B2 * | 1/2012 | Matas | G06F 3/0485 345/156 |
| 8,527,909 B1 | 9/2013 | Mullany | |
| 8,654,125 B2 | 2/2014 | Gibson | |
| 8,762,867 B1 | 6/2014 | Mattos et al. | |
| 8,832,588 B1 * | 9/2014 | Kerzner | G06F 3/0481 715/212 |
| 8,836,726 B1 * | 9/2014 | Schickler | G01R 13/029 345/660 |
| 8,996,978 B2 | 3/2015 | Richstein et al. | |
| 9,389,777 B2 | 7/2016 | Sekharan | |
| 2002/0024535 A1 * | 2/2002 | Ueno | H04L 41/0681 715/736 |
| 2002/0118192 A1 | 8/2002 | Couckuyt et al. | |
| 2002/0129053 A1 * | 9/2002 | Chan | G06F 17/246 715/213 |
| 2003/0030634 A1 | 2/2003 | Sang'udi et al. | |
| 2005/0060647 A1 | 3/2005 | Doan et al. | |
| 2006/0080594 A1 * | 4/2006 | Chavoustie | G06F 17/246 715/218 |
| 2007/0190924 A1 * | 8/2007 | Stadheim | F24F 11/0009 454/225 |
| 2007/0233666 A1 | 10/2007 | Carlson et al. | |
| 2007/0285426 A1 * | 12/2007 | Matina | G06T 11/206 345/440 |
| 2008/0010670 A1 * | 1/2008 | Campbell | G06F 17/248 726/3 |
| 2008/0046805 A1 | 2/2008 | Shewchenko et al. | |
| 2008/0192056 A1 | 8/2008 | Robertson et al. | |
| 2008/0195930 A1 | 8/2008 | Tolle | |
| 2008/0229242 A1 * | 9/2008 | Goering | G06F 17/246 715/810 |
| 2008/0288201 A1 * | 11/2008 | Oettinger | H02M 3/157 702/109 |
| 2009/0013287 A1 | 1/2009 | Helfman et al. | |
| 2009/0135240 A1 * | 5/2009 | Phaneuf | G01N 1/286 347/246 |
| 2009/0171606 A1 | 7/2009 | Murata et al. | |
| 2009/0178007 A1 | 7/2009 | Matas et al. | |
| 2009/0254557 A1 | 10/2009 | Jordan | |
| 2009/0267947 A1 | 10/2009 | Libby et al. | |
| 2009/0313537 A1 | 12/2009 | Fu et al. | |
| 2010/0079499 A1 | 4/2010 | Scott et al. | |
| 2010/0083089 A1 * | 4/2010 | Rapp | G06F 17/246 715/217 |
| 2010/0174678 A1 * | 7/2010 | Massand | G06F 17/2288 707/610 |
| 2010/0205520 A1 * | 8/2010 | Parish | G06F 17/246 715/212 |
| 2010/0211920 A1 | 8/2010 | Westerman et al. | |
| 2010/0238176 A1 | 9/2010 | Guo et al. | |
| 2010/0283800 A1 * | 11/2010 | Cragun | G06F 3/0481 345/661 |
| 2011/0074710 A1 * | 3/2011 | Weeldreyer | G06F 3/0481 345/173 |
| 2011/0106791 A1 | 5/2011 | Maim | |
| 2011/0115814 A1 | 5/2011 | Heimendinger et al. | |
| 2011/0145689 A1 * | 6/2011 | Campbell | G06F 17/248 715/209 |
| 2011/0154188 A1 * | 6/2011 | Forstall | G06F 3/0488 715/236 |
| 2011/0164055 A1 * | 7/2011 | McCullough | G06F 3/04845 345/642 |
| 2011/0283231 A1 * | 11/2011 | Richstein | G06F 3/0488 715/810 |
| 2012/0005045 A1 * | 1/2012 | Baker | G06Q 30/0643 705/27.2 |
| 2012/0013540 A1 * | 1/2012 | Hogan | G06F 3/04883 345/173 |
| 2012/0023449 A1 | 1/2012 | Zabielski | |
| 2012/0158623 A1 | 6/2012 | Bilenko et al. | |
| 2012/0159380 A1 * | 6/2012 | Kocienda | G06F 3/04883 715/783 |
| 2012/0166470 A1 | 6/2012 | Baumgaertel | |
| 2012/0180002 A1 * | 7/2012 | Campbell | G06F 17/246 715/863 |
| 2012/0233573 A1 | 9/2012 | Sullivan et al. | |
| 2012/0240064 A1 | 9/2012 | Ramsay et al. | |
| 2012/0254783 A1 * | 10/2012 | Pourshahid | G06F 3/04883 715/771 |
| 2012/0284601 A1 * | 11/2012 | Chan | G06F 17/246 715/217 |
| 2012/0313957 A1 | 12/2012 | Fisher et al. | |
| 2012/0324357 A1 | 12/2012 | Viegers et al. | |
| 2013/0009963 A1 | 1/2013 | Albrecht | |
| 2013/0019205 A1 * | 1/2013 | Gil | G06F 3/04812 715/834 |
| 2013/0024803 A1 * | 1/2013 | Workman | G06F 17/246 715/781 |
| 2013/0080884 A1 * | 3/2013 | Lisse | G06F 3/0483 715/255 |
| 2013/0111319 A1 | 5/2013 | Lin et al. | |
| 2013/0111321 A1 * | 5/2013 | Dorrell | G06F 17/30 715/215 |
| 2013/0120267 A1 | 5/2013 | Pasquero et al. | |
| 2013/0120358 A1 * | 5/2013 | Fan | G06T 13/00 345/419 |
| 2013/0174087 A1 * | 7/2013 | Chen | G06F 3/0488 715/800 |
| 2013/0194272 A1 | 8/2013 | Hao et al. | |
| 2013/0275904 A1 | 10/2013 | Bhaskaran et al. | |
| 2013/0293480 A1 * | 11/2013 | Kritt | G06F 3/0488 345/173 |
| 2013/0298085 A1 * | 11/2013 | Kritt | G06F 3/0488 715/863 |
| 2013/0314341 A1 | 11/2013 | Lee et al. | |
| 2013/0332810 A1 | 12/2013 | Lin et al. | |
| 2014/0049557 A1 * | 2/2014 | Hou | G06F 3/0481 345/629 |
| 2014/0053091 A1 * | 2/2014 | Hou | G06F 17/30389 715/769 |
| 2014/0068403 A1 * | 3/2014 | Bhargav | G06F 17/246 715/212 |
| 2014/0075286 A1 | 3/2014 | Harada | |
| 2014/0098020 A1 * | 4/2014 | Koshi | G06F 3/0488 345/156 |
| 2014/0109012 A1 | 4/2014 | Choudhary et al. | |
| 2014/0113268 A1 | 4/2014 | Dhasmana et al. | |

(56) References Cited

U.S. PATENT DOCUMENTS

| | | | |
|---|---|---|---|
| 2014/0129985 A1* | 5/2014 | Morozov | G06F 3/0488 715/823 |
| 2014/0136939 A1* | 5/2014 | Chan | G06F 17/246 715/227 |
| 2014/0149947 A1* | 5/2014 | Blyumen | G06F 17/30 715/863 |
| 2014/0157142 A1 | 6/2014 | Heinrich et al. | |
| 2014/0181756 A1* | 6/2014 | Kuo | G06F 3/0484 715/856 |
| 2014/0198105 A1 | 7/2014 | Gibson et al. | |
| 2014/0218383 A1 | 8/2014 | Srivastava | |
| 2014/0223350 A1* | 8/2014 | Woodward | G06F 3/0486 715/771 |
| 2014/0247268 A1 | 9/2014 | Drucker et al. | |
| 2014/0267424 A1* | 9/2014 | Benson | G06T 11/206 345/636 |
| 2014/0281867 A1* | 9/2014 | Vogel | G06F 17/246 715/212 |
| 2014/0281868 A1* | 9/2014 | Vogel | G06F 3/04817 715/212 |
| 2014/0282124 A1* | 9/2014 | Grealish | G06F 3/048 715/762 |
| 2014/0282276 A1* | 9/2014 | Drucker | G06F 17/245 715/863 |
| 2014/0320539 A1 | 10/2014 | Hao et al. | |
| 2014/0336786 A1 | 11/2014 | Asenjo et al. | |
| 2014/0372952 A1* | 12/2014 | Otero | G06F 17/246 715/835 |
| 2014/0380140 A1* | 12/2014 | Kapahi | G06F 3/0481 715/215 |
| 2014/0380178 A1* | 12/2014 | Kapahi | G06F 3/0488 715/738 |
| 2015/0007078 A1 | 1/2015 | Feng et al. | |
| 2015/0015504 A1* | 1/2015 | Lee | G06F 3/04845 345/173 |
| 2015/0026554 A1* | 1/2015 | Hogan | G06F 3/04883 715/212 |
| 2015/0029213 A1* | 1/2015 | Benson | G06T 11/206 345/625 |
| 2015/0058801 A1* | 2/2015 | John | G06F 3/04847 715/801 |
| 2015/0135113 A1* | 5/2015 | Sekharan | G06F 3/0488 715/771 |
| 2015/0169531 A1 | 6/2015 | Campbell et al. | |
| 2015/0254369 A1* | 9/2015 | Hou | G06F 3/0486 707/798 |
| 2015/0278315 A1 | 10/2015 | Baumgartner et al. | |
| 2016/0004423 A1* | 1/2016 | Springer | G06F 3/14 715/863 |
| 2016/0055232 A1* | 2/2016 | Yang | G06F 17/30601 707/740 |
| 2016/0070015 A1 | 3/2016 | Sastry et al. | |
| 2016/0104311 A1 | 4/2016 | Allyn | |
| 2016/0154575 A1 | 6/2016 | Xie et al. | |
| 2016/0224221 A1 | 8/2016 | Liu et al. | |
| 2017/0004638 A1 | 1/2017 | Csenteri et al. | |
| 2017/0169592 A1 | 6/2017 | Ruble et al. | |

OTHER PUBLICATIONS

Glueck et al., Dive in! Enabling Progressive Loading for Real-Time Navigation of Data Visualizations, CHI 2014, Apr. 26-May 1, 2014 Toronto, ON, Canada, 10 pgs.

Tableau, International Search Report and Written Opinion, PCT/US2016/052689, dated Dec. 5, 2016, 11 pgs.

Apple, macOS Human Interface Guidelines—Drag and Drop, <URL: https://developer.apple.com/library/content/documentation/UserExperience/Conceptual/OSXHIGuidelines/DragDrop.html>, date, 5 pgs.

Microsoft, Guidelines for drag animations, <URL: https://msdn.microsoft.com/en-us/windows/hardware/drivers/hh465193>, date, 2 pgs.

Stewart, Office Action, U.S. Appl. No. 14/603,302, dated Feb. 27, 2017, 14 pgs.

Stewart, Office Action, U.S. Appl. No. 14/603,322, dated Mar. 9, 2017, 15 pgs.

Stewart, Office Action, U.S. Appl. No. 14/603,330, dated Apr. 13, 2017, 15 pgs.

Stewart, Final Office Action, U.S. Appl. No. 14/603,302, dated Sep. 25, 2017, 15 pgs.

Stewart, Notice of Allowance, U.S. Appl. No. 14/603,330, dated Oct. 3, 2017, 10 pgs.

Stewart, Office Action, U.S. Appl. No. 15/172,052, dated Jan. 10, 2018, 11 pgs.

Stewart, Office Action, U.S. Appl. No. 15/172,085, dated Sep. 7, 2017, 9 pgs.

Stewart, Office Action, U.S. Appl. No. 15/172,076, dated Oct. 5, 2017, 11 pgs.

Stewart, Office Action, U.S. Appl. No. 14/603,322, dated Oct. 20, 2017, 12 pgs.

Stewart, Office Action, U.S. Appl. No. 14/603,302, dated Apr. 6, 2018, 16 pgs.

Stewart, Office Action, U.S. Appl. No. 14/603,322, dated Jun. 1, 2018, 11 pgs.

Stewart, Final Office Action, U.S. Appl. No. 15/172,085, dated Mar. 8, 2018, 13 pgs.

Stewart, Final Office Action, U.S. Appl. No. 15/172,076, dated Jul. 3, 2018, 12 pgs.

Stewart, Office Action, U.S. Appl. No. 15/260,261, dated Oct. 5, 2018, 10 pgs.

Tableau, International Preliminary Report on Patentability, PCT/US2016/052689, dated Mar. 20, 2018, 8 pgs.

Tableau, Communication Pursuant to Rules 161(1) and 162, EP16775417.5, dated May 17, 2018, 3 pgs.

* cited by examiner

After horizontally expanding the portion of the chart such that the distance between first horizontal scale markers increases:  ⌐2020

While continuing to detect the first touch input:  ⌐2022 continue to horizontally expand a portion of the chart;

display second horizontal scale markers, the second horizontal scale markers being at a finer scale than the first horizontal scale markers; and continue to maintain the vertical scale of the chart.

After horizontally expanding the portion of the chart such that the distance between first horizontal scale markers increases:  ⌐2024

While continuing to detect the first touch input:  ⌐2026 continue to horizontally expand a portion of the chart;

replace a first set of displayed data marks with a second set of displayed data marks, where for at least some of the data marks in the first set of data marks, an individual data mark in the first set of data marks corresponds to a plurality of data marks in the second set of data marks; and continue to maintain the vertical scale of the chart.

Figure 20B

METHODS AND DEVICES FOR ADJUSTING CHART MAGNIFICATION ASYMMETRICALLY

RELATED APPLICATIONS

This application claims priority to U.S. Provisional Application Ser. No. 62/047,429, filed Sep. 8, 2014, entitled "Methods and Devices for Manipulating Graphical Views of Data," which is incorporated by reference herein in its entirety.

This application is related to U.S. patent application Ser. No. 14/603,302, filed Jan. 22, 2015, entitled "Methods and Devices for Adjusting Chart Filters," U.S. patent application Ser. No. 14/603,322, filed Jan. 22, 2015, entitled "Methods and Devices for Displaying Data Mark Information," and U.S. patent application Ser. No. 14/603,330, filed Jan. 22, 2015, entitled "Methods and Devices for Adjusting Chart Magnification," each of which is incorporated by reference herein in its entirety.

TECHNICAL FIELD

This invention relates generally to devices and methods for displaying graphical views of data. The invention relates specifically to devices and methods for manipulating user interfaces displaying graphical views of data.

BACKGROUND

Data sets with hundreds of variables or more arise today in many contexts, including, for example: gene expression data for uncovering the link between the genome and the various proteins for which it codes; demographic and consumer profiling data for capturing underlying sociological and economic trends; sales and marketing data for huge numbers of products in vast and ever-changing marketplaces; and environmental measurements for understanding phenomena such as pollution, meteorological changes, and resource impact issues.

Data visualization is a powerful tool for exploring large data sets, both by itself and coupled with data mining algorithms. Graphical views provide user-friendly ways to visualize and interpret data. However, the task of effectively visualizing large databases imposes significant demands on the human-computer interface to the visualization system.

In addition, as computing and networking speeds increase, data visualization that was traditionally performed on desktop computers can also be performed on portable electronic devices, such as smart phones, tablets, and laptop computers. These portable devices typically use touch-sensitive surfaces (e.g., touch screens and/or trackpads) as input devices. These portable devices typically have significantly smaller displays than desktop computers. Thus, additional challenges arise in using touch-sensitive surfaces to manipulate graphical views of data in a user-friendly manner on portable devices.

Consequently, there is a need for faster, more efficient methods and interfaces for manipulating graphical views of data. Such methods and interfaces may complement or replace conventional methods for visualizing data. Such methods and interfaces reduce the cognitive burden on a user and produce a more efficient human-machine interface. For battery-operated devices, such methods and interfaces conserve power and increase the time between battery charges.

SUMMARY

The above deficiencies and other problems associated with visualizing data are reduced or eliminated by the disclosed methods, devices, and storage mediums. Various implementations of methods, devices, and storage mediums within the scope of the appended claims each have several aspects, no single one of which is solely responsible for the attributes described herein. Without limiting the scope of the appended claims, after considering this disclosure, one will understand how the aspects of various implementations are used to visualize data.

In one aspect, some embodiments include methods for visualizing data.

In some embodiments, a method is performed at an electronic device with a touch-sensitive surface and a display. The method includes displaying a chart on the display. The chart has a horizontal axis and a vertical axis. The horizontal axis includes first horizontal scale markers. The vertical axis includes first vertical scale markers. The method also includes detecting a first touch input at a location on the touch-sensitive surface that corresponds to a location on the display of the chart. The method further includes, while detecting the first touch input: horizontally expanding a portion of the chart such that a distance between first horizontal scale markers increases; and maintaining a vertical scale of the chart such that a distance between first vertical scale markers remains the same.

In some embodiments, the first touch input is a de-pinch gesture.

In some embodiments, the method includes, after horizontally expanding the portion of the chart such that the distance between first horizontal scale markers increases and while continuing to detect the first touch input: continuing to horizontally expand a portion of the chart; displaying second horizontal scale markers, the second horizontal scale markers being at a finer scale than the first horizontal scale markers; and continuing to maintain the vertical scale of the chart.

In some embodiments, the method includes, including, after horizontally expanding the portion of the chart such that the distance between first horizontal scale markers increases and while continuing to detect the first touch input: continuing to horizontally expand a portion of the chart; replacing a first set of displayed data marks with a second set of displayed data marks, where for at least some of the data marks in the first set of data marks, an individual data mark in the first set of data marks corresponds to a plurality of data marks in the second set of data marks; and continuing to maintain the vertical scale of the chart.

In some embodiments, the method includes, after horizontally expanding the portion of the chart and maintaining the vertical scale of the chart while detecting the first touch input, ceasing to detect the first touch input. The method also includes, in response to ceasing to detect the first touch input, changing a vertical scale of the chart.

In another aspect, some embodiments include electronic devices for visualizing data. In some embodiments, an electronic device for visualizing data includes a display, a touch-sensitive surface, one or more processors, memory, and one or more programs stored in the memory and configured to be executed by the one or more processors. The one or more programs include instructions for displaying a chart on the display. The chart has a horizontal axis and a vertical axis. The horizontal axis includes first horizontal scale markers. The vertical axis includes first vertical scale markers. The one or more programs also include instructions for detecting a first touch input at a location on the touch-sensitive surface that corresponds to a location on the display of the chart. The one or more programs further include instructions for, while detecting the first touch input: horizontally expanding a portion of the chart such that a distance between first horizontal scale markers increases; and maintaining a vertical scale of the chart such that a distance between first vertical scale markers remains the same.

In some embodiments, an electronic device for visualizing data includes a display, a touch-sensitive surface, one or more processors, memory, and one or more programs stored in the memory and configured to be executed by the one or more processors. The one or more programs include instructions for performing any of the methods described herein.

In yet another aspect, some embodiments include a non-transitory computer readable storage medium, storing one or more programs for execution by one or more processors of an electronic device with a display and a touch-sensitive surface, the one or more programs including instructions for performing any of the methods described herein.

In yet another aspect, some embodiments include a graphical user interface on an electronic device with a display, a touch-sensitive surface, a memory, and one or more processors to execute one or more programs stored in the memory, the graphical user interface comprising user interfaces displayed in accordance with any of the methods described herein.

Thus, electronic devices with displays and touch-sensitive surfaces are provided with faster, more efficient methods and interfaces for data visualization, thereby increasing the effectiveness, efficiency, and user satisfaction with such devices. Such methods and interfaces may complement or replace conventional methods for data visualization.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIGS. 20A-20B provide a flow diagram illustrating a method of data visualization in accordance with some embodiments.

Figure 1:
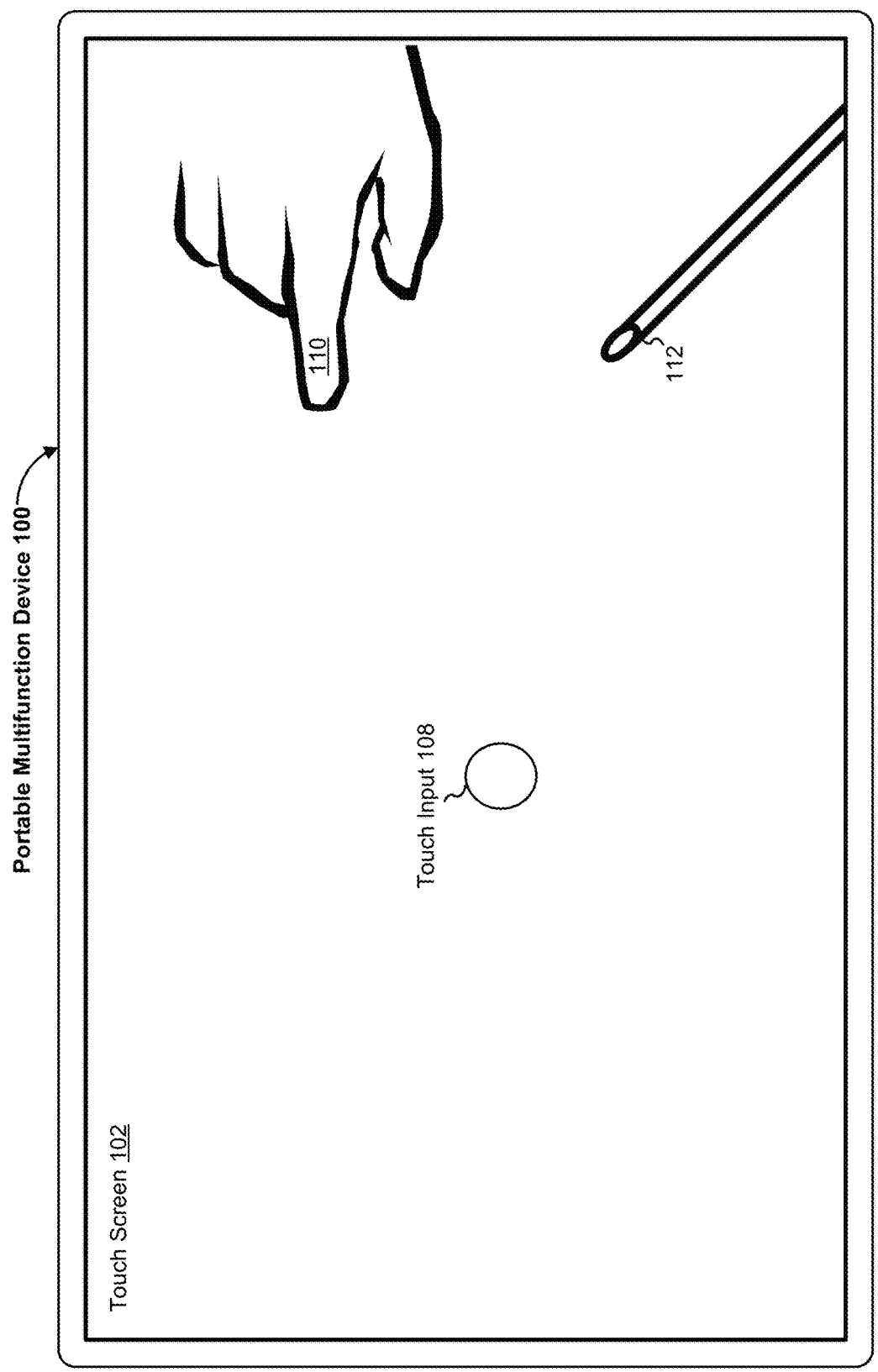
FIG. 1 illustrates a portable multifunction device having a touch screen, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system or device. Finally, like reference numerals may be used to denote like features throughout the specification and figures.

DESCRIPTION OF EMBODIMENTS

As portable electronic devices become more compact, and the number of functions performed by applications on any given device increase, it has become a significant challenge to design user interfaces that allow users to interact with the applications easily. This challenge is particularly significant for portable devices with smaller screens and/or limited input devices. In addition, data visualization applications need to provide user-friendly ways to explore data in order to enable a user to extract significant meaning from a particular data set. Some application designers have resorted to using complex menu systems to enable a user to perform desired functions. These conventional user interfaces often result in complicated key sequences and/or menu hierarchies that must be memorized by the user and/or that are otherwise cumbersome or not intuitive to use.

The methods, devices, and GUIs described herein make manipulation of data sets and data visualizations more efficient and intuitive for a user. A number of different intuitive user interfaces for data visualizations are described below. For example, applying a filter to a data set can be accomplished by a simple touch input on a given portion of a displayed chart rather than via a nested menu system. Additionally, switching between chart categories can be accomplished by a simple touch input on a displayed chart label.

Figure 15A:
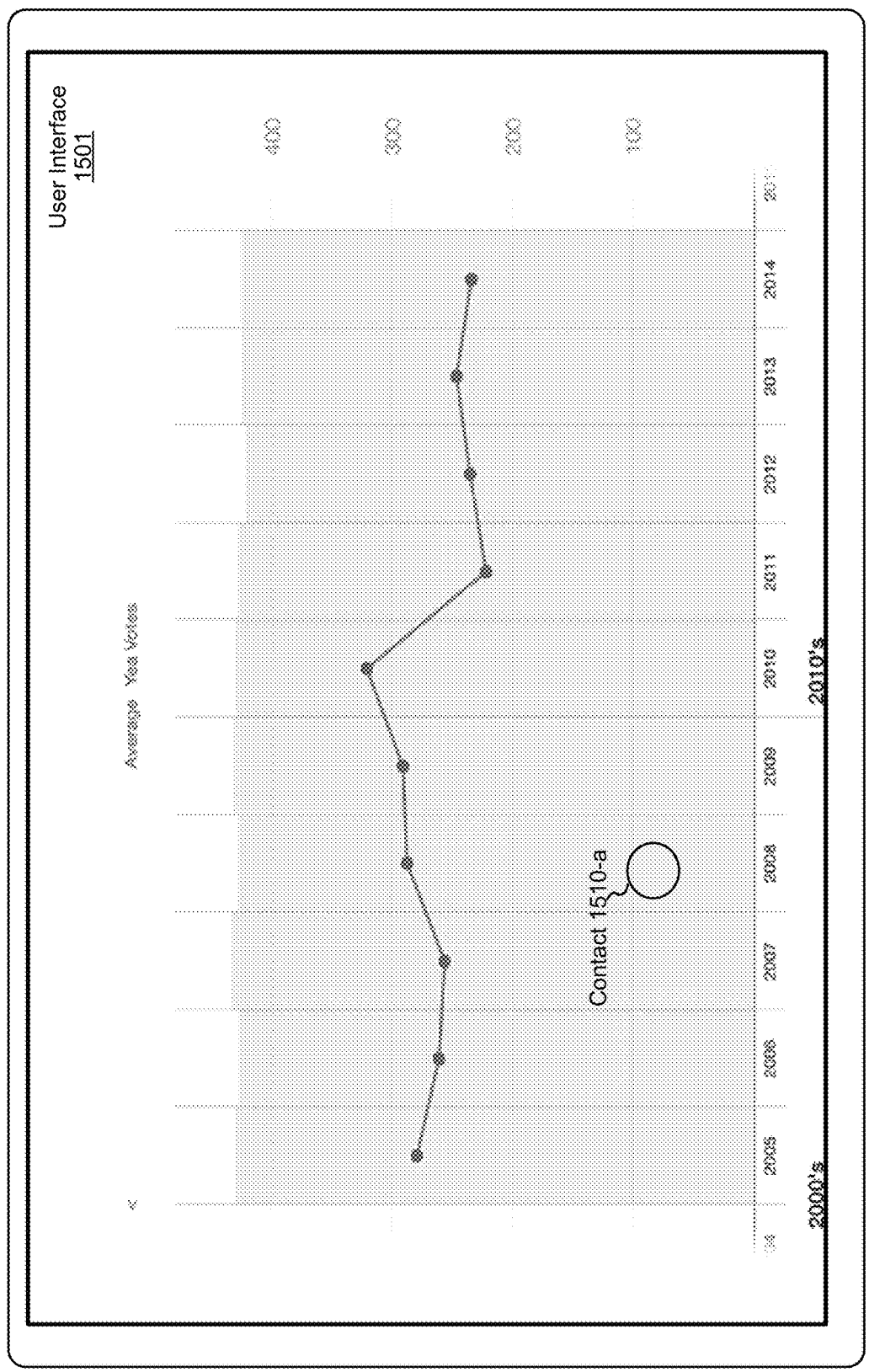
FIGS. 15A-15C illustrate user interfaces for adjusting a chart view, in accordance with some embodiments.
Figure 15B:
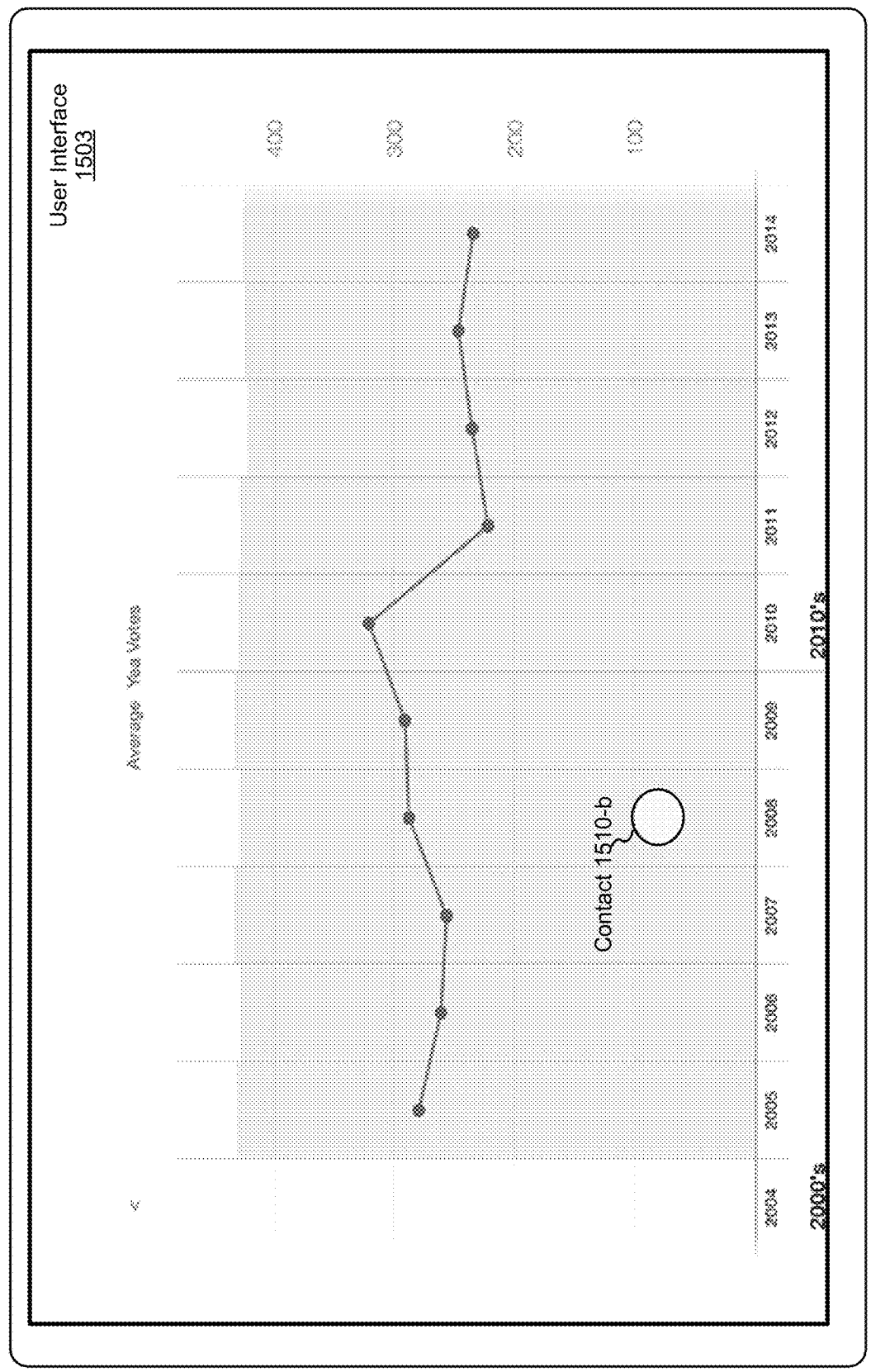
Figure 15C:
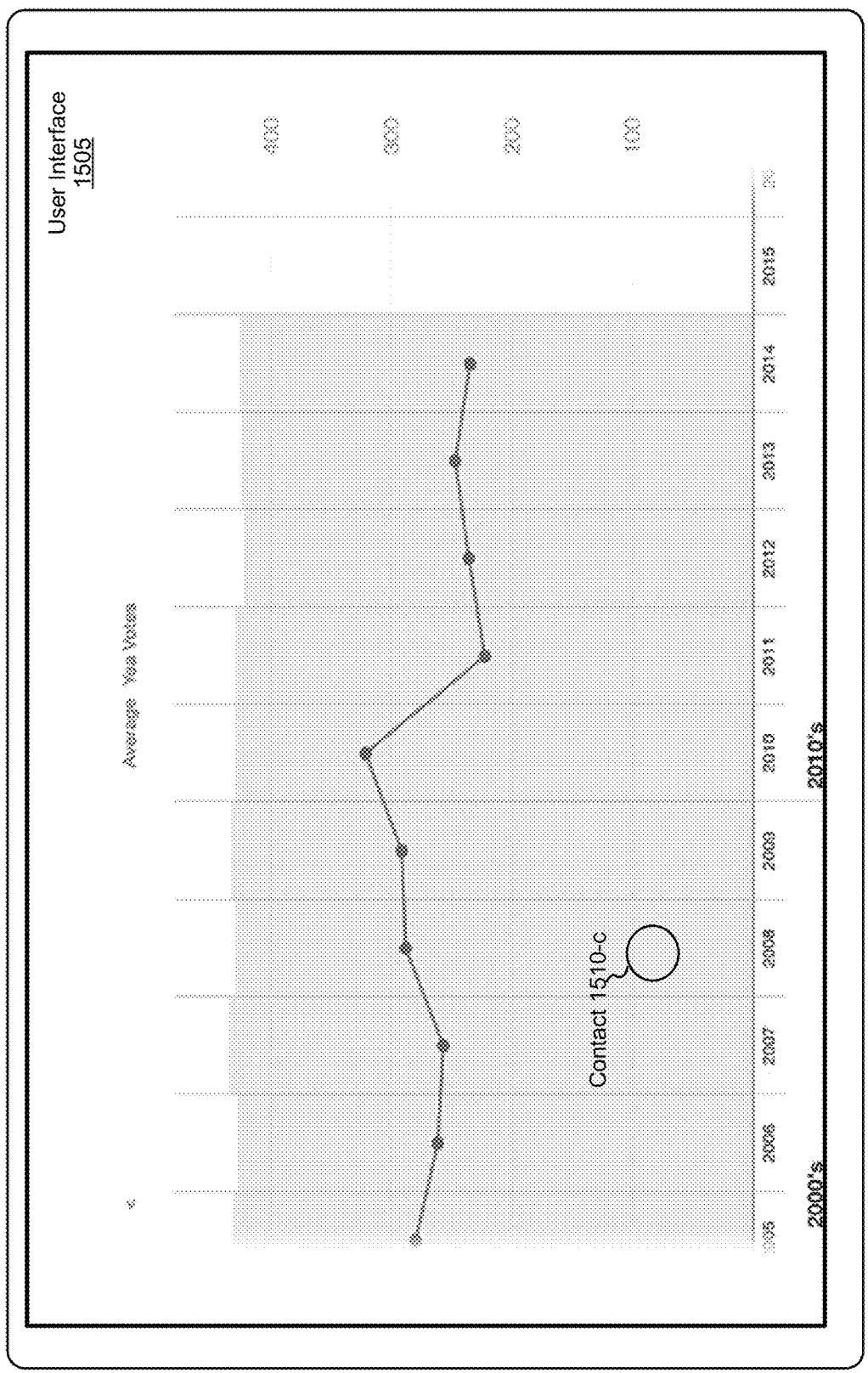
Figure 20A:
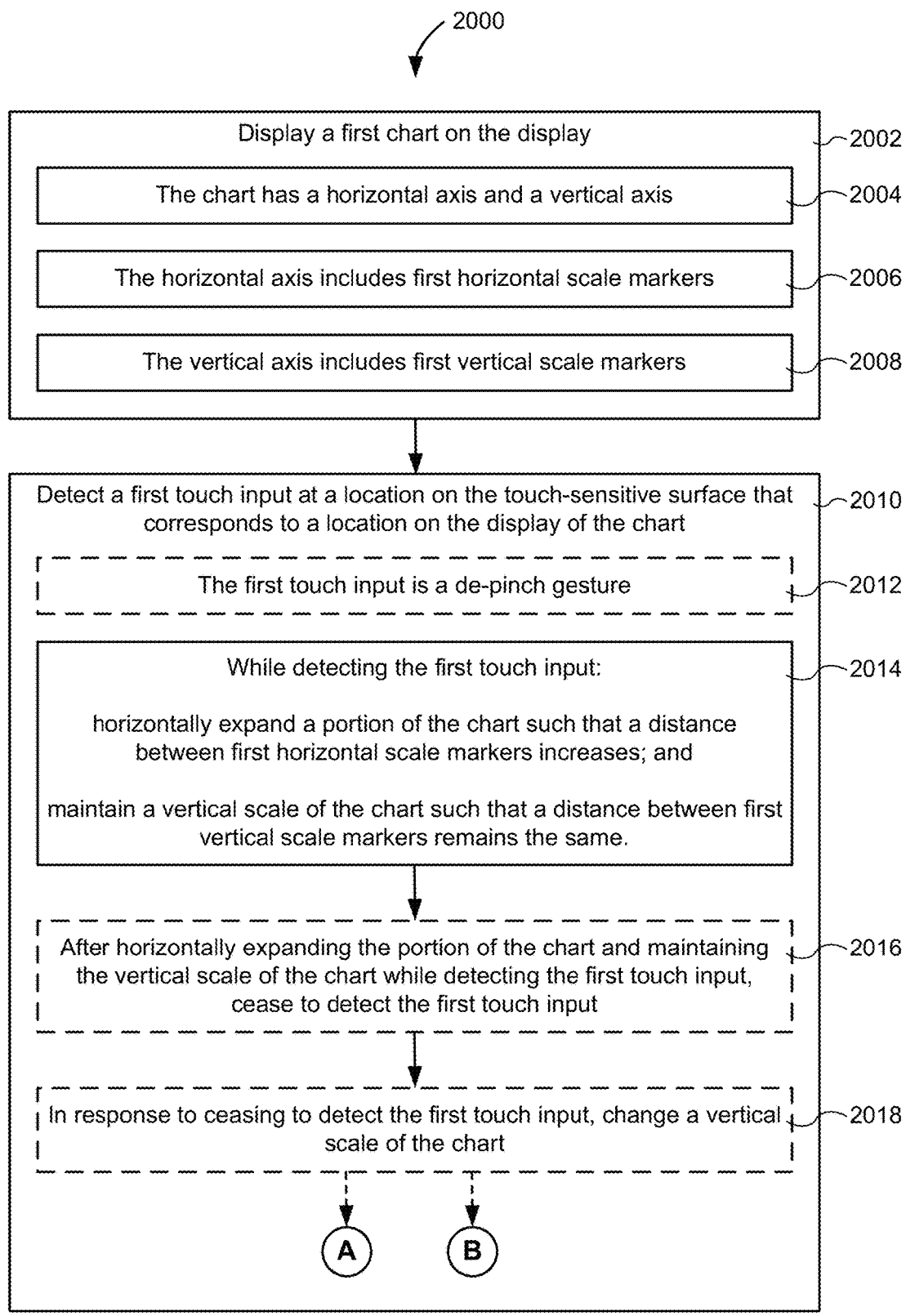

FIGS. 20A-20B provide a flow diagram illustrating a method of adjusting chart magnification. FIGS. 11A-11J and 12A-12D illustrate user interfaces for adjusting chart magnification. FIGS. 15A-15C illustrate user interfaces for adjusting chart views. The user interfaces in FIGS. 11A-11J, 12A-12D, and 15A-15C are used to illustrate the processes in FIGS. 20A-20B.

Reference will now be made in detail to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Attention is now directed toward embodiments of portable devices with touch-sensitive displays. Embodiments of electronic devices and user interfaces for such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad). In the discussion that follows, an electronic device that includes a display and a touch-sensitive surface is described. It should be understood, however, that the electronic device optionally includes one or more other physical user-interface devices, such as a physical keyboard, a mouse, a microphone, and/or a joystick.

FIG. 1 illustrates portable multifunction device 100 having touch screen 102, in accordance with some embodiments. In some embodiments, device 100 is a mobile phone, a laptop computer, a personal digital assistant (PDA), or a tablet computer. The touch screen 102 is also sometimes called a touch-sensitive display and/or a touch-sensitive display system. Touch screen 102 optionally displays one or more graphics within a user interface (UI). In some embodiments, a user is enabled to select one or more of the graphics by making a touch input (e.g., touch input 108) on the graphics. In some instances, the touch input is a contact on the touch screen. In some instances, the touch input is a gesture that includes a contact and movement of the contact on the touch screen. In some instances, the gesture optionally includes one or more taps, one or more swipes (from left to right, right to left, upward and/or downward) and/or a rolling of a finger (from right to left, left to right, upward and/or downward) that has made contact with device 100. For example, a touch input on the graphics is optionally made with one or more fingers 110 (not drawn to scale in the figure) or one or more styluses 112 (not drawn to scale in the figure). In some embodiments, selection of one or more graphics occurs when the user breaks contact with the one or more graphics. In some circumstances, inadvertent contact with a graphic does not select the graphic. For example, a swipe gesture that sweeps over a visual mark optionally does not select the visual mark when the gesture corresponding to the selection is a tap. Device 100 optionally also includes one or more physical buttons and/or other input/output devices, such as a microphone for verbal inputs.

Figure 2:
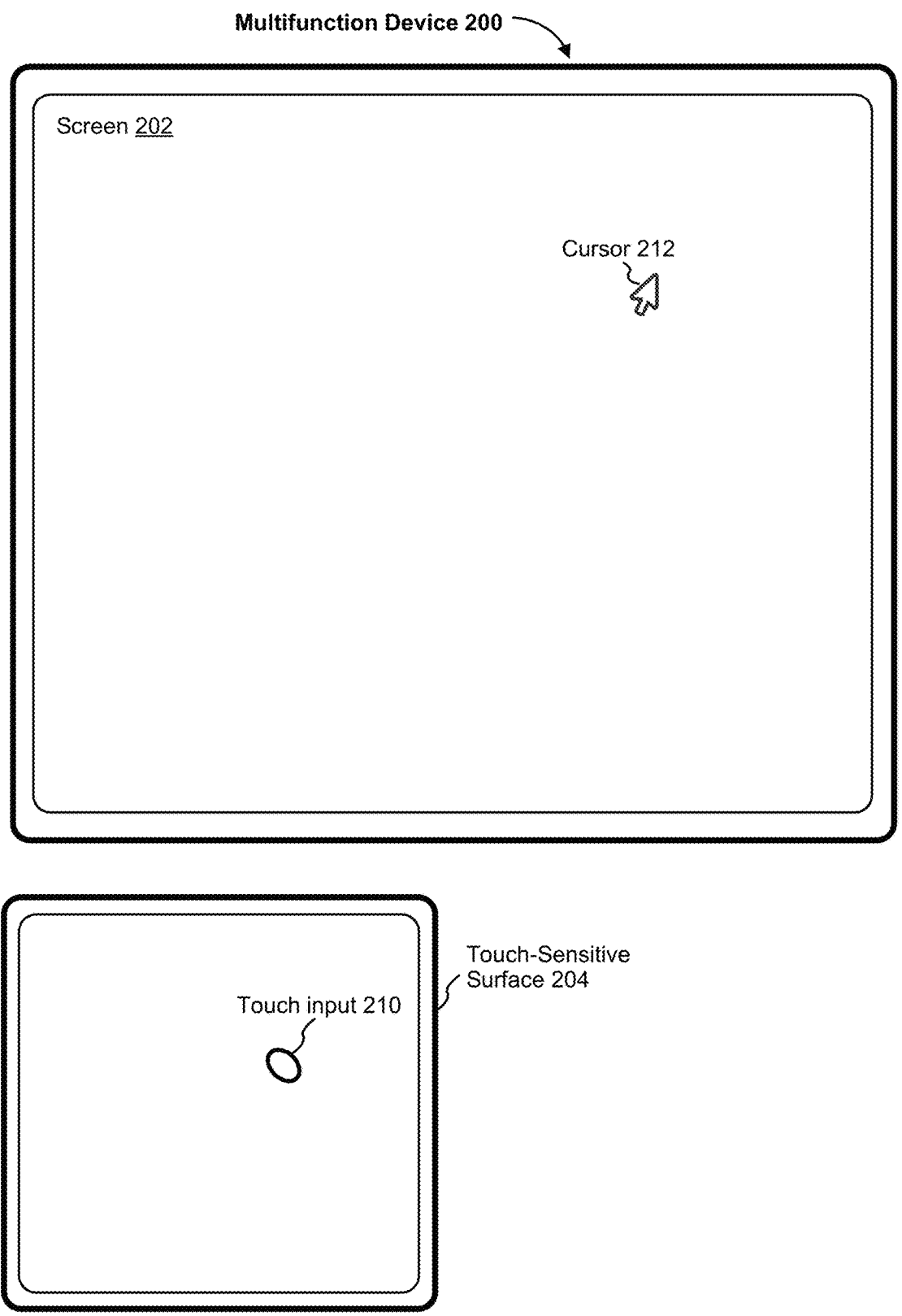
FIG. 2 illustrates a portable multifunction device having a touch-sensitive surface that is separate from the display, in accordance with some embodiments.

FIG. 2 illustrates multifunction device 200 in accordance with some embodiments. Device 200 need not be portable. In some embodiments, device 200 is a laptop computer, a desktop computer, a tablet computer, or an educational device. Device 200 includes screen 202 and touch-sensitive surface 204. Screen 202 optionally displays one or more graphics within a UI. In some embodiments, a user is enabled to select one or more of the graphics by making a touch input (e.g., touch input 210) on touch-sensitive surface 204 such that a corresponding cursor (e.g., cursor 212) on screen 202 selects the one or more graphics. For example, when an input is detected on touch-sensitive surface 204 while cursor 212 is over a particular user interface element (e.g., a button, window, slider or other user interface element), the particular user interface element is adjusted in accordance with the detected input.

Figure 3A:
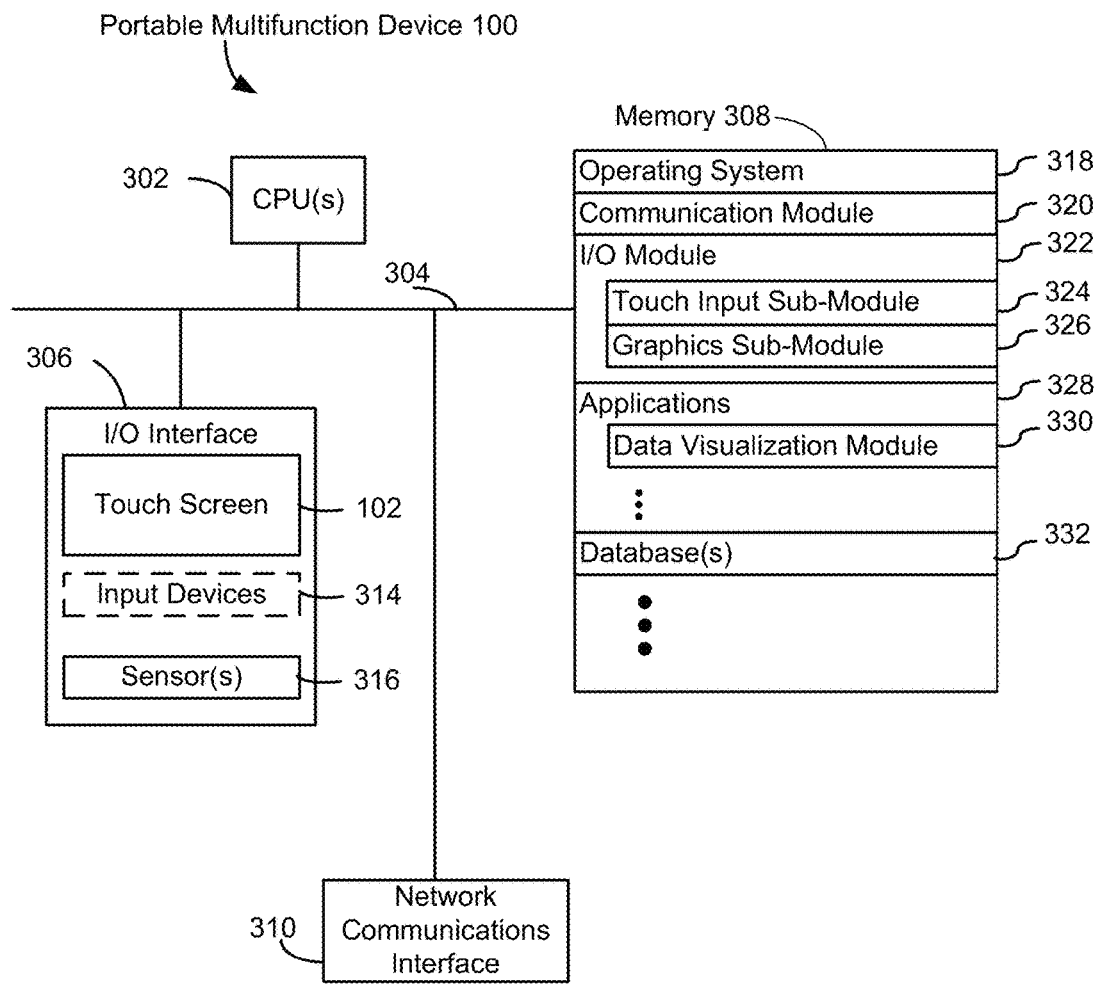
FIG. 3A is a block diagram illustrating a portable multifunction device having a touch screen, in accordance with some embodiments.

FIG. 3A is a block diagram illustrating portable multifunction device 100, in accordance with some embodiments. It should be appreciated that device 100 is only one example of a portable multifunction device, and that device 100 optionally has more or fewer components than shown, optionally combines two or more components, or optionally has a different configuration or arrangement of the components. The various components shown in FIG. 3A are implemented in hardware, software, or firmware, or a combination of hardware, software, and/or firmware, including one or more signal processing and/or application specific integrated circuits.

Device 100 includes one or more processing units (CPU's) 302, input/output (I/O) subsystem 306, memory 308 (which optionally includes one or more computer readable storage mediums), and network communications interface 310. These components optionally communicate over one or more communication buses or signal lines 304. Communication buses 304 optionally include circuitry (sometimes called a chipset) that interconnects and controls communications between system components.

Memory 308 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 308 optionally includes one or more storage devices remotely located from processor(s) 302. Memory 308, or alternately the non-volatile memory device(s) within memory 308, comprises a non-transitory computer readable storage medium.

In some embodiments, the software components stored in memory 308 include operating system 318, communication module 320, input/output (I/O) module 322, and applications 328. In some embodiments, one or more of the various modules comprises a set of instructions in memory 308. In some embodiments, memory 308 stores one or more data sets in one or more database(s) 332.

Operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware, software, and/or firmware components.

Communication module 320 facilitates communication with other devices over one or more external ports and also includes various software components for handling data received from other devices.

I/O module 322 includes touch input sub-module 324 and graphics sub-module 326. Touch input sub-module 324 optionally detects touch inputs with touch screen 102 and other touch sensitive devices (e.g., a touchpad or physical click wheel). Touch input sub-module 324 includes various software components for performing various operations related to detection of a touch input, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Touch input sub-module 324 receives contact data from the touch-sensitive surface (e.g., touch screen 102). These operations are, optionally, applied to single touch inputs (e.g., one finger contacts) or to multiple simultaneous touch inputs (e.g., "multitouch"/multiple finger contacts). In some embodiments, touch input sub-module 324 detects contact on a touchpad.

Touch input sub-module 324 optionally detects a gesture input by a user. Different gestures on the touch-sensitive surface have different contact patterns. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an data mark). As another example, detecting a finger swipe gesture on the touch-sensitive surface includes detecting a finger-down event followed by detecting one or more finger-dragging events, and subsequently followed by detecting a finger-up (lift off) event.

Graphics sub-module 326 includes various known software components for rendering and displaying graphics on touch screen 102 or other display, including components for changing the visual impact (e.g., brightness, transparency, saturation, contrast or other visual property) of graphics that are displayed. As used herein, the term "graphics" includes any object that can be displayed to a user, including without limitation data visualizations, icons (such as user-interface objects including soft keys), text, digital images, animations and the like. In some embodiments, graphics sub-module 326 stores data representing graphics to be used. Each graphic is, optionally, assigned a corresponding code. Graphics sub-module 326 receives, from applications etc., one or more codes specifying graphics to be displayed along with, if necessary, coordinate data and other graphic property data, and then generates screen image data to output to the display or touch screen.

Applications 328 optionally include data visualization module 330 for displaying graphical views of data and one or more other applications. Examples of other applications that are, optionally, stored in memory 308 include word processing applications, email applications, and presentation applications.

In conjunction with I/O interface 306, including touch screen 102, CPU(s) 302, and/or database(s) 332, data visualization module 330 includes executable instructions for displaying and manipulating various graphical views of data.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures, or modules, and thus various subsets of these modules are, optionally, combined or otherwise re-arranged in various embodiments. In some embodiments, memory 308 optionally stores a subset of the modules and data structures identified above. Furthermore, memory 308 optionally stores additional modules and data structures not described above.

Figure 3B:
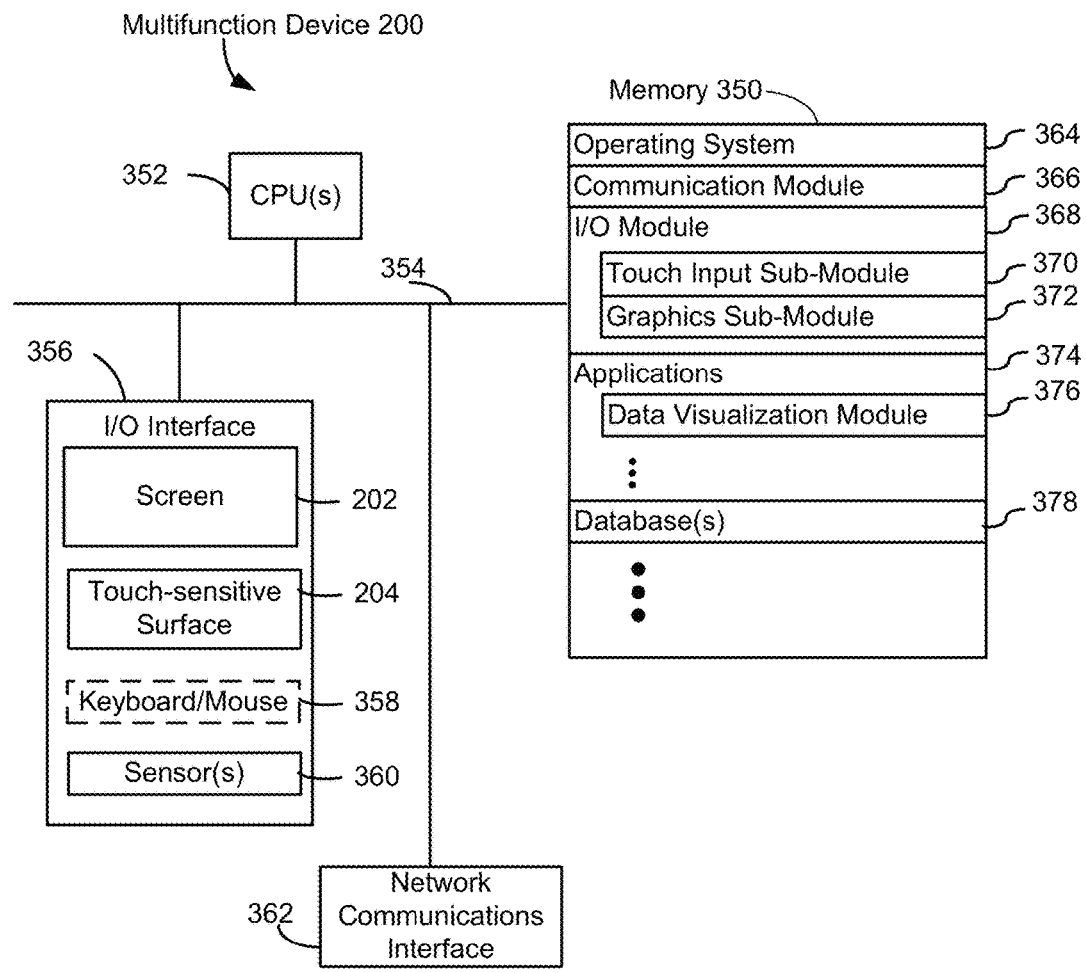
FIG. 3B is a block diagram illustrating a portable multifunction device having a touch-sensitive surface, in accordance with some embodiments.

FIG. 3B is a block diagram illustrating multifunction device 200, in accordance with some embodiments. It should be appreciated that device 200 is only one example of a multifunction device, and that device 200 optionally has more or fewer components than shown, optionally combines two or more components, or optionally has a different configuration or arrangement of the components. The various components shown in FIG. 3B are implemented in hardware, software, firmware, or a combination of hardware, software, and/or firmware, including one or more signal processing and/or application specific integrated circuits.

Device 200 typically includes one or more processing units/cores (CPUs) 352, one or more network or other communications interfaces 362, memory 350, I/O interface 356, and one or more communication buses 354 for interconnecting these components. Communication buses 354 optionally include circuitry (sometimes called a chipset) that interconnects and controls communications between system components.

I/O interface 306 comprises screen 202 (also sometimes called a display), touch-sensitive surface 204, and one or more sensor(s) 360 (e.g., optical, acceleration, proximity, and/or touch-sensitive sensors). I/O interface 356 optionally includes a keyboard and/or mouse (or other pointing device) 358. I/O interface 356 couples input/output peripherals on device 200, such as screen 202, touch-sensitive surface 204, other input devices 358, and one or more sensor(s) 360, to CPU(s) 352 and/or memory 350.

Screen 202 provides an output interface between the device and a user. Screen 202 displays visual output to the user. The visual output optionally includes graphics, text, icons, data marks, and any combination thereof (collectively termed "graphics"). In some embodiments, some or all of the visual output corresponds to user-interface objects. Screen 202 optionally uses LCD (liquid crystal display) technology, LPD (light emitting polymer display) technology, or LED (light emitting diode) technology, although other display technologies are used in other embodiments.

In addition to the touch screen, device 200 includes touch-sensitive surface 204 (e.g., a touchpad) for detecting touch inputs. Touch-sensitive surface 204 accepts input from the user via touch inputs. For example, touch input 210 in FIG. 2. Touch-sensitive surface 204 (along with any associated modules and/or sets of instructions in memory 350) detects touch inputs and converts the detected inputs into interaction with user-interface objects (e.g., one or more icons, data marks, or images) that are displayed on screen 202. In an exemplary embodiment, a point of contact between touch-sensitive surface 204 and the user corresponds to a finger of the user.

Memory 350 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 350 optionally includes one or more storage devices remotely located from CPU(s) 352. In some embodiments, the software components stored in memory 350 include operating system 364, communication module 366, input/ output (I/O) module 368, and applications 374. In some embodiments, one or more of the various modules comprises a set of instructions in memory 350. In some embodiments, memory 350 stores one or more data sets in one or more database(s) 378. In some embodiments, I/O module 368 includes touch input sub-module 370 and graphics sub-module 372. In some embodiments, applications 374 include data visualization module 376.

In some embodiments, memory 350 stores programs, modules, and data structures analogous to the programs, modules, and data structures stored in memory 308 of portable multifunction device 100 (FIG. 3A), or a subset thereof. Furthermore, memory 350 optionally stores additional programs, modules, and data structures not present in memory 308 of portable multifunction device 100. For example, memory 350 of device 200 optionally stores drawing, presentation, and word processing applications, while memory 308 of portable multifunction device 100 (FIG. 3A) optionally does not store these modules.

Device 200 also includes a power system for powering the various components. The power system optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management, and distribution of power in portable devices.

Each of the above identified elements in FIG. 3B is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 350 optionally stores a subset of the modules and data structures identified above. Furthermore, memory 350 optionally stores additional modules and data structures not described above.

Attention is now directed towards embodiments of user interfaces ("UI") that are, optionally, implemented on portable multifunction device 100 or device 200. The following examples are shown utilizing a touch screen (e.g., touch screen 102 in FIG. 1). However, it should be understood that, in some embodiments, the inputs (e.g., finger contacts) are detected on a touch-sensitive surface on a device that is distinct from a display on the device. In addition, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 4A:
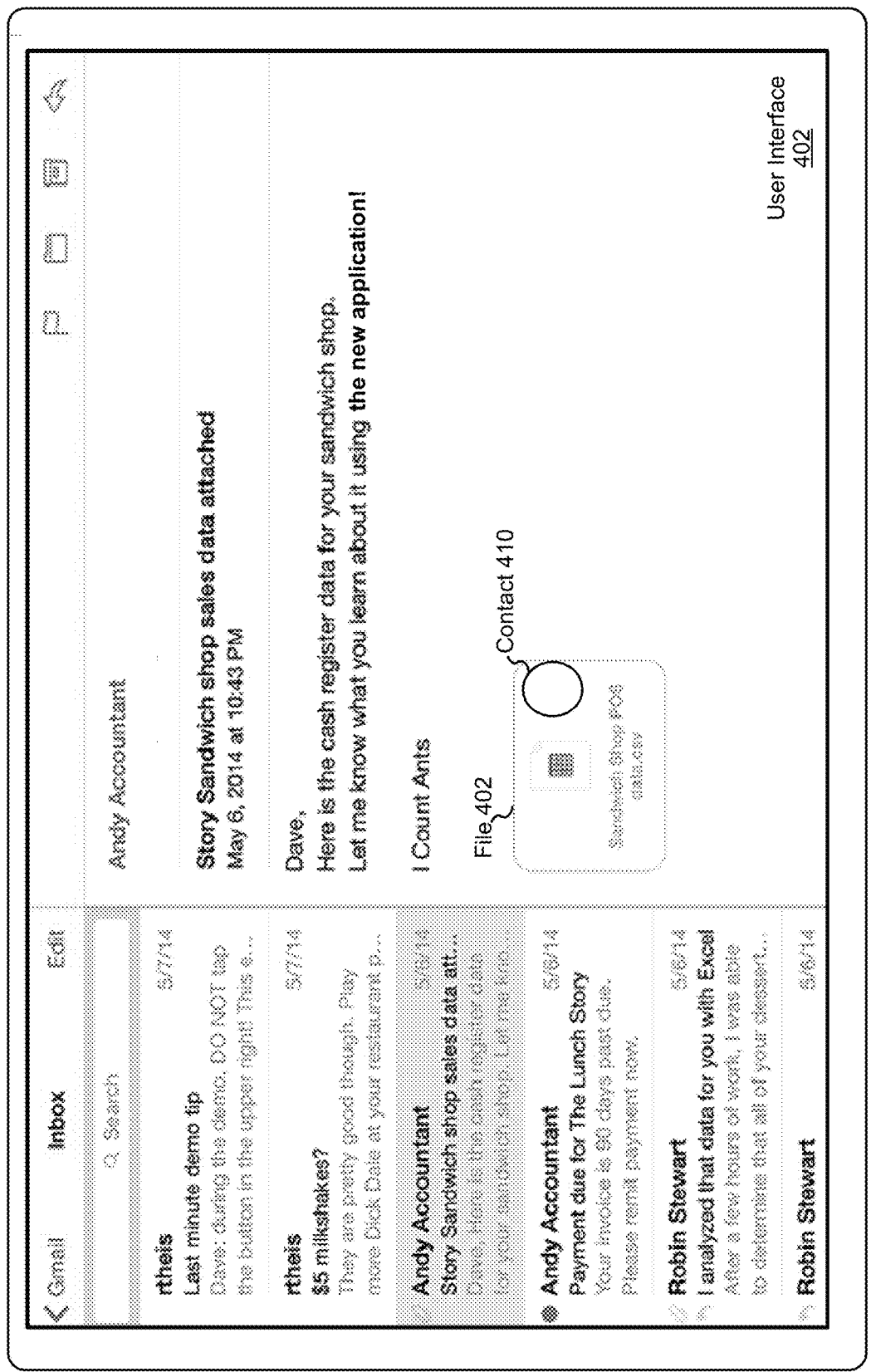
FIGS. 4A-4B illustrate user interfaces for initiating data visualization, in accordance with some embodiments.
Figure 4B:
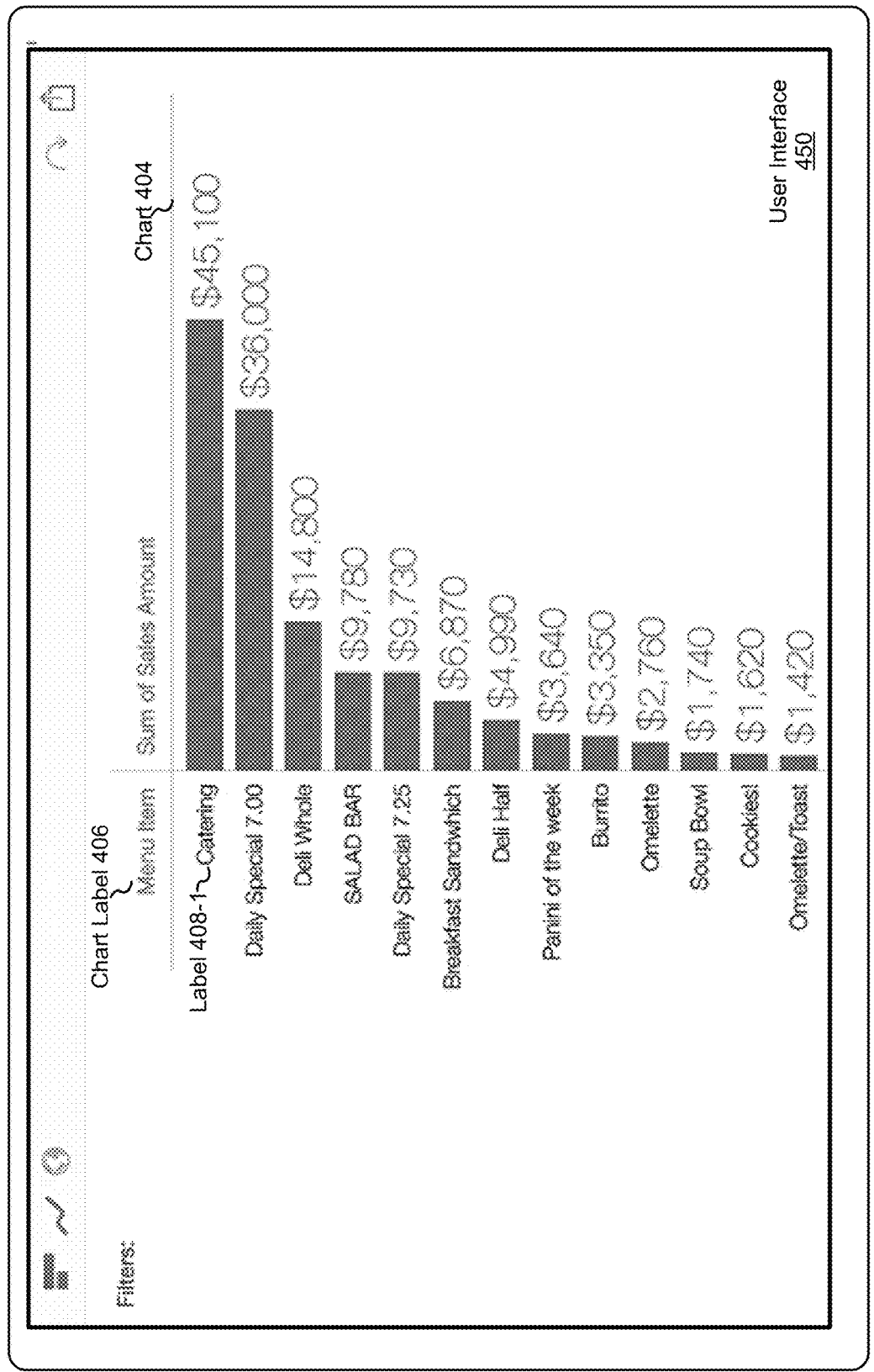

FIGS. 4A-4B illustrate user interfaces for initiating data visualization, in accordance with some embodiments. FIG. 4A shows UI 402 including an email application. The email application contains an email including attached file 402. FIG. 4A also shows contact 410 over the icon corresponding to file 402. FIG. 4B shows UI 450 including a data visualization application. The data visualization application includes a graphical view of data from file 402. The graphical view includes chart 404 (e.g., a bar chart) with chart label 406, a plurality of categories, and a plurality of category labels 408. In some embodiments, file 402 has a file type associated with the data visualization application and, in response to detecting contact 410, the data visualization application is initialized and the data from file 402 is displayed in a graphical view.

Figure 5A:
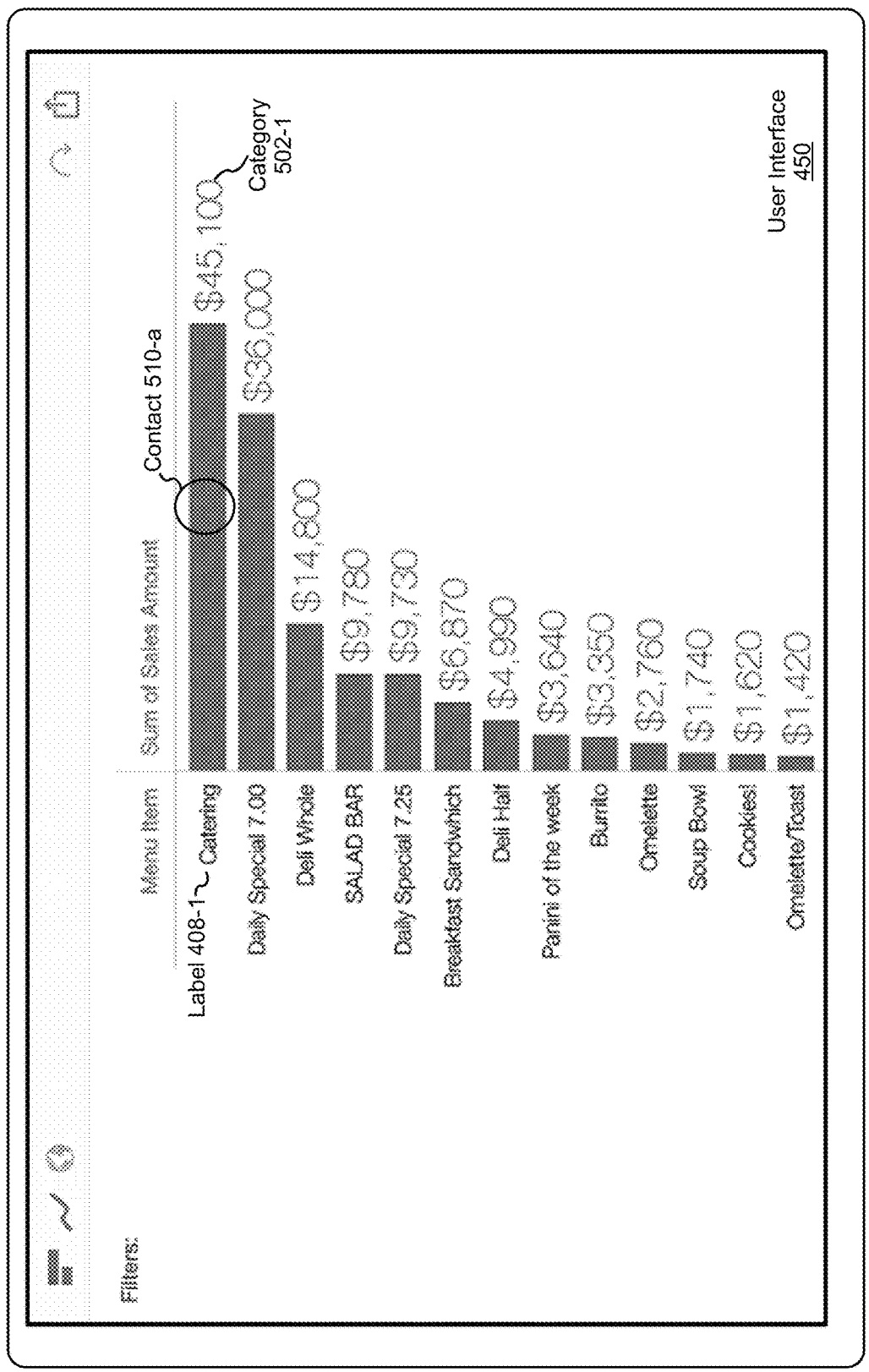
FIGS. 5A-5G illustrate user interfaces for adjusting chart filters, in accordance with some embodiments.
Figure 5B:
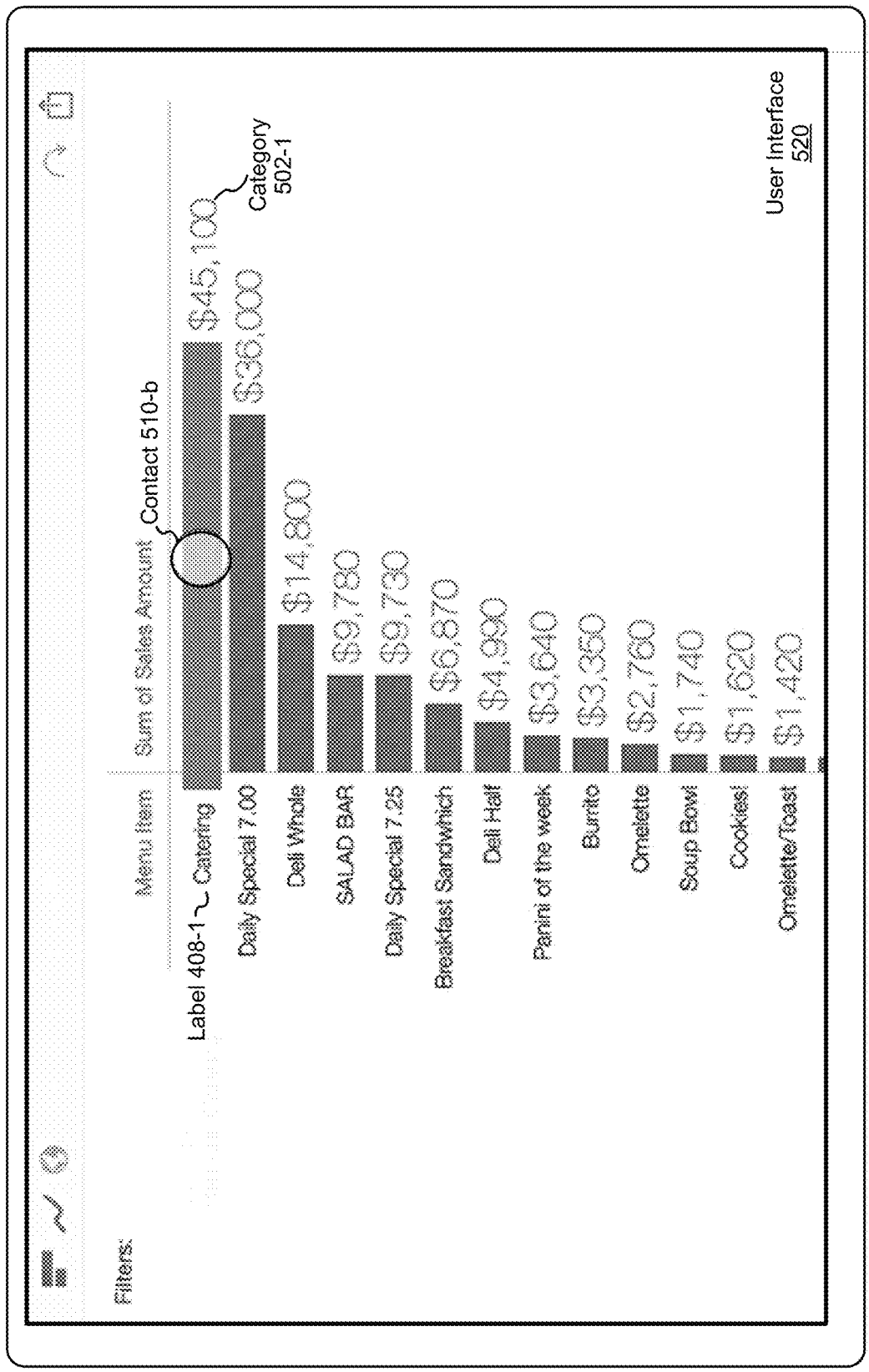
Figure 5C:
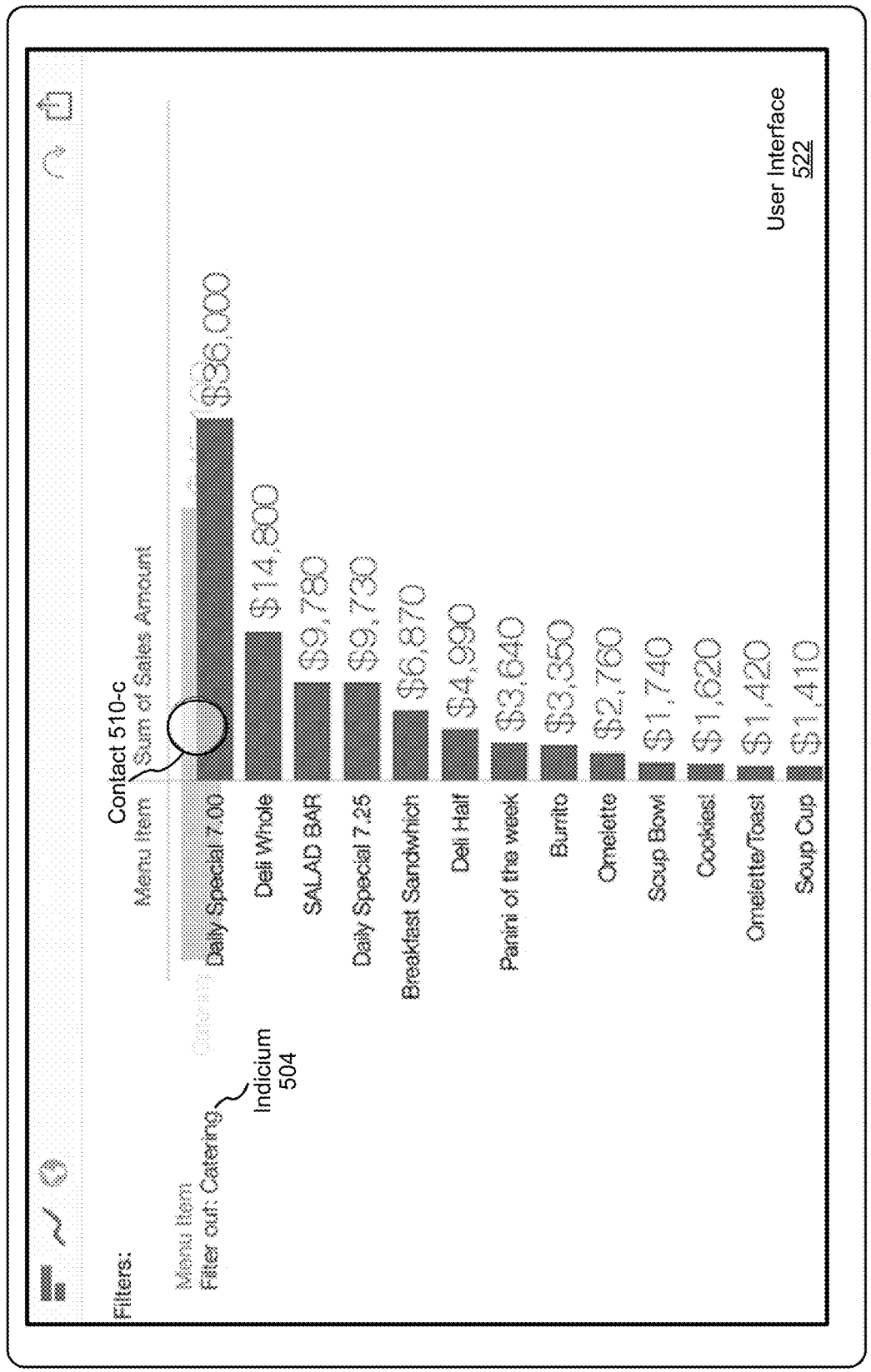
Figure 5D:
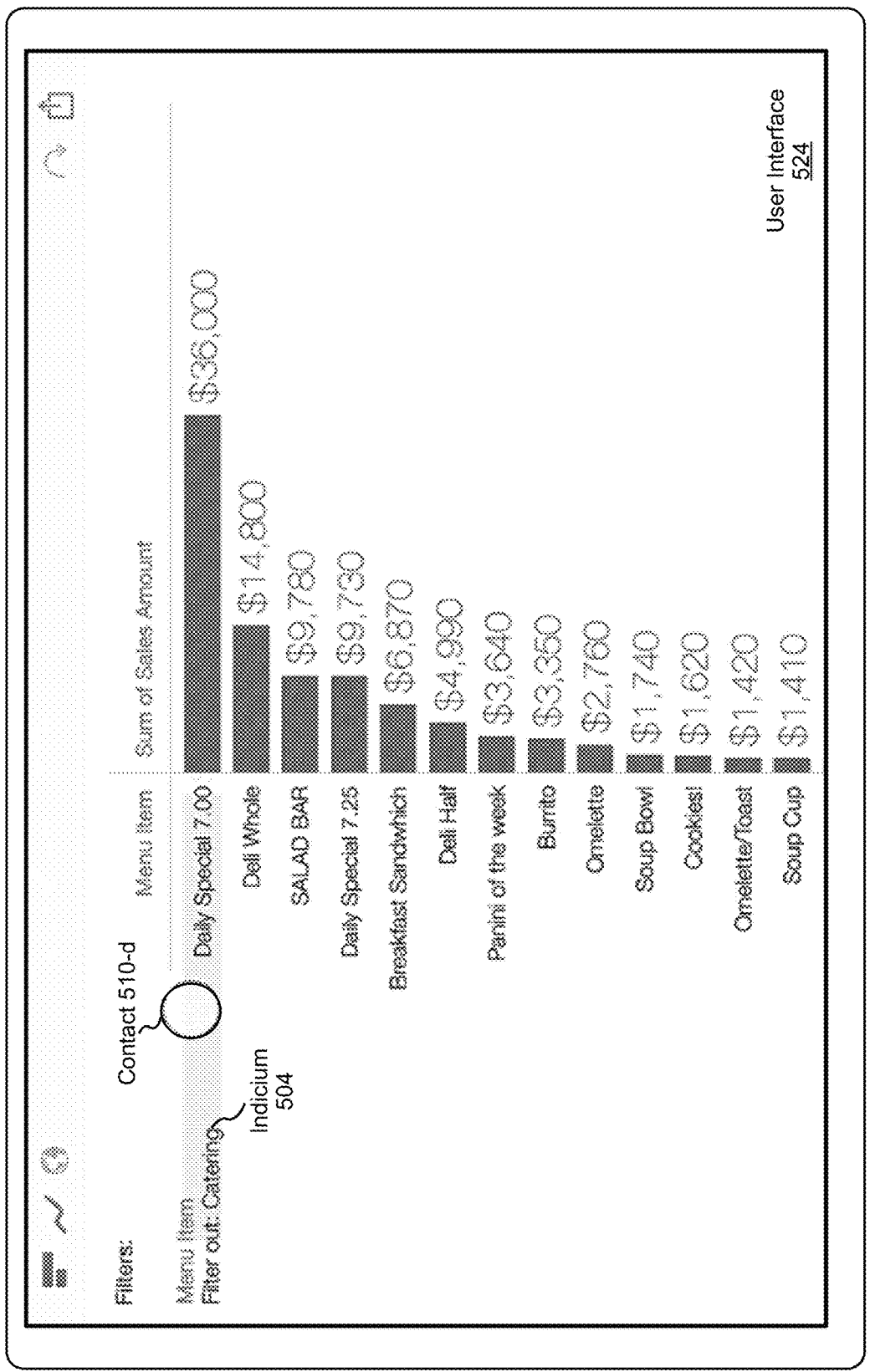
Figure 5E:
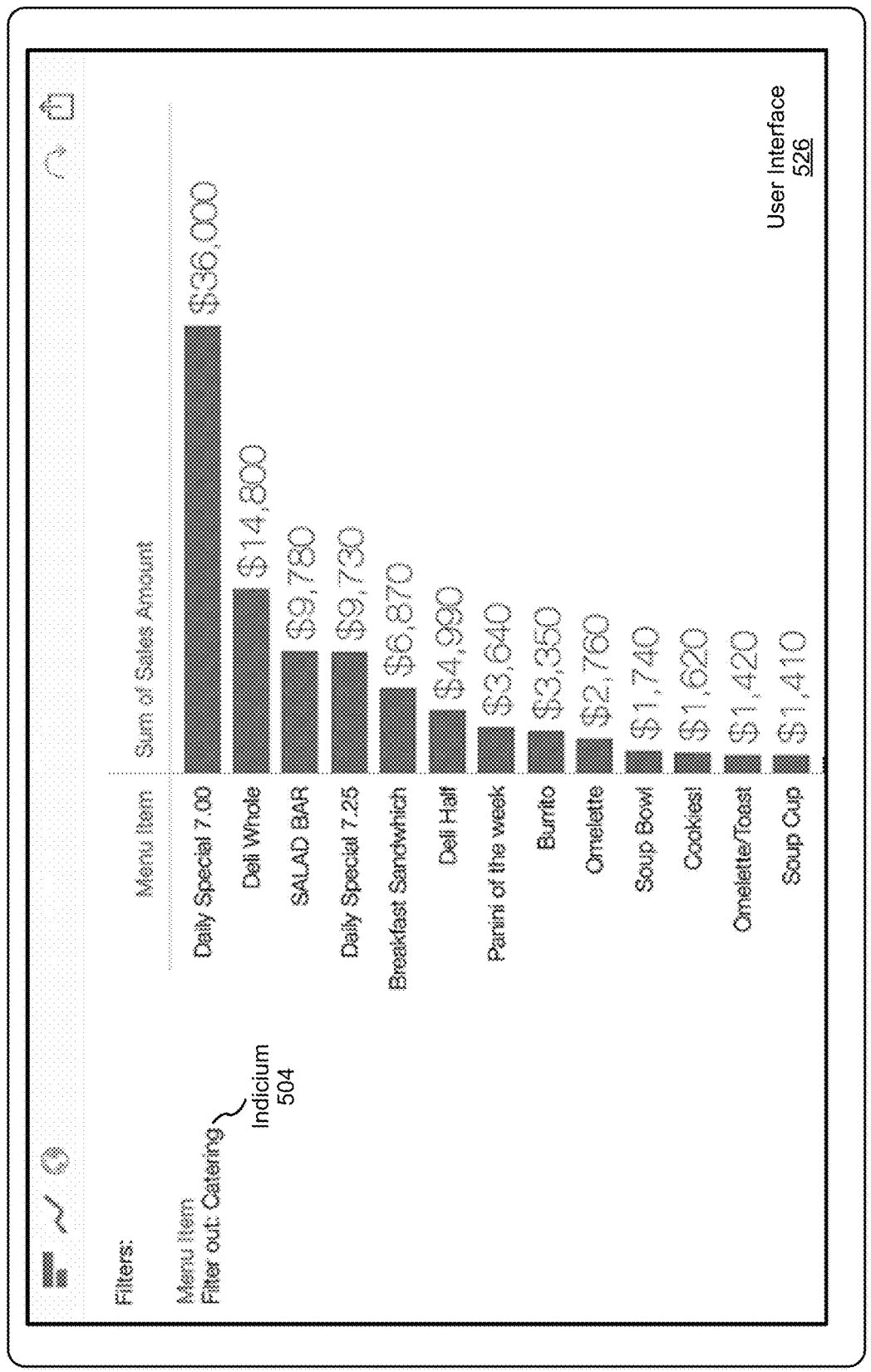

FIGS. 5A-5G illustrate user interfaces for adjusting chart filters, in accordance with some embodiments. FIG. 5A shows UI 450 including category 502-1 and category label 408-1. FIG. 5A also shows contact 510 detected at position 510-*a* corresponding to the visual mark (e.g., a bar corresponding to category 502-1) for category 502-1. FIG. 5B shows UI 520 including contact 510 detected at position 510-*b* and the visual mark for category 502-1 moving in concert with movement of contact 510 via an animated transition. FIG. 5C shows UI 522 including contact 510 detected at position 510-*c* and the visual mark for category 502-1 continuing to move in concert with movement of contact 510 via an animated transition. FIG. 5C also shows indicium 504 indicating that category 502-1 (Catering) is being filtered out of the data as a result of the current action (e.g., the movement of contact 510). FIG. 5D shows UI 524 including indicium 504, contact 510 detected at position 510-*d*, and the visual mark for category 502-1 continuing to move in concert with movement of a contact 510 via an animated transition. FIG. 5E shows UI 526 including indicium 504 and the removal of the visual mark for category 502-1 from the chart.

Figure 5F:
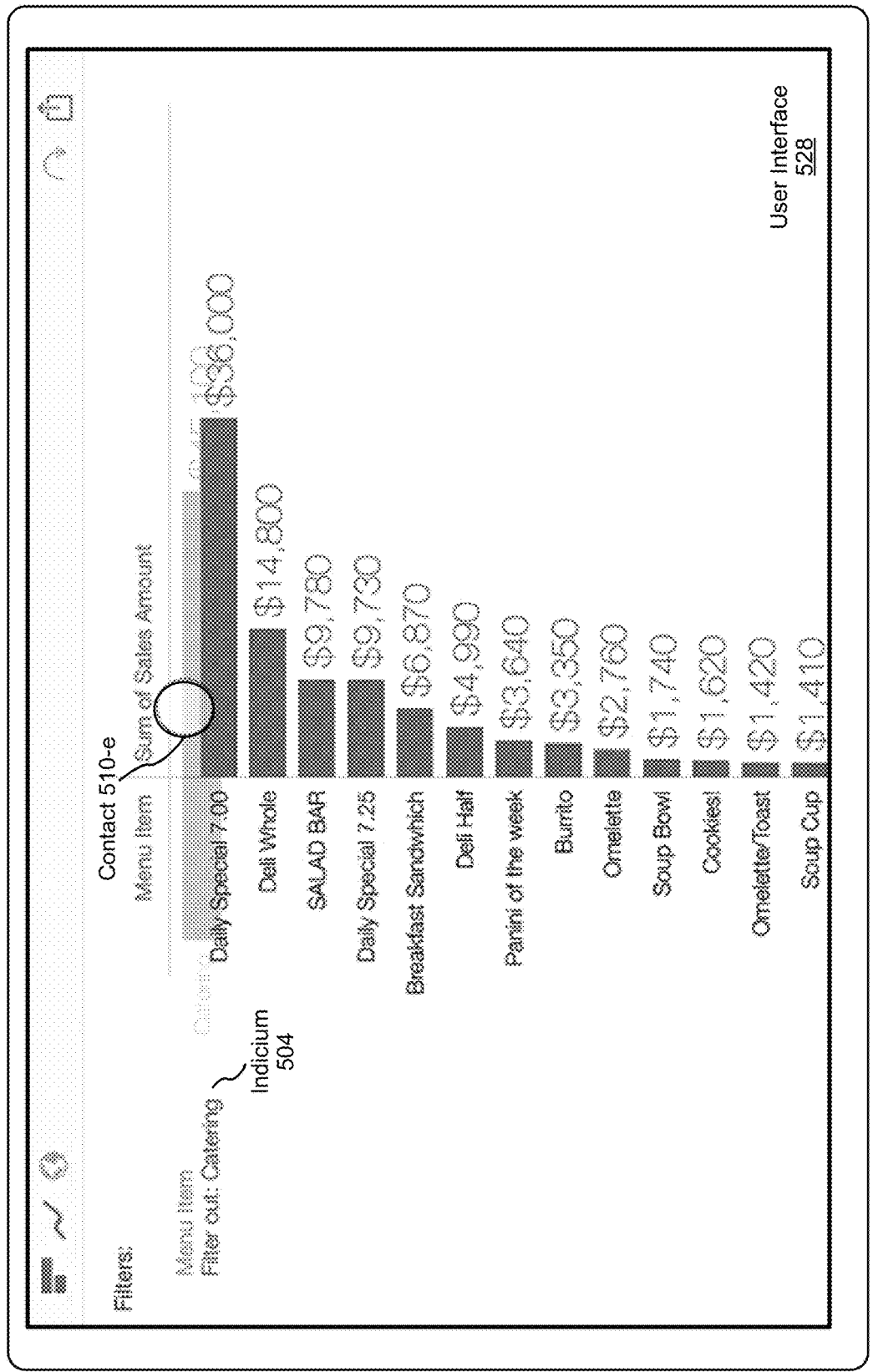
Figure 5G:
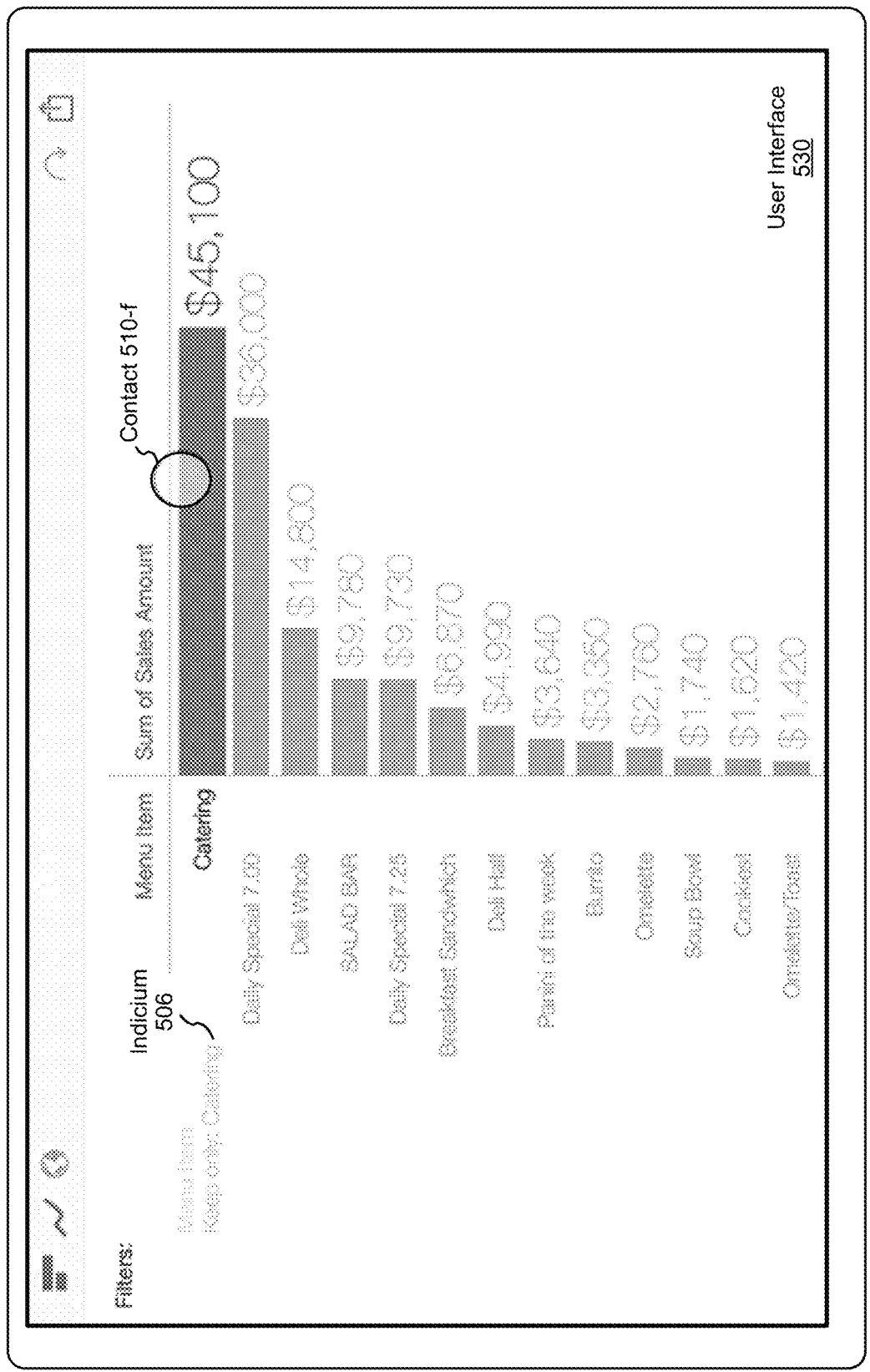

FIG. 5F shows UI 528 including indicium 504, contact 510 detected at position 510-*e*, and the visual mark for category 502-1 continuing to move in concert with movement of a contact 510 via an animated transition. FIG. 5G shows UI 530 including indicium 506, contact 510 detected at position 510-*f*, and the visual mark for category 502-1 continuing to move in concert with movement of a contact 510 via an animated transition. In some embodiments, as shown in FIGS. 5A-5E, the first category and the first visual mark are removed from the chart via an animated transition in response to contact 510 moving to a pre-defined location. In some embodiments, as shown in FIGS. 5F-5G, the first category and the first visual mark are added back to the chart via an animated transition in response to contact 510 moving away from the pre-defined location.

Figure 6A:
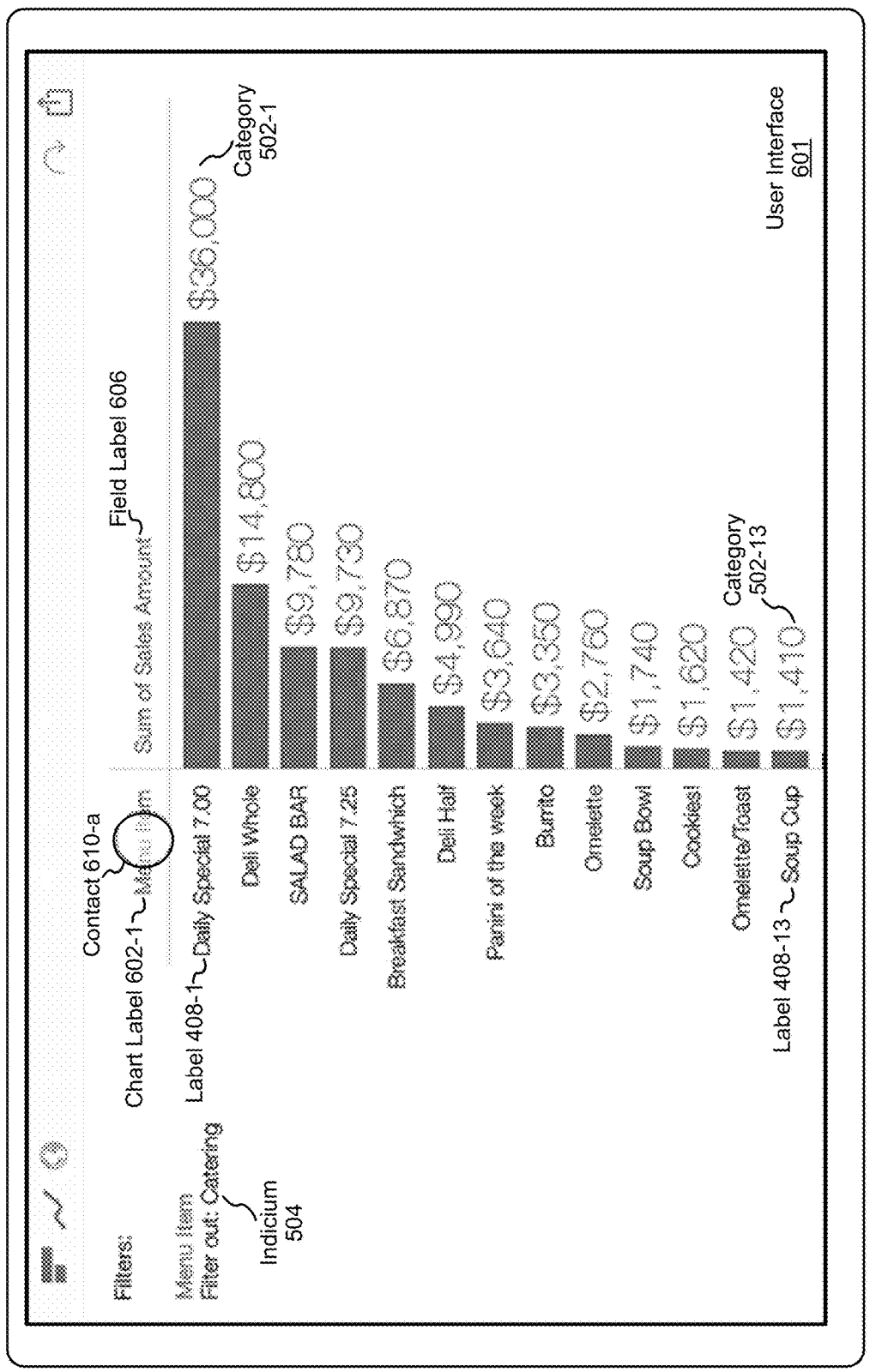
FIGS. 6A-6L illustrate user interfaces for changing chart categories, in accordance with some embodiments.
Figure 6B:
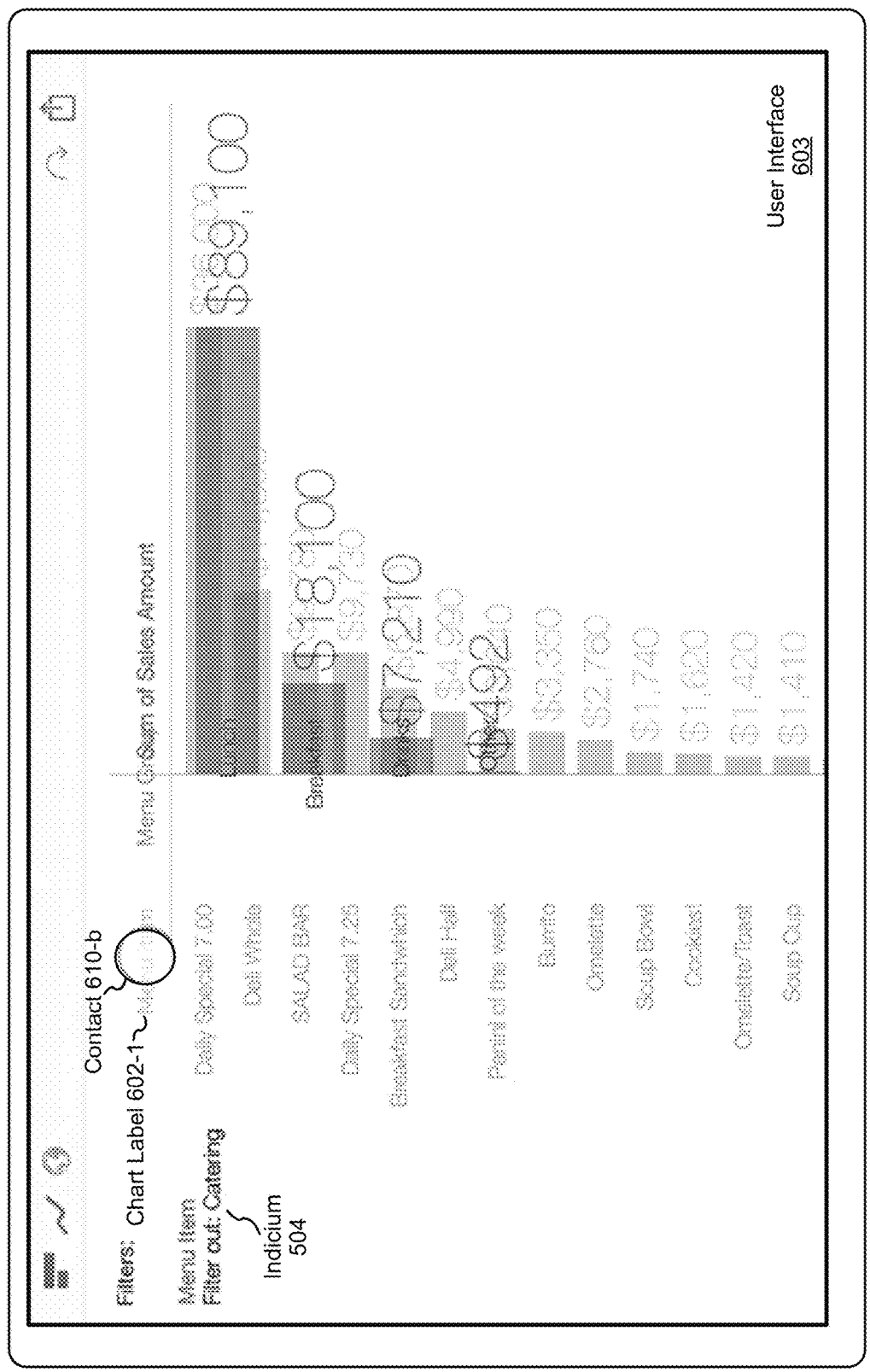
Figure 6C:

FIGS. 6A-6L illustrate user interfaces for changing chart categories, in accordance with some embodiments. FIG. 6A shows UI 601 including a chart with chart label 602-1 (Menu Item) and categories 502 (including categories 502-1 through 502-13) with category labels 408. FIG. 6A also shows contact 610 detected at position 610-*a* corresponding to chart label 602-1. FIGS. 6B and 6C show contact 610 moving to position 610-*b* and 610-*c* respectively and the first chart with chart label 602-1 (Menu Item) being replaced by a second chart with chart label 602-2 (Menu Group) via an animated transition. FIGS. 6B and 6C also show chart categories 502 being replaced by categories 604 via an animated transition, and category labels 408 being replaced by category labels 606 via an animated transition.

Figure 6D:
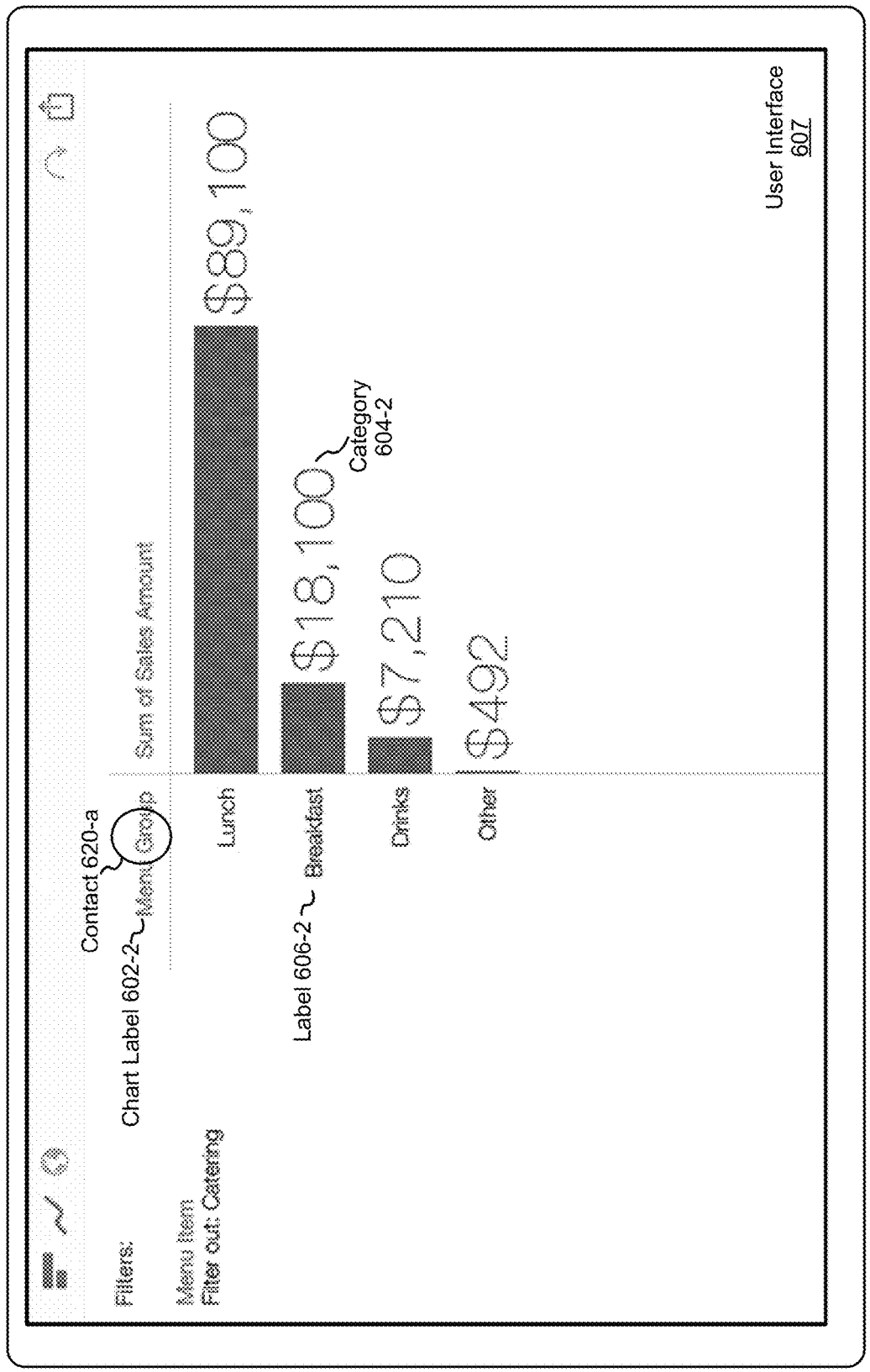
Figure 6E:
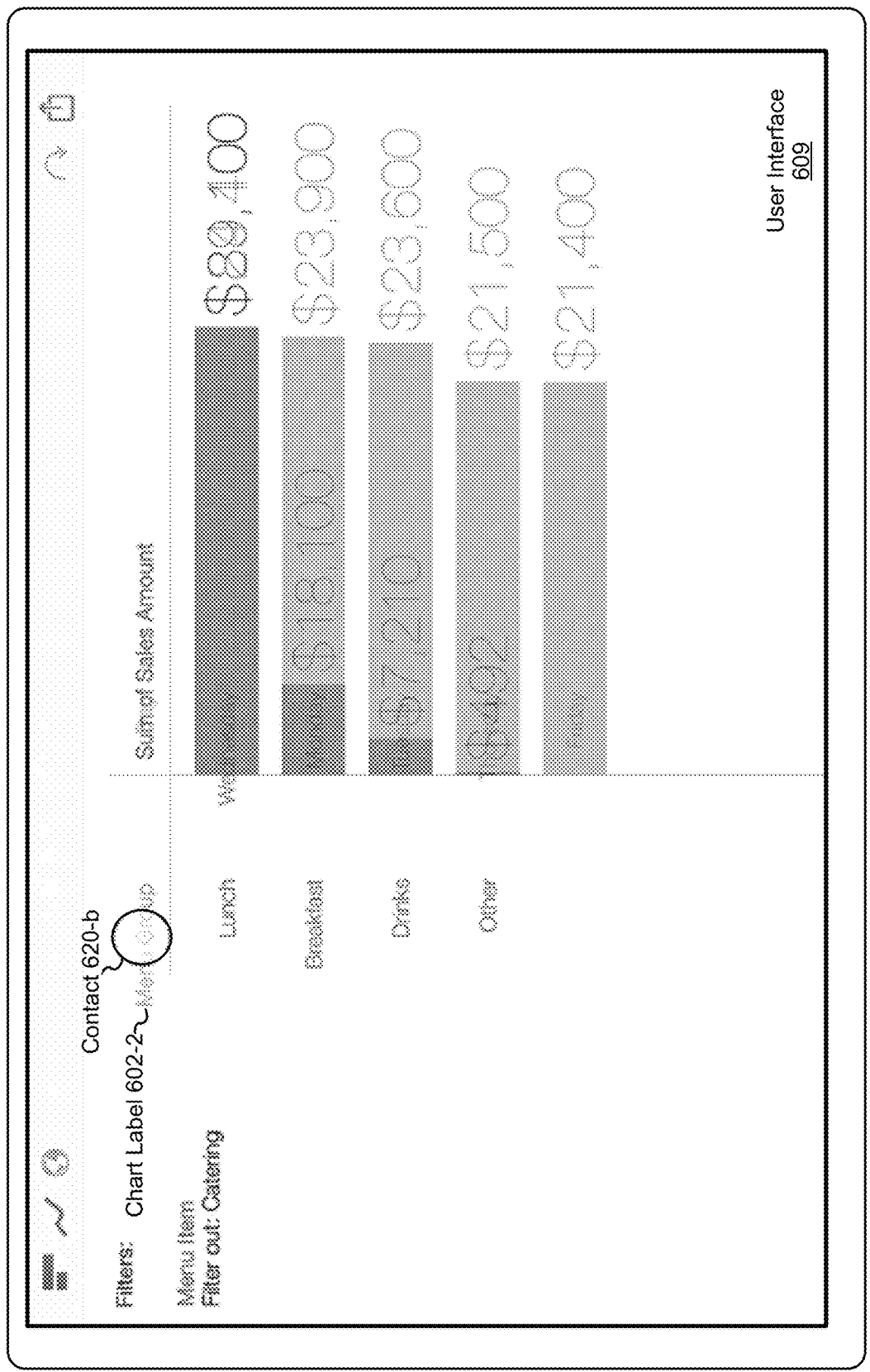
Figure 6F:
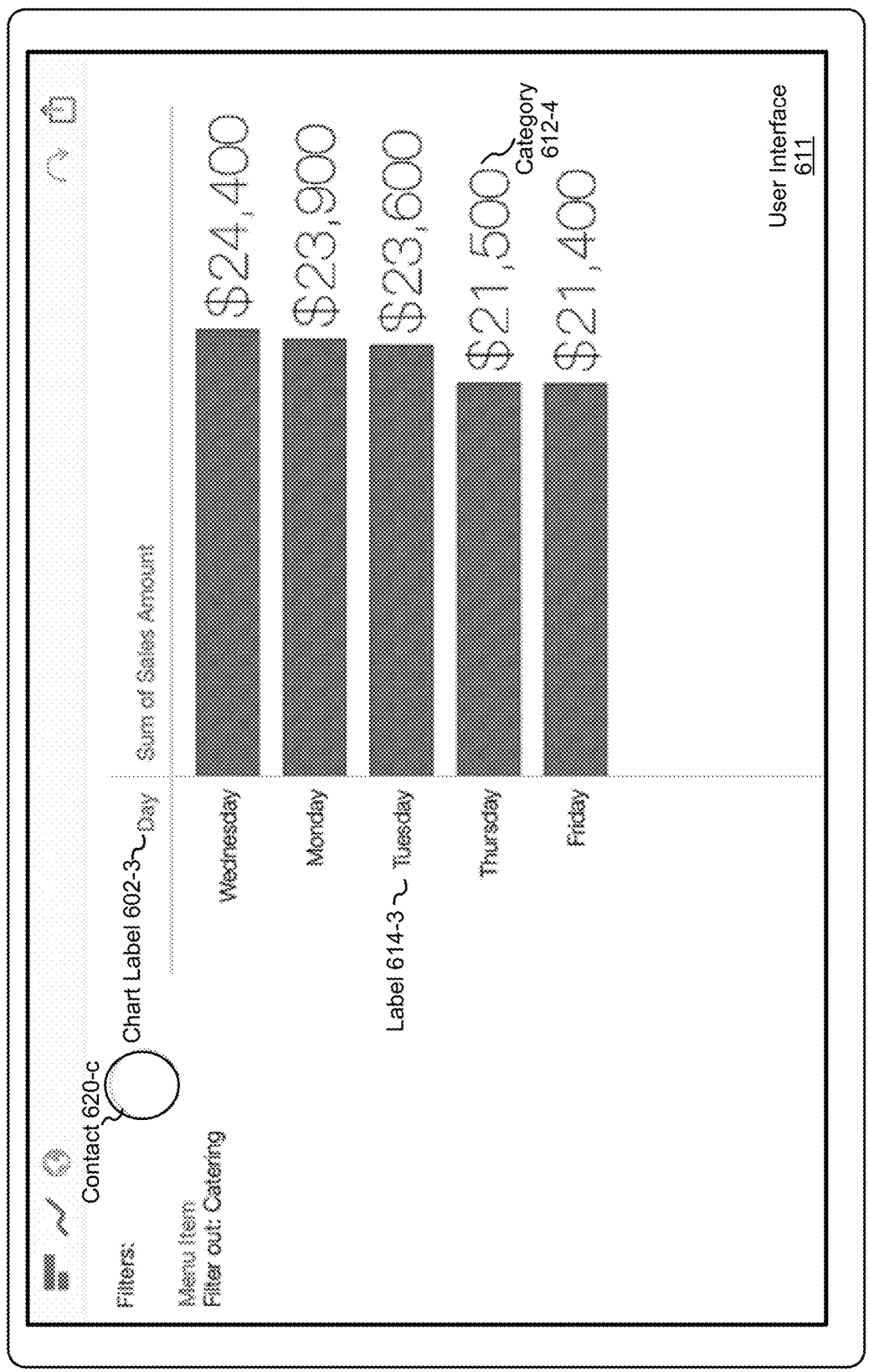

FIG. 6D shows UI 607 including the second chart with chart label 602-2 (Menu Group) and categories 604 with category labels 606. FIG. 6D also shows contact 620 detected at position 620-a corresponding to chart label 602-2. FIGS. 6E and 6F show contact 620 moving to positions 620-b and 620-c respectively and the second chart with chart label 602-2 (Menu Group) being replaced by a third chart with chart label 602-3 (Day) via an animated transition. FIGS. 6E and 6F also show chart categories 604 being replaced by categories 612 via an animated transition, and category labels 606 being replaced by category labels 614 via an animated transition.

Figure 6G:
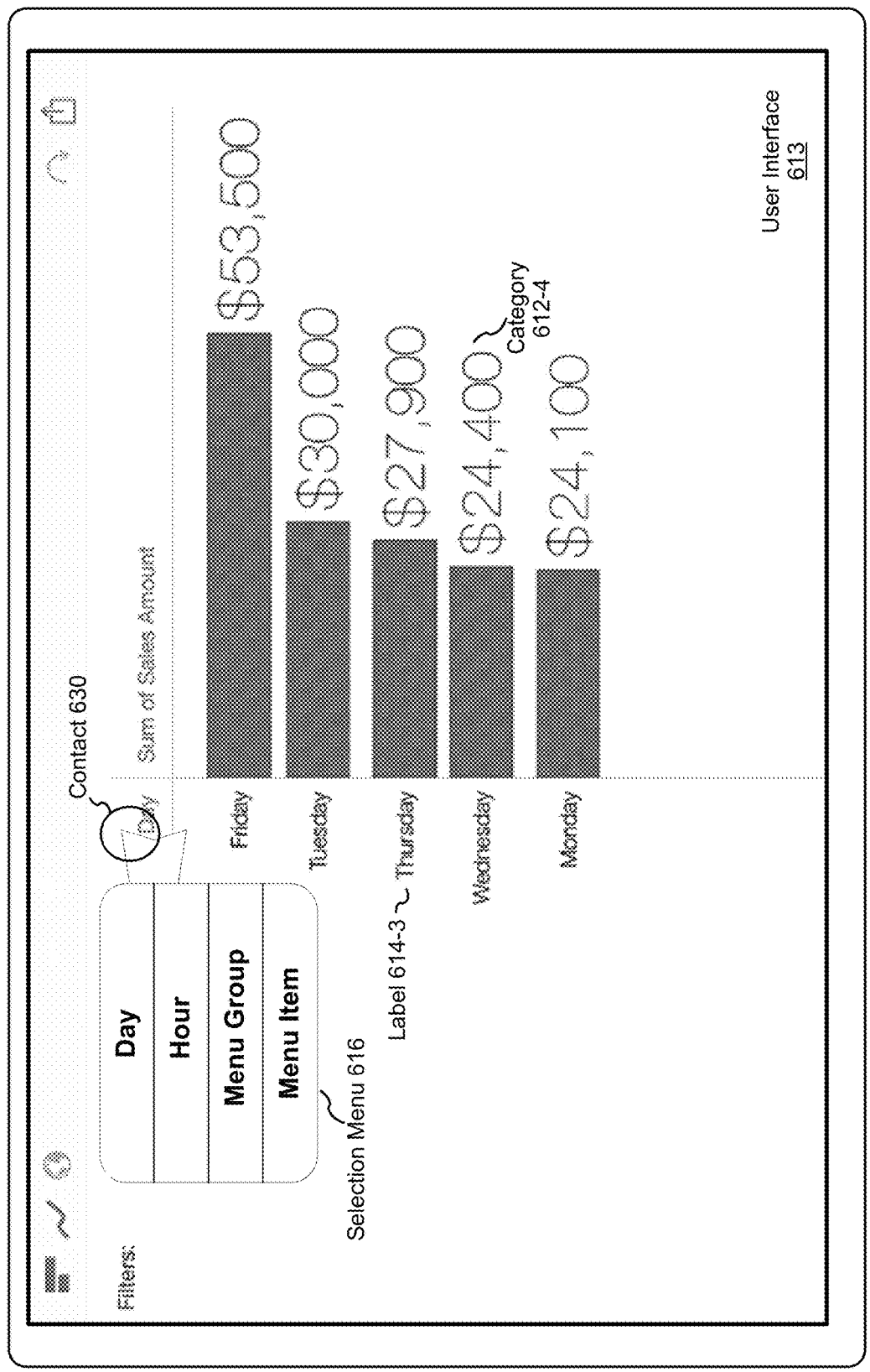
Figure 6H:
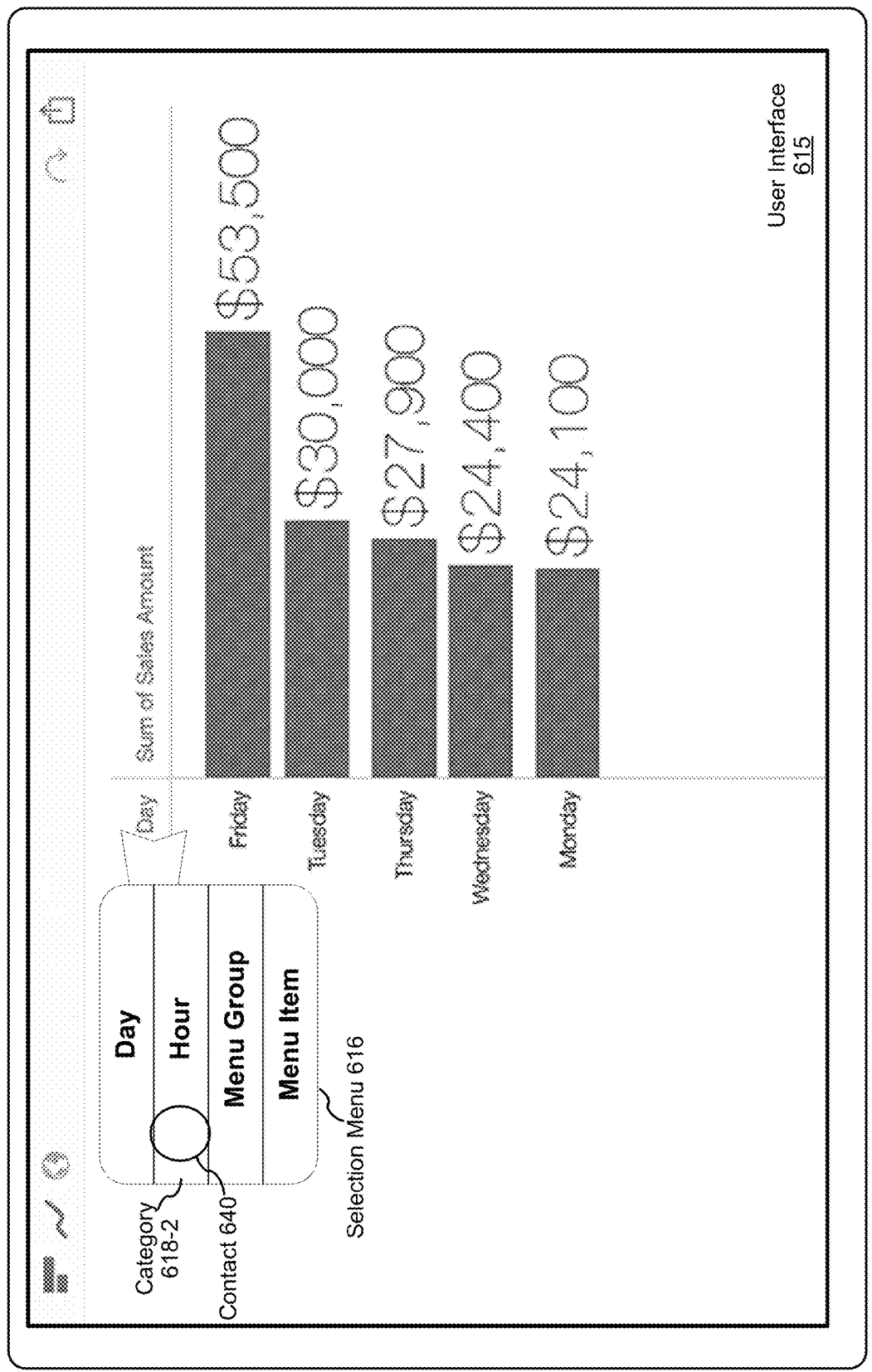
Figure 6I:
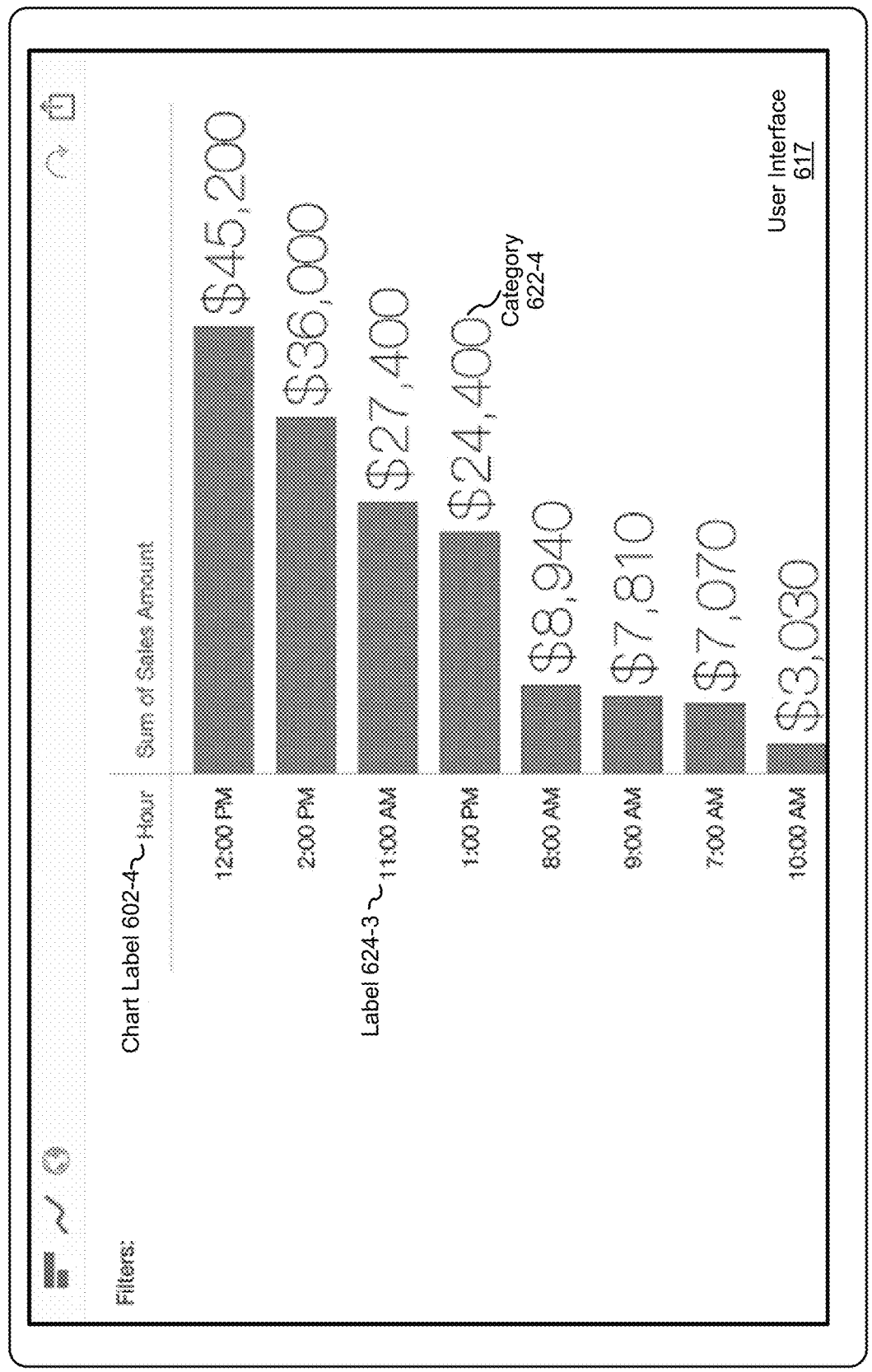

FIG. 6G shows UI 613 including the third chart with chart label 602-3 (Day) and categories 612 with category labels 614. FIG. 6G also shows contact 630 detected at a position corresponding to chart label 602-3 and selection menu 616 displayed. In some embodiments, contact 630 is detected and identified as a tap input and selection menu 616 is displayed in response. FIG. 6H shows UI 615 with selection menu 616 including selection categories 618. FIG. 6H also shows contact 640 detected at a position corresponding to selection category 618-2. FIG. 6I shows UI 617 including a fourth chart with chart label 602-4 (Hour) and categories 622 with category labels 624. In some embodiments, the chart shown in FIG. 6I replaces the chart shown in FIG. 6H in response to the detection of contact 640 at a position corresponding to selection category 618-2.

Figure 6J:
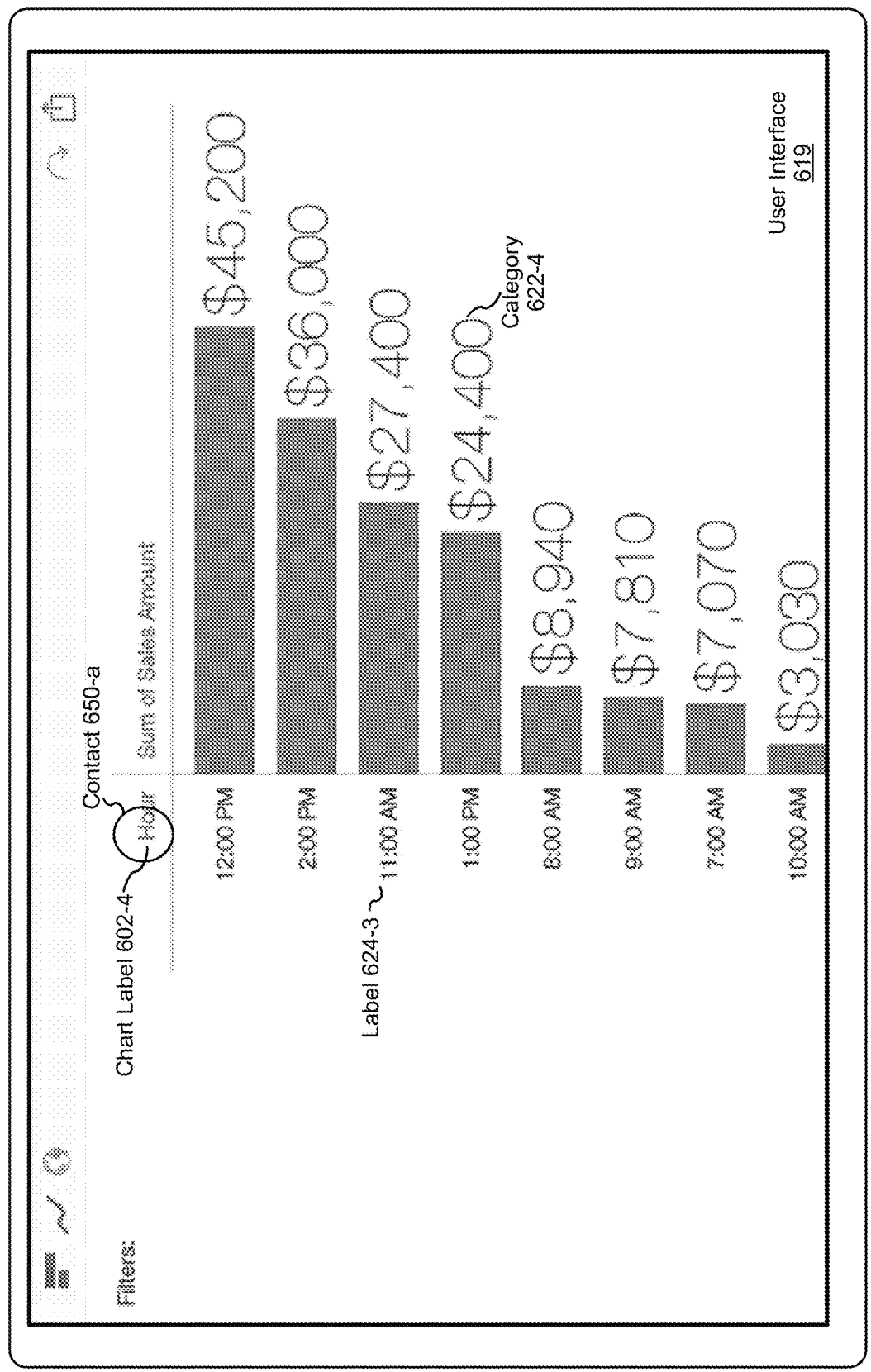
Figure 6K:
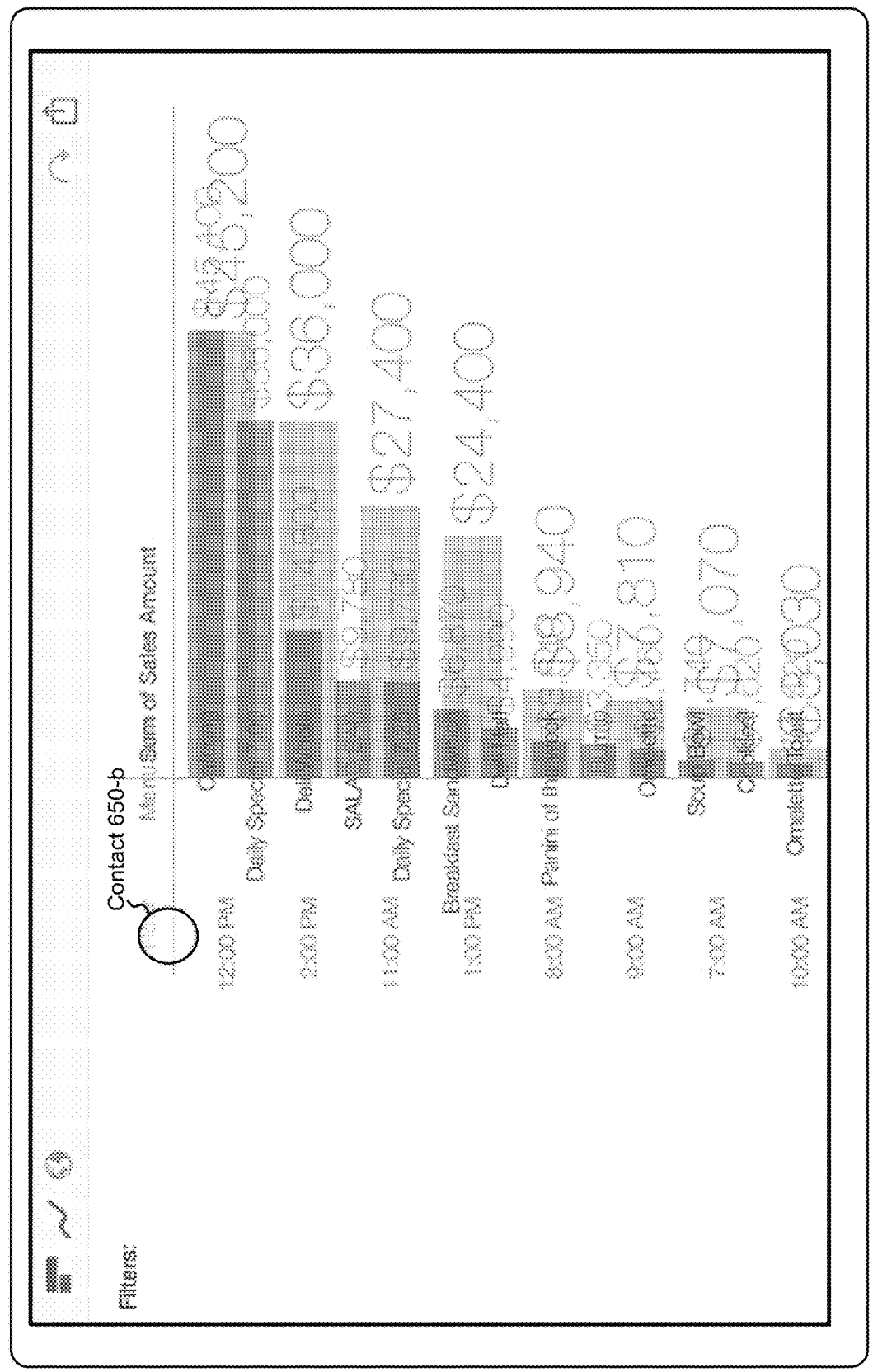
Figure 6L:
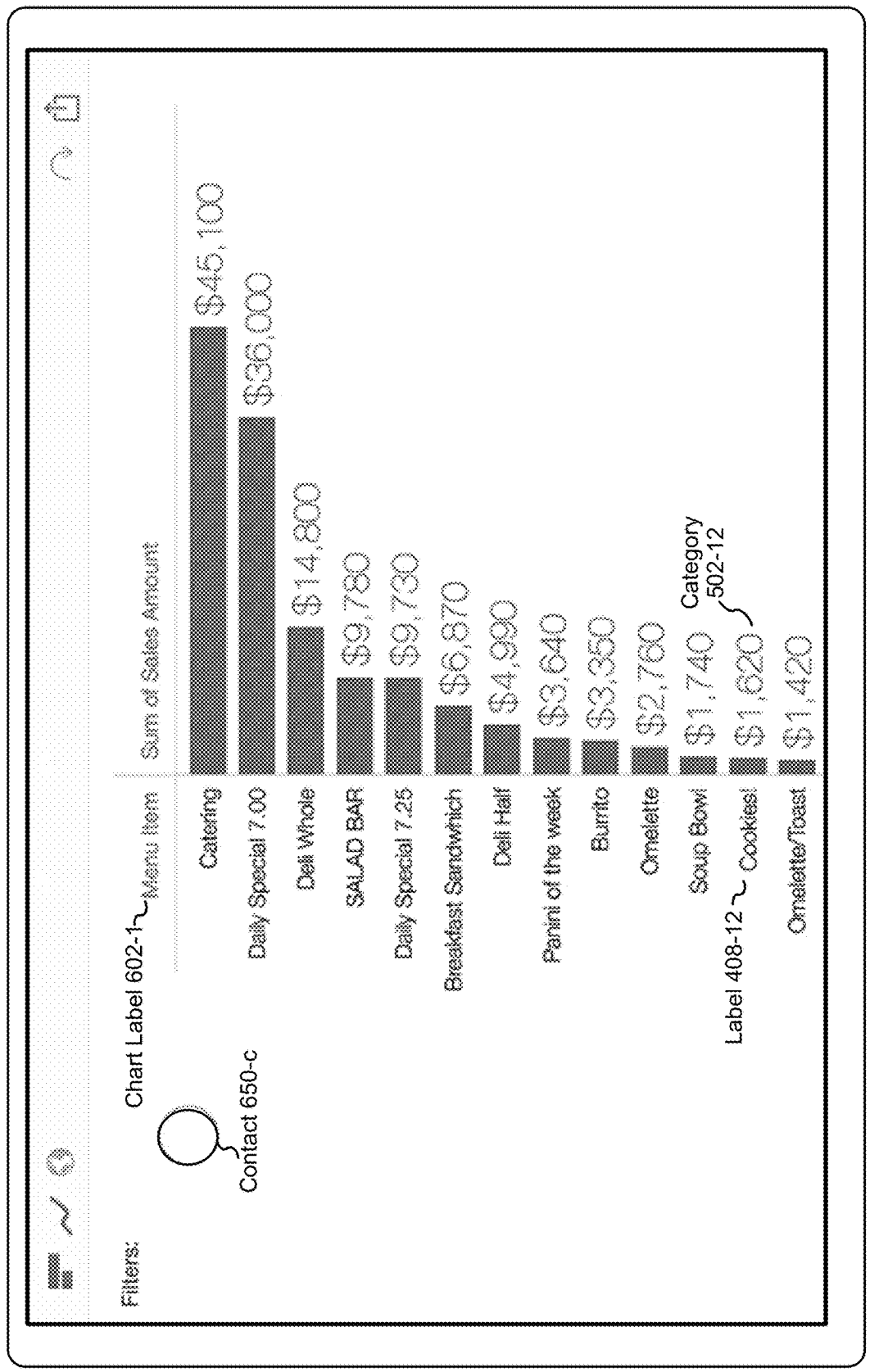

FIG. 6J shows UI 619 including the fourth chart with chart label 602-4 (Hour) and categories 622 with category labels 624. FIG. 6J also shows contact 650 detected at position 650-a corresponding to chart label 602-4. FIGS. 6K and 6L show contact 650 moving to positions 650-b and 650-c respectively and the fourth chart with chart label 602-4 (Hour) being replaced by the first chart with chart label 602-1 (Menu Item) via an animated transition. FIGS. 6K and 6L also show chart categories 622 being replaced by categories 502 via an animated transition, and category labels 624 being replaced by category labels 408 via an animated transition.

Figure 7A:
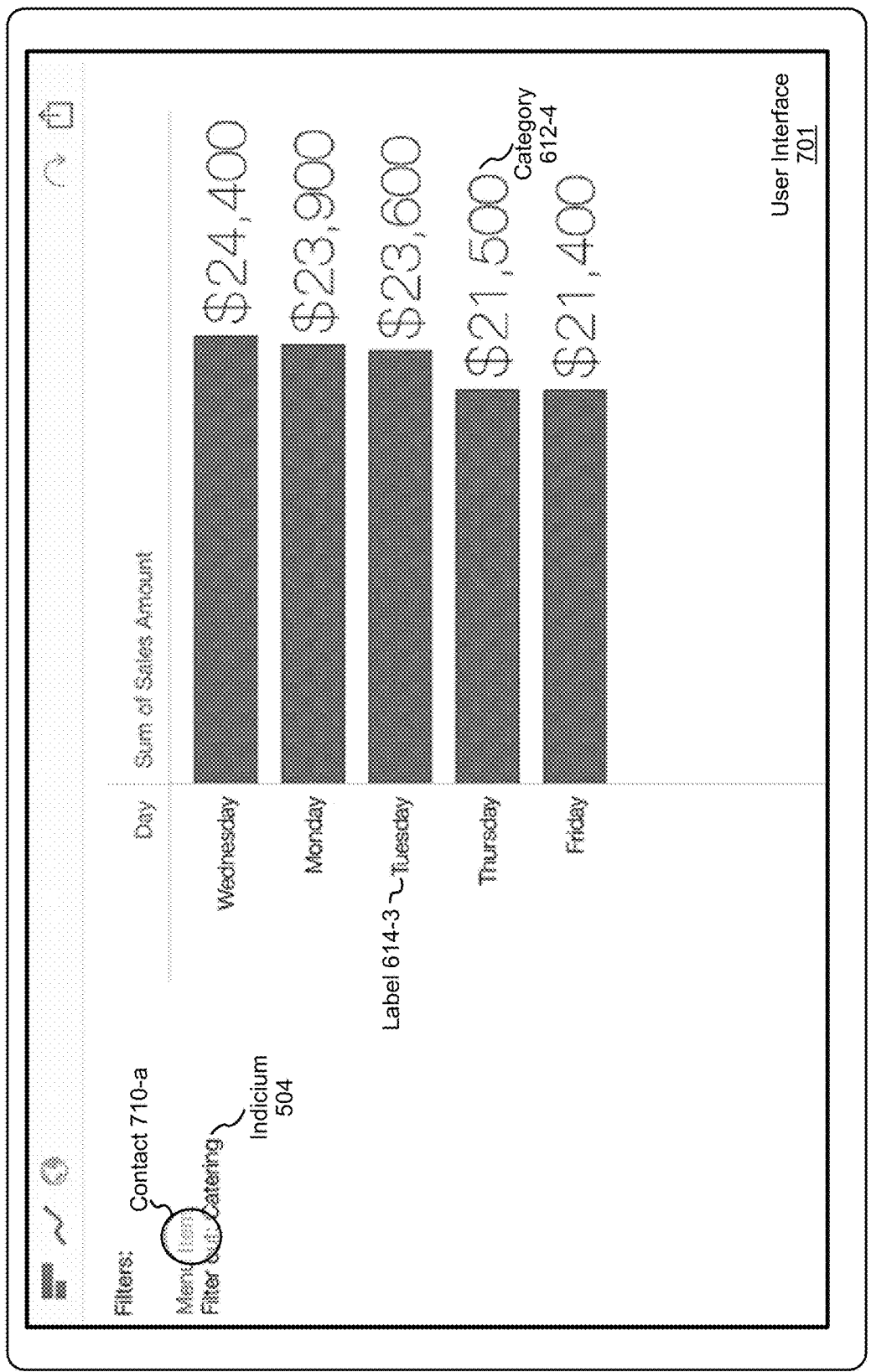
FIGS. 7A-7D illustrate user interfaces for adjusting chart filters, in accordance with some embodiments.
Figure 7B:
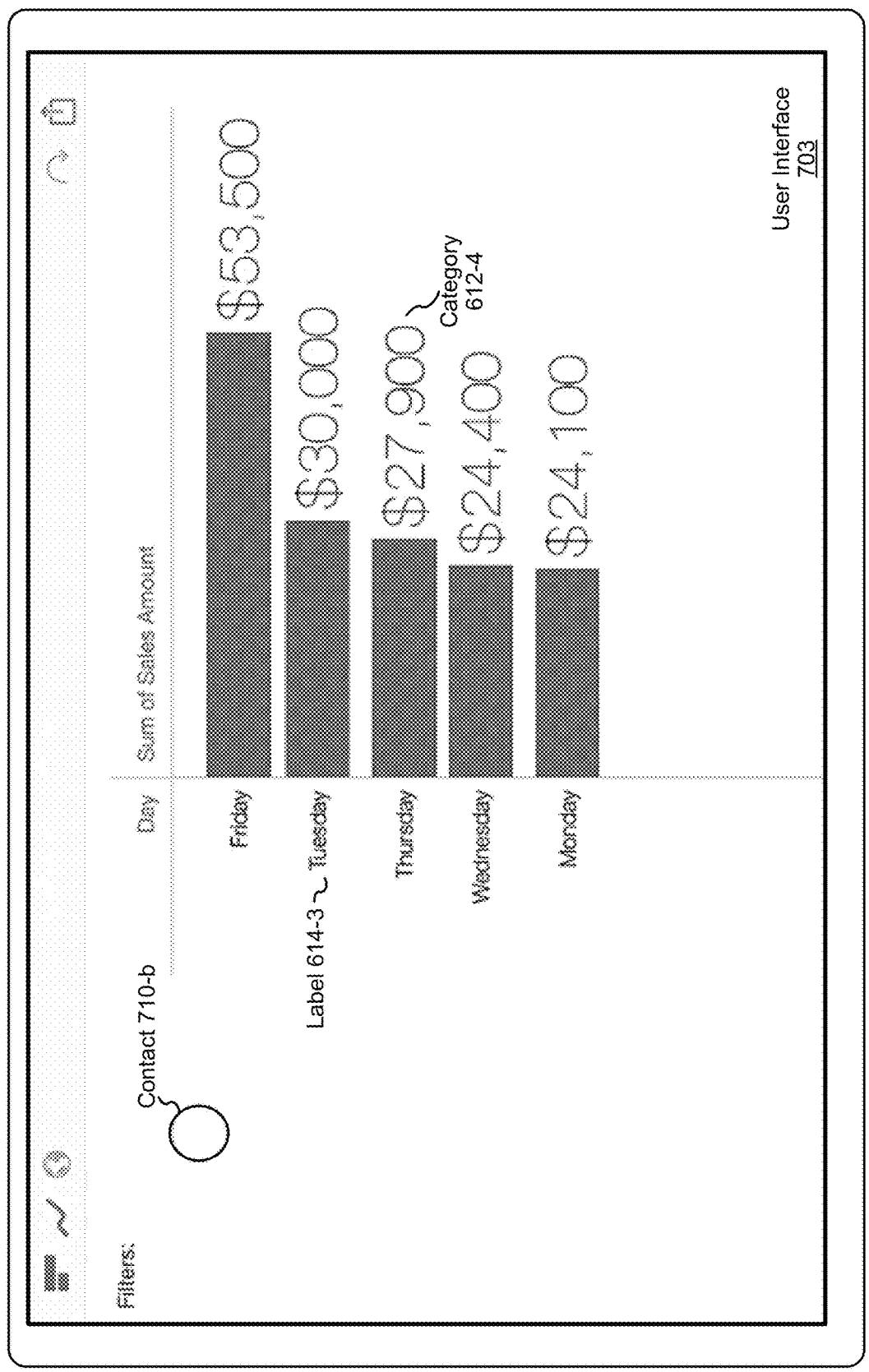
Figure 7C:
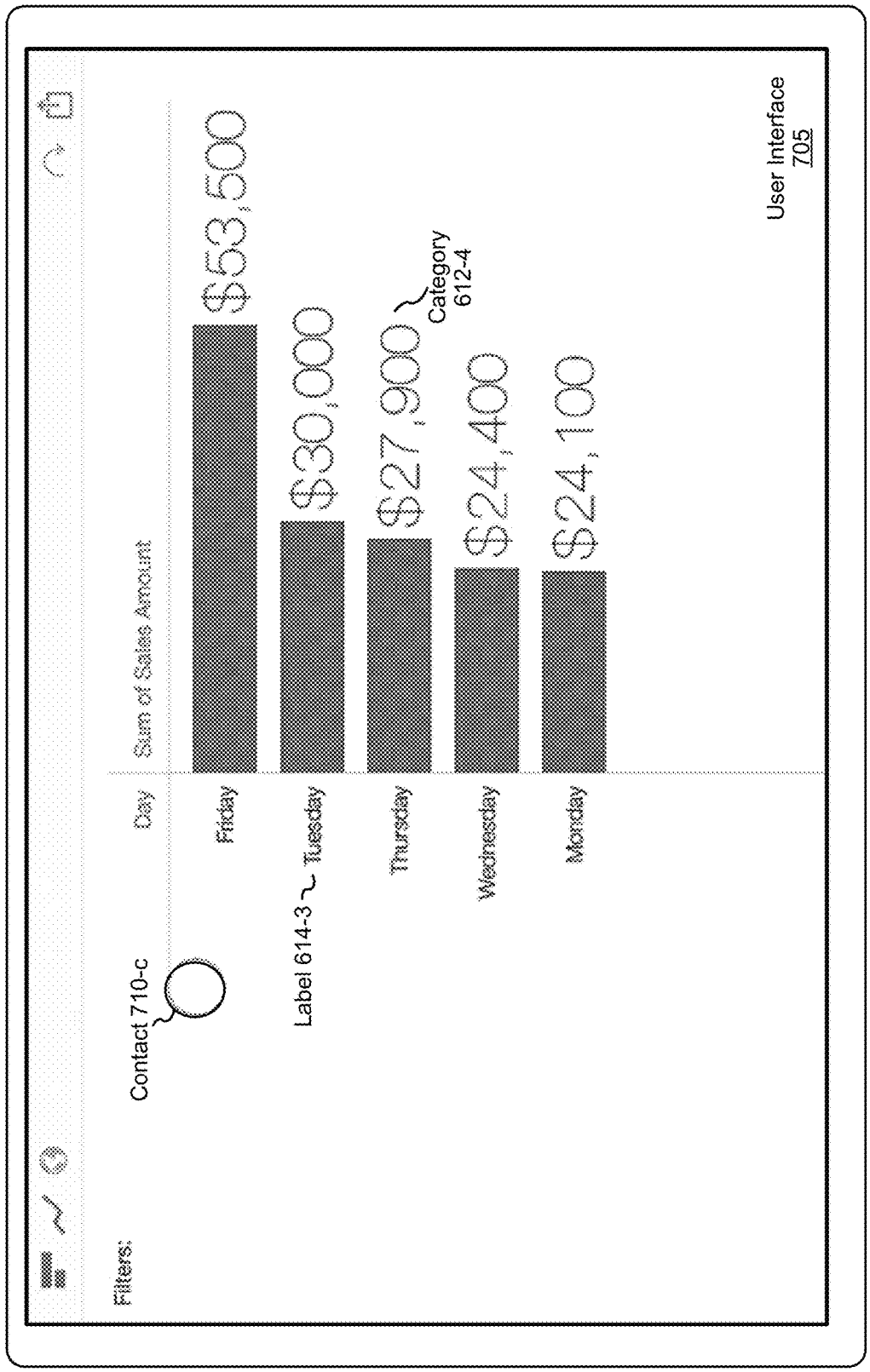

FIGS. 7A-7D illustrate user interfaces for adjusting chart filters, in accordance with some embodiments. FIG. 7A shows UI 701 including a chart with categories 612 (including category 612-4) and corresponding category labels 614. FIG. 7A also shows indicium 504 indicating that data corresponding to category 502-1 has been filtered out of the chart. FIG. 7A further shows contact 710 detected at position 710-a corresponding to indicium 504. FIGS. 7B and 7C show contact 710 moving to positions 710-b and 710-c respectively and the removal of indicium 504 along with the chart updating reflect inclusion of data that corresponds to category 502-1. FIGS. 7B and 7C also show categories 612 reordered to reflect inclusion of the data corresponding to category 502-1.

Figure 7D:
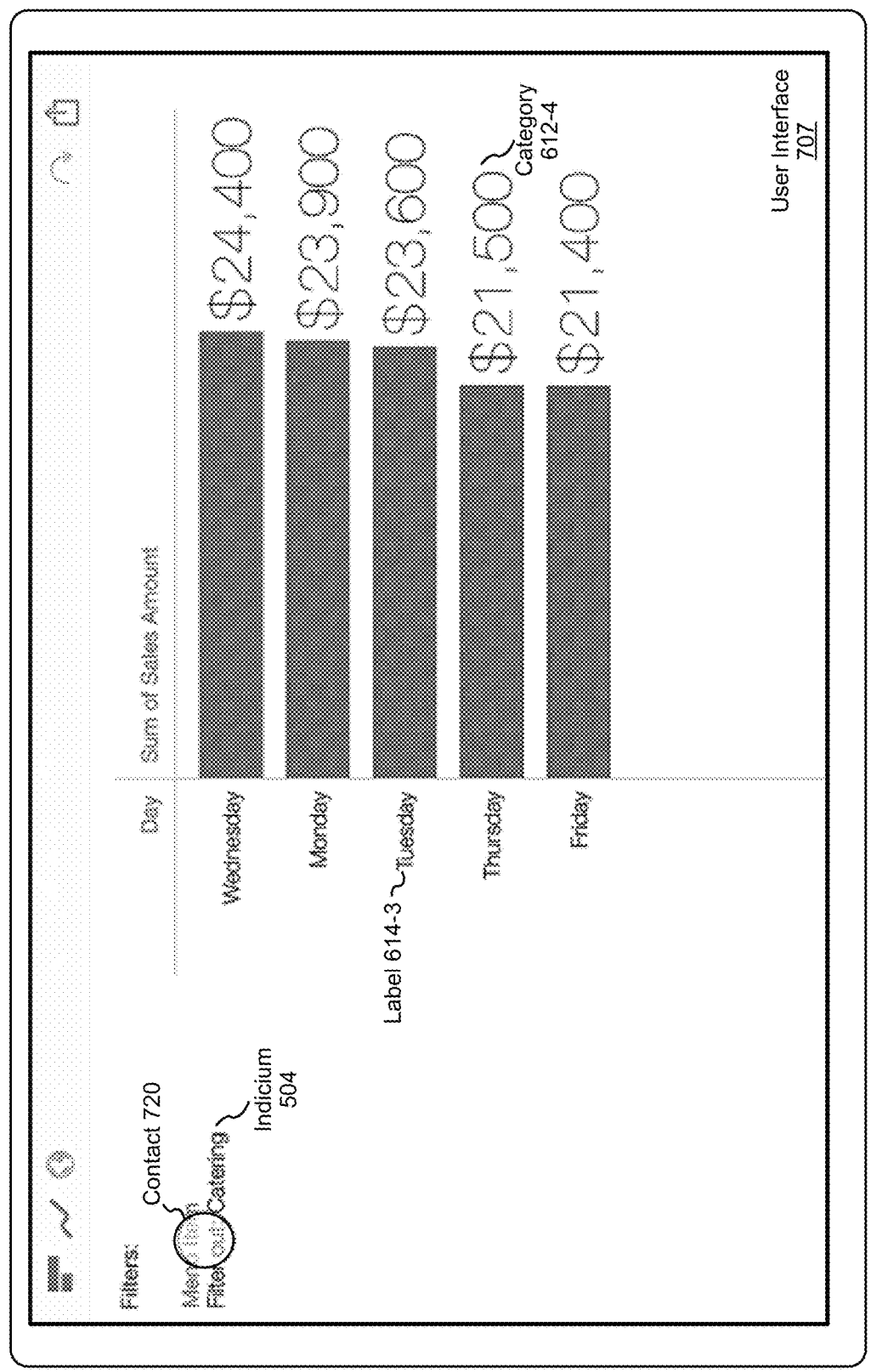

FIG. 7D shows UI 707 including indicium 504, contact 720 detected at a position corresponding to indicium 504, and categories 612. In some embodiments, as shown in FIGS. 7A-7C, the chart is updated to reflect inclusion of data that corresponds to category 502-1 in response to contact 710 moving from a pre-defined location or area on the UI. In some embodiments, as shown in FIG. 7D, the chart is updated to reflect exclusion of data that corresponds to category 502-1 in response to contact 720.

Figure 8A:
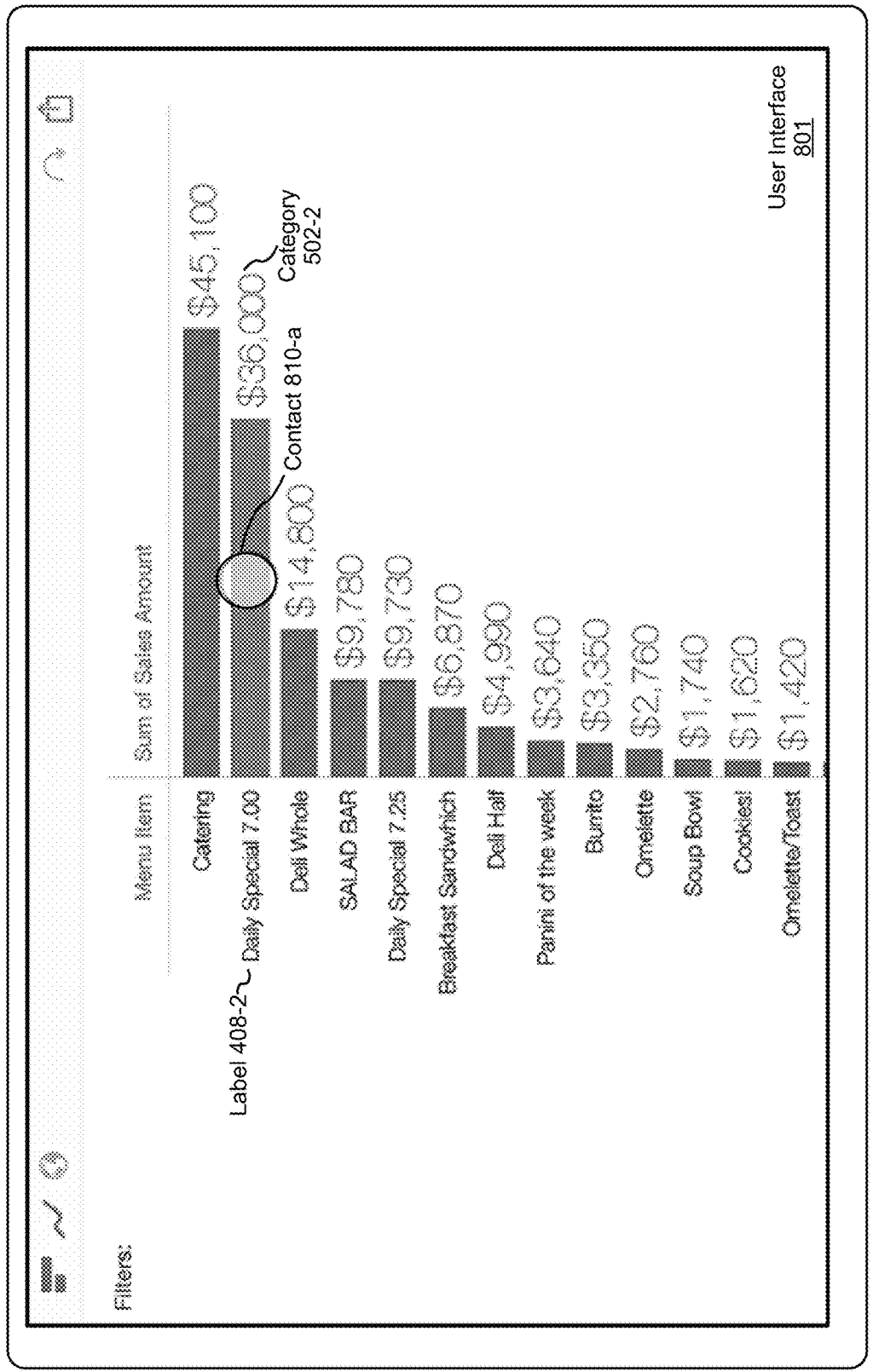
FIGS. 8A-8D illustrate user interfaces for adjusting chart filters, in accordance with some embodiments.
Figure 8B:
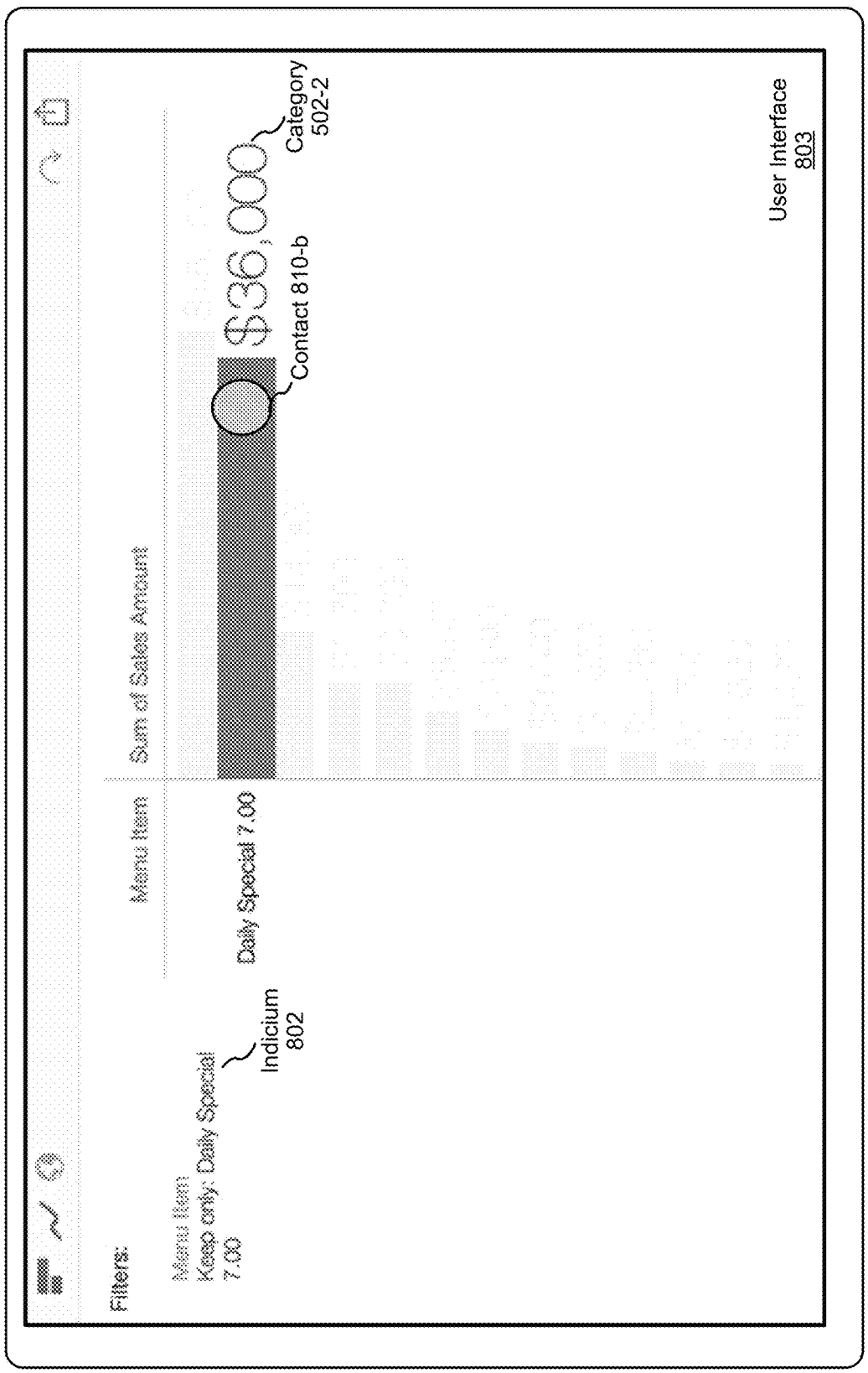
Figure 8C:
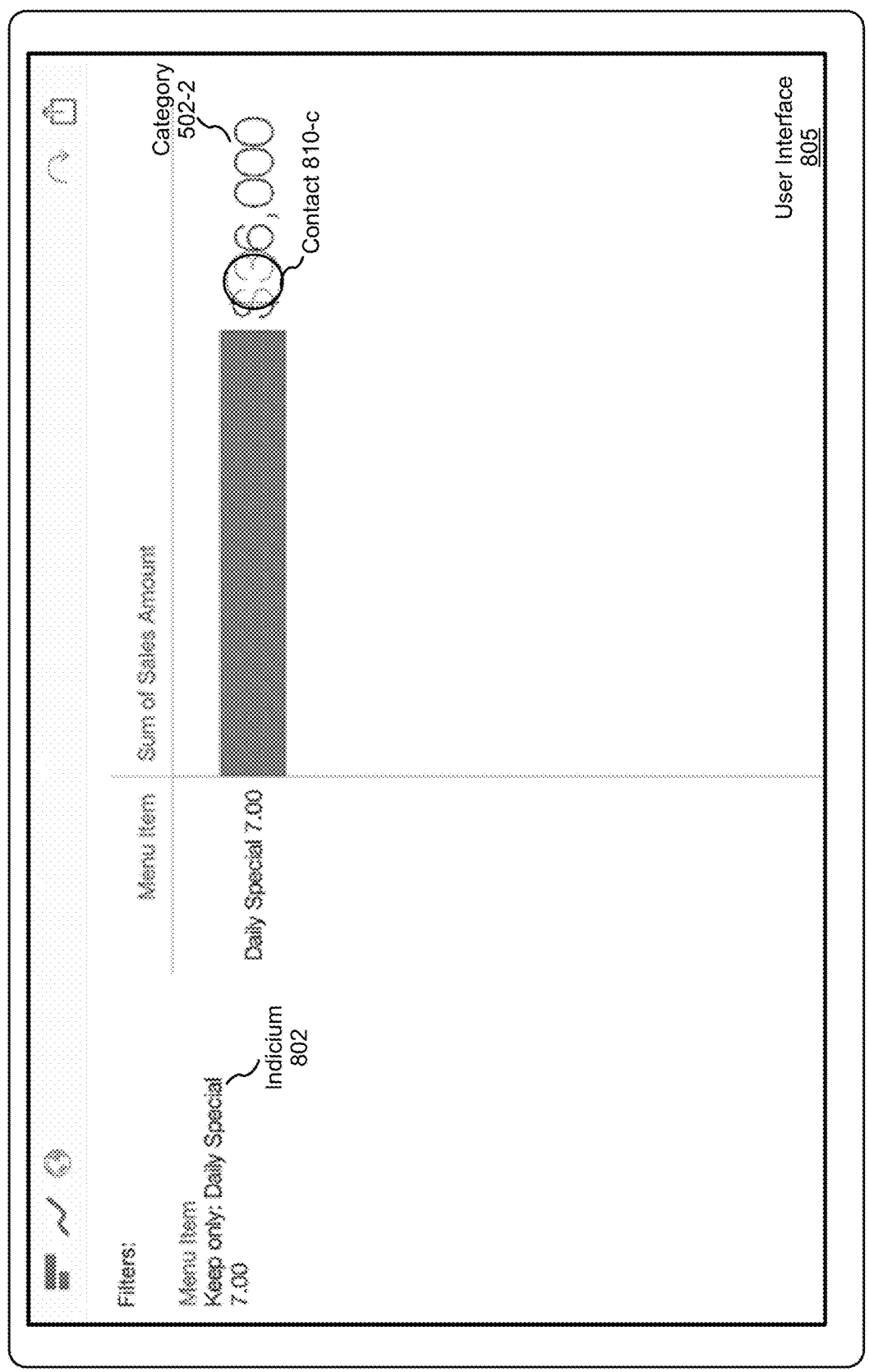
Figure 8D:
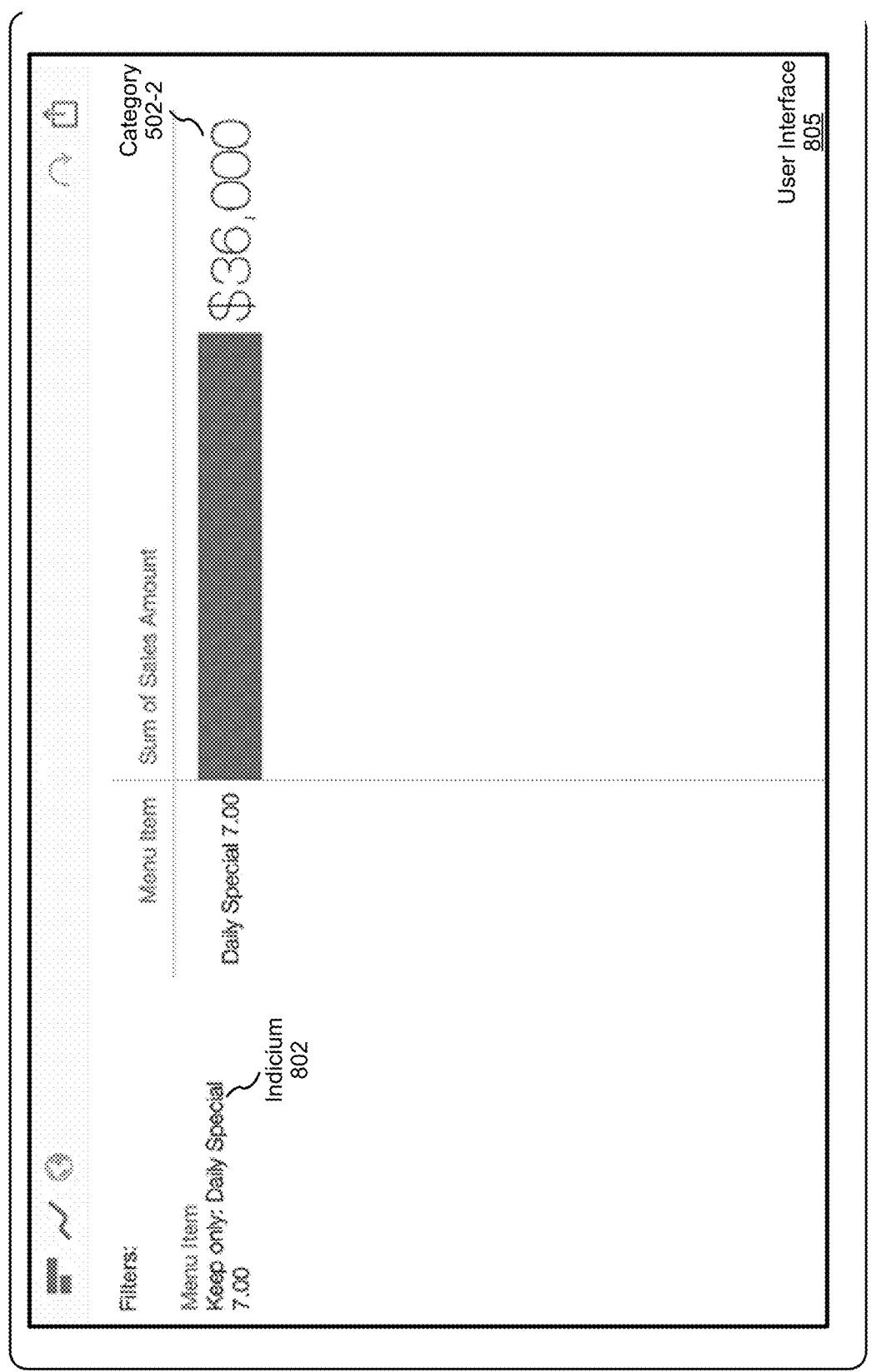

FIGS. 8A-8D illustrate user interfaces for adjusting chart filters, in accordance with some embodiments. FIG. 8A shows UI 801 including category 502-2 and category label 408-2. FIG. 8A also shows contact 810 detected at position 810-a corresponding to the visual mark for category 502-2 (e.g., a bar corresponding to category 502-2). FIGS. 8B and 8C show contact 810 moving to positions 810-b and 810-c respectively and the visual mark for category 502-2 moving in concert with movement of contact 810 via an animated transition. FIGS. 8B and 8C also show indicium 802 indicating that only the data corresponding to category 502-2 is being included as a result of the current action (e.g., the movement of contact 810). FIG. 8D shows UI 805 including indicium 802 and the removal of the visual mark for all categories except for category 502-1.

Figure 9A:
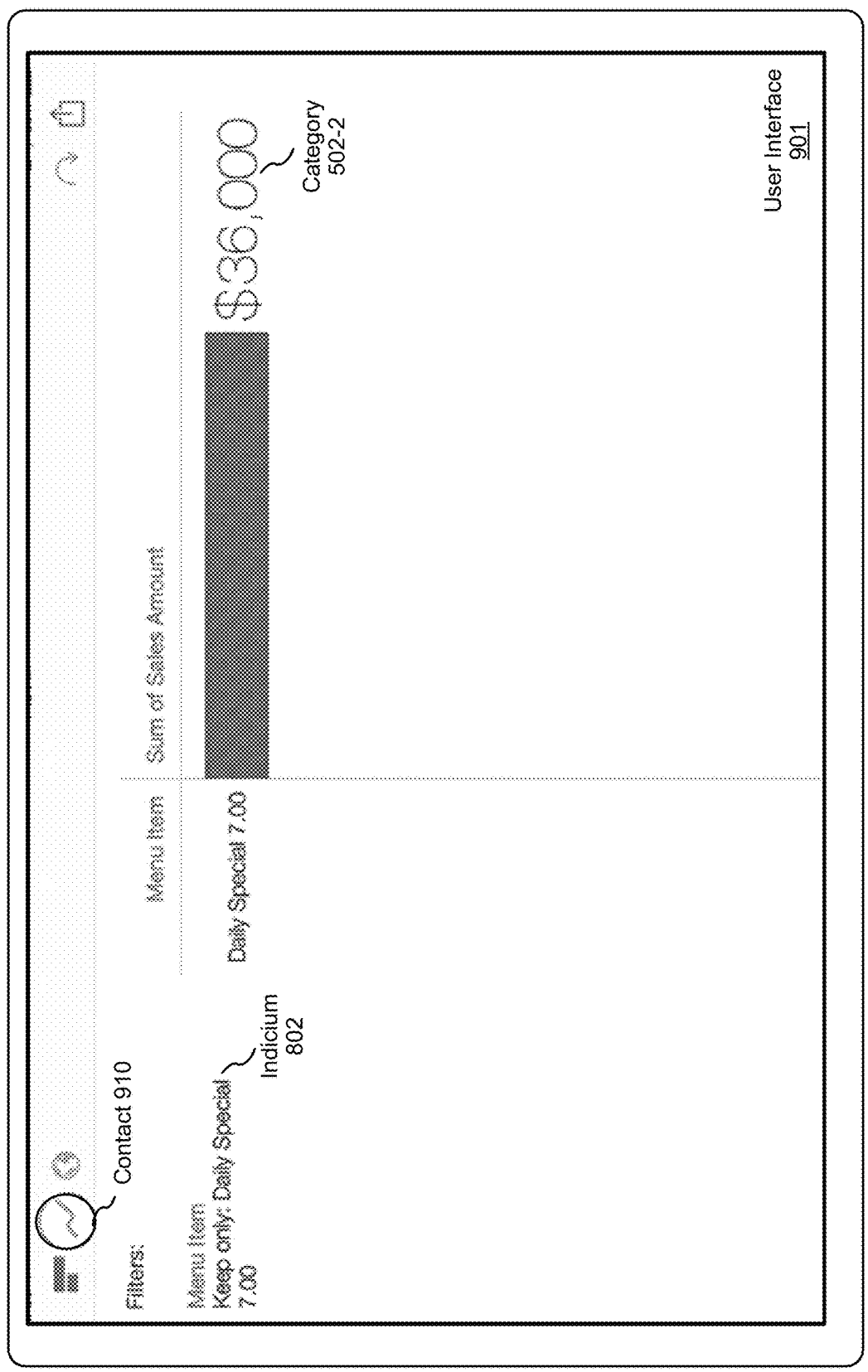
FIGS. 9A-9B illustrate user interfaces for changing chart views, in accordance with some embodiments.
Figure 9B:
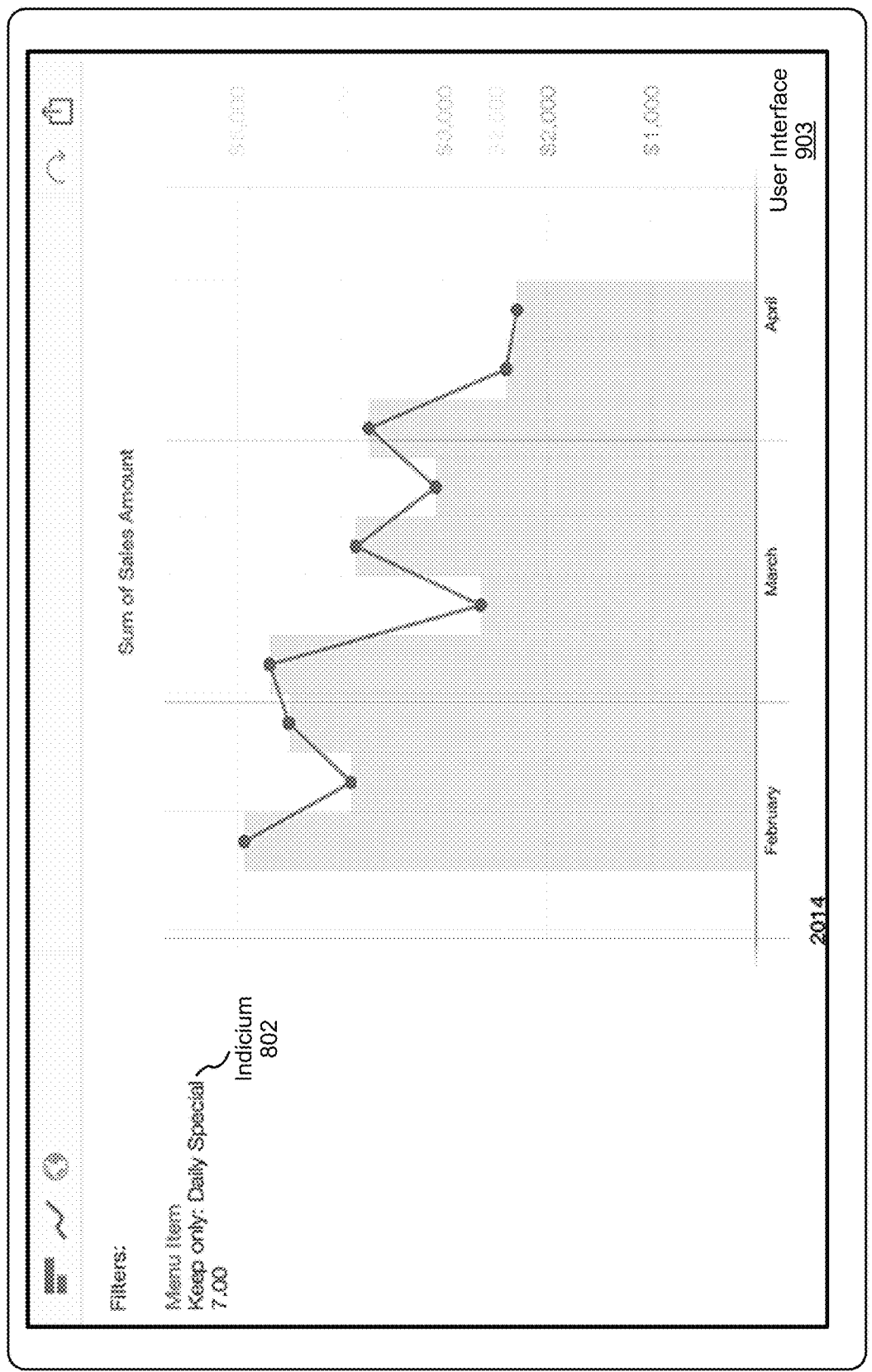

FIGS. 9A-9B illustrate user interfaces for changing chart views, in accordance with some embodiments. FIG. 9A shows UI 901 including indicium 802 and a bar chart with category 502-2. FIG. 9A also shows contact 910 detected at a position on UI 901 that corresponds to a line chart graphical view. FIG. 9B shows UI 903 including indicium 802 and a line chart. In some embodiments, the bar chart shown in FIG. 9A is replaced by the line chart shown in FIG. 9B in response to detection of contact 910 at a position on UI 901 that corresponds to a line chart graphical view.

Figure 10A:
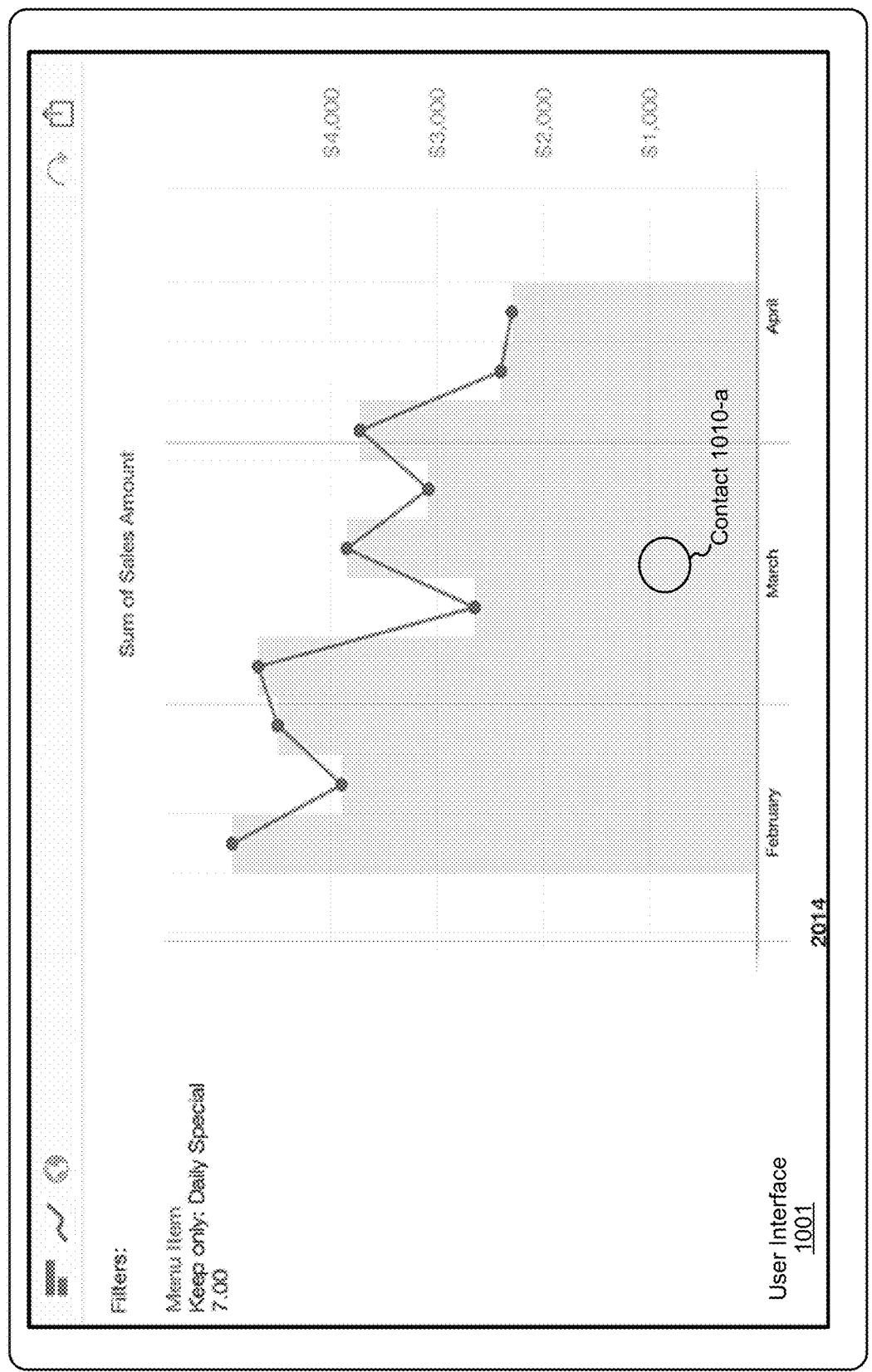
FIGS. 10A-10B illustrate user interfaces for adjusting a chart view, in accordance with some embodiments.
Figure 10B:
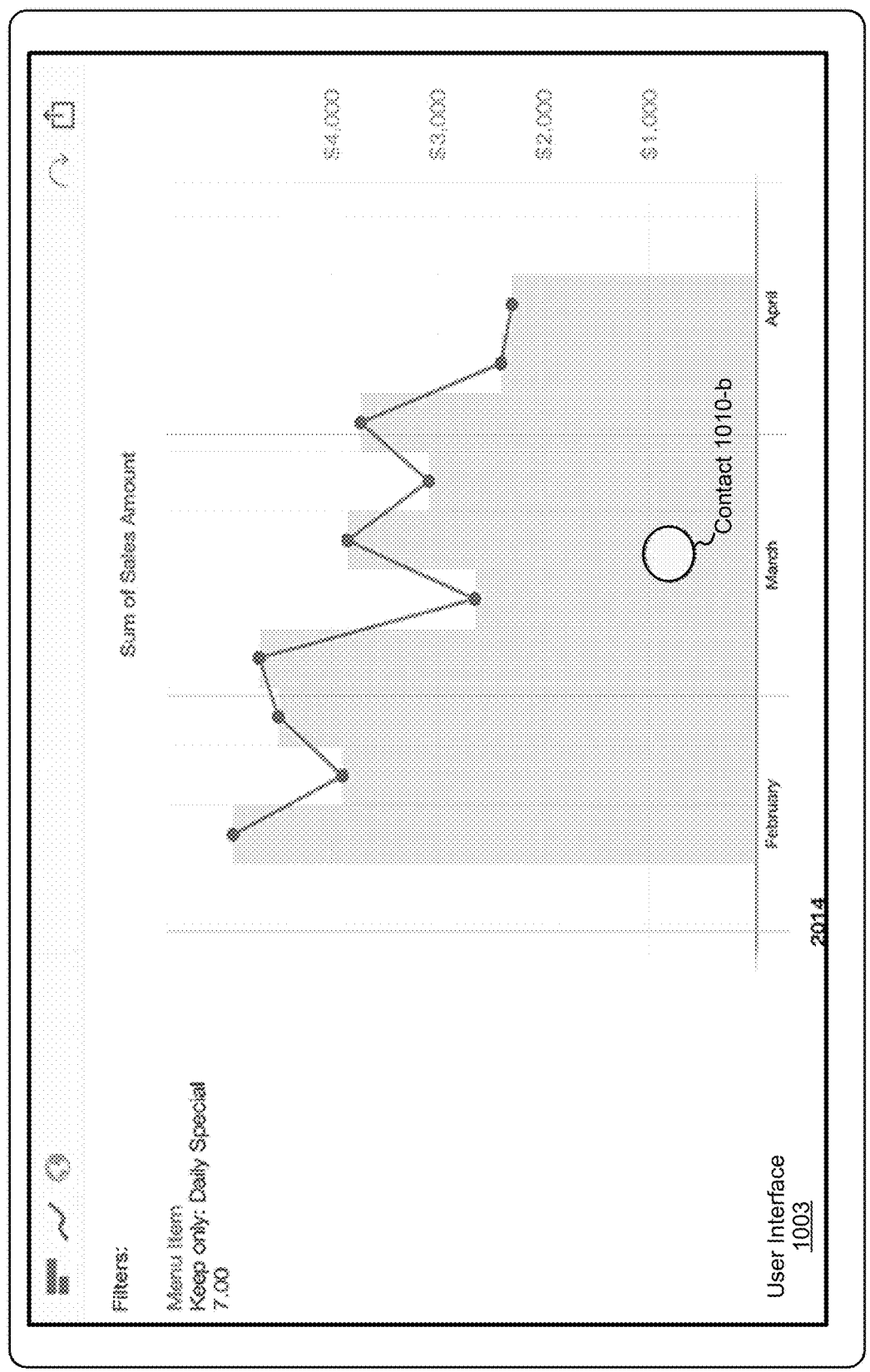

FIGS. 10A-10B illustrate user interfaces for adjusting a chart view, in accordance with some embodiments. FIG. 10A shows UI 1001 including a chart. FIG. 10A also shows contact 1010 detected at position 1010-a on UI 1001. FIG. 10B shows contact 1010 at position 1010-b and movement of the chart in concert with movement of contact 1010.

Figure 11A:
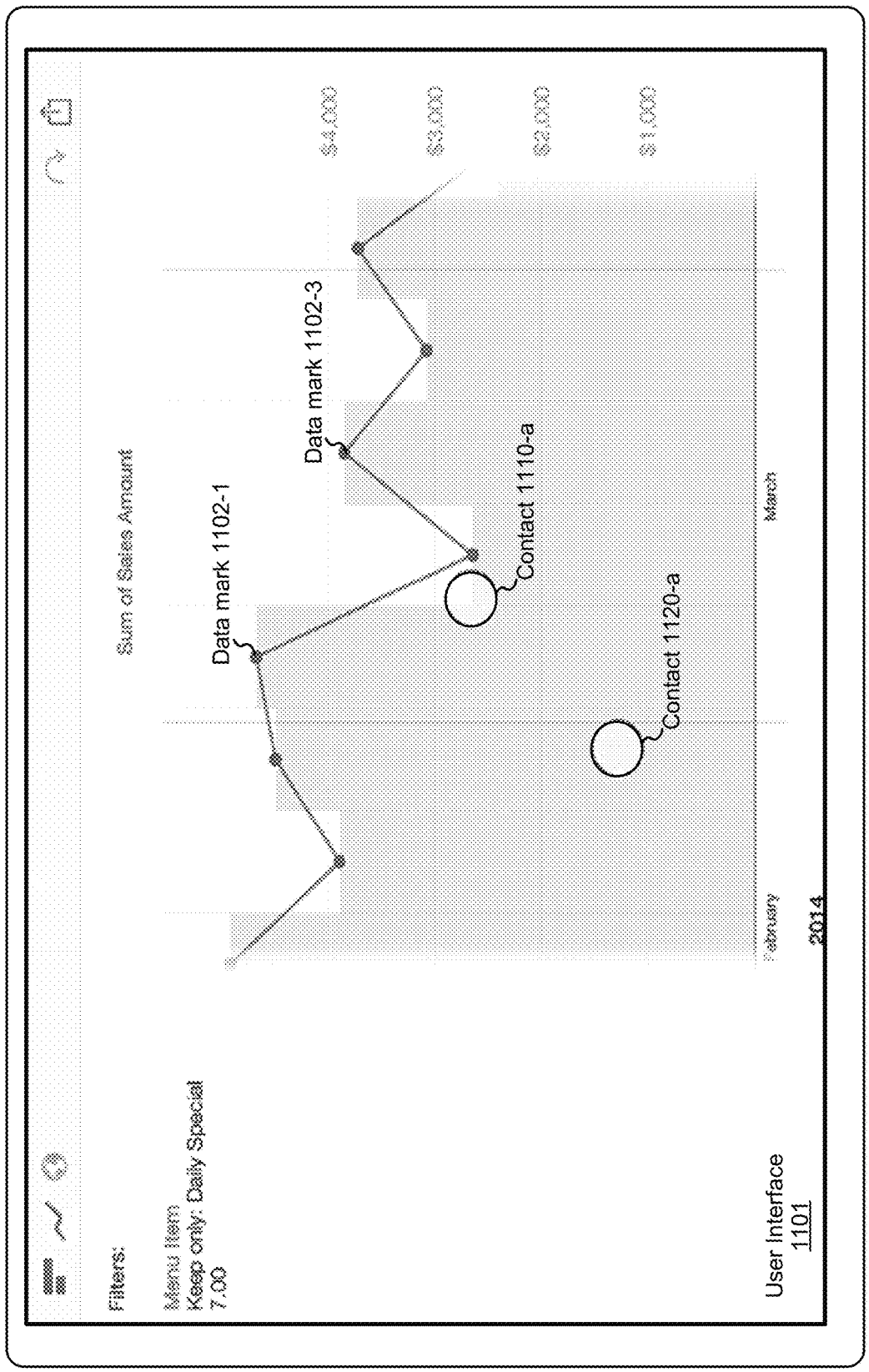
FIGS. 11A-11J illustrate user interfaces for adjusting chart magnification, in accordance with some embodiments.
Figure 11B:
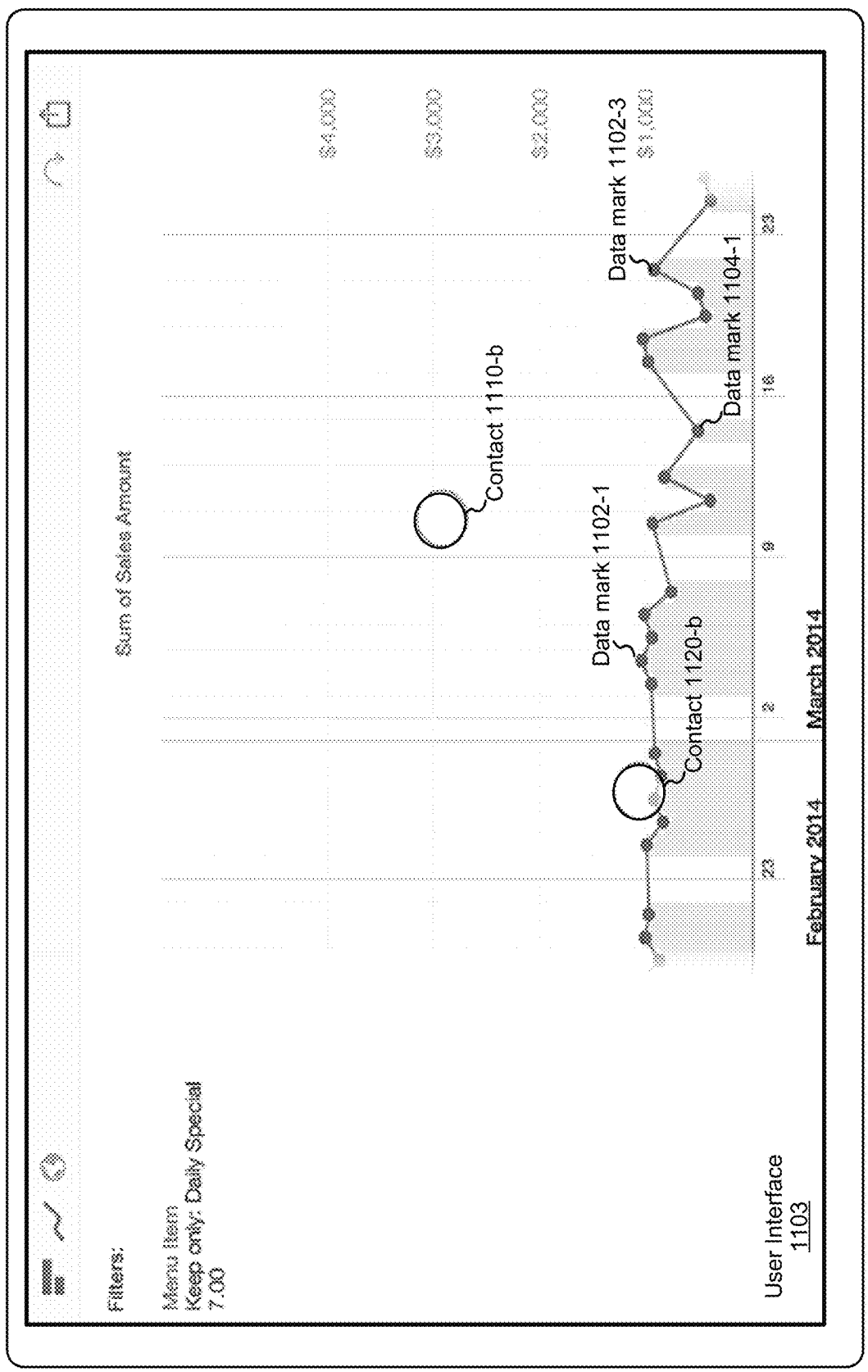
Figure 11C:
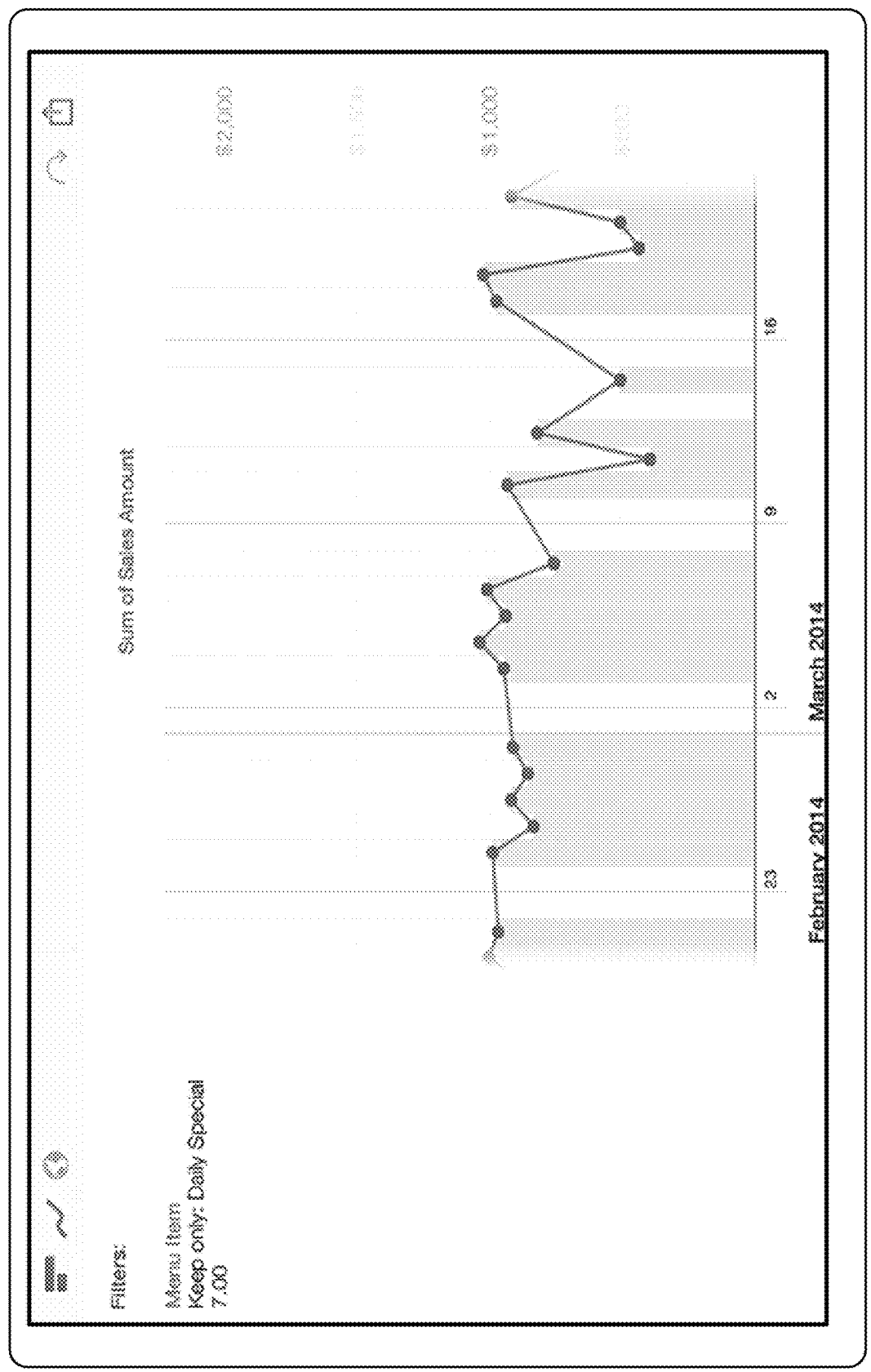
Figure 11D:
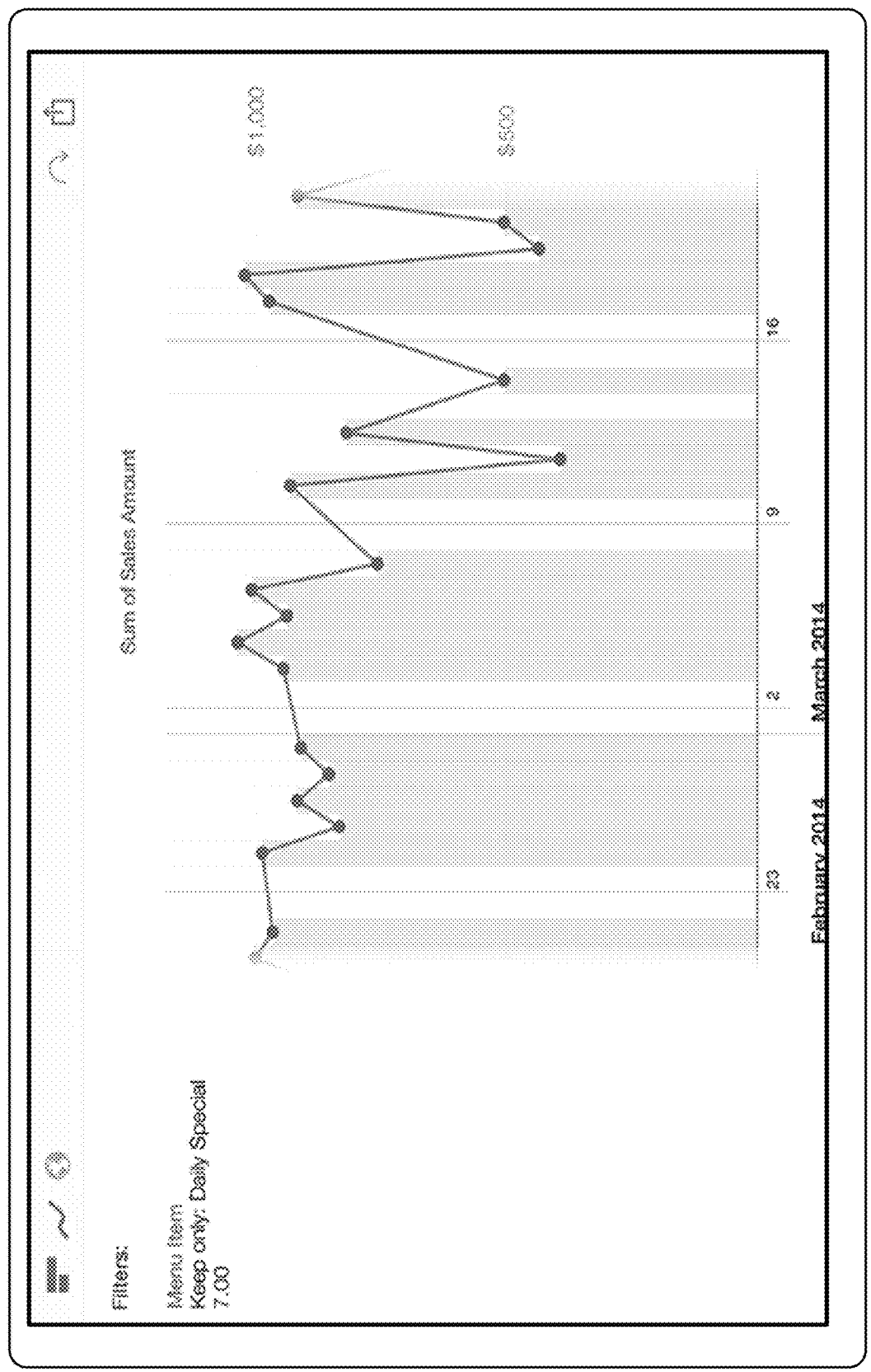

FIGS. 11A-11J illustrate user interfaces for adjusting chart magnification, in accordance with some embodiments. FIG. 11A shows UI 1101 including a chart at a first magnification (e.g., a first zoom level). FIG. 11A also shows contacts 1110 and 1120 detected at positions 1110-a and 1120-a respectively. FIG. 11B shows contacts 1110 and 1120 detected at positions 1110-b and 1120-b respectively and shows UI 1103 including the chart at a second magnification (e.g., zoomed in from the first zoom level). The relative positions of contacts 1110 and 1120 in FIG. 11B are further apart than the positions of contacts 1110 and 1120 in FIG. 11A and represent a de-pinch gesture on the touch screen. The second magnification of the chart shown in FIG. 11B includes the same vertical scale as the first magnification of the line shown in FIG. 11A. FIGS. 11C and 11D show an animated transition of the chart to a third magnification. The animated transition shown in FIGS. 11C and 11D includes an increase in the vertical scale of the chart. In some embodiments, the animated transition shown in FIGS. 11C and 11D is in response to ceasing to detect contacts 1110 and 1120 (e.g., detecting lift off of the contacts).

Figure 11E:
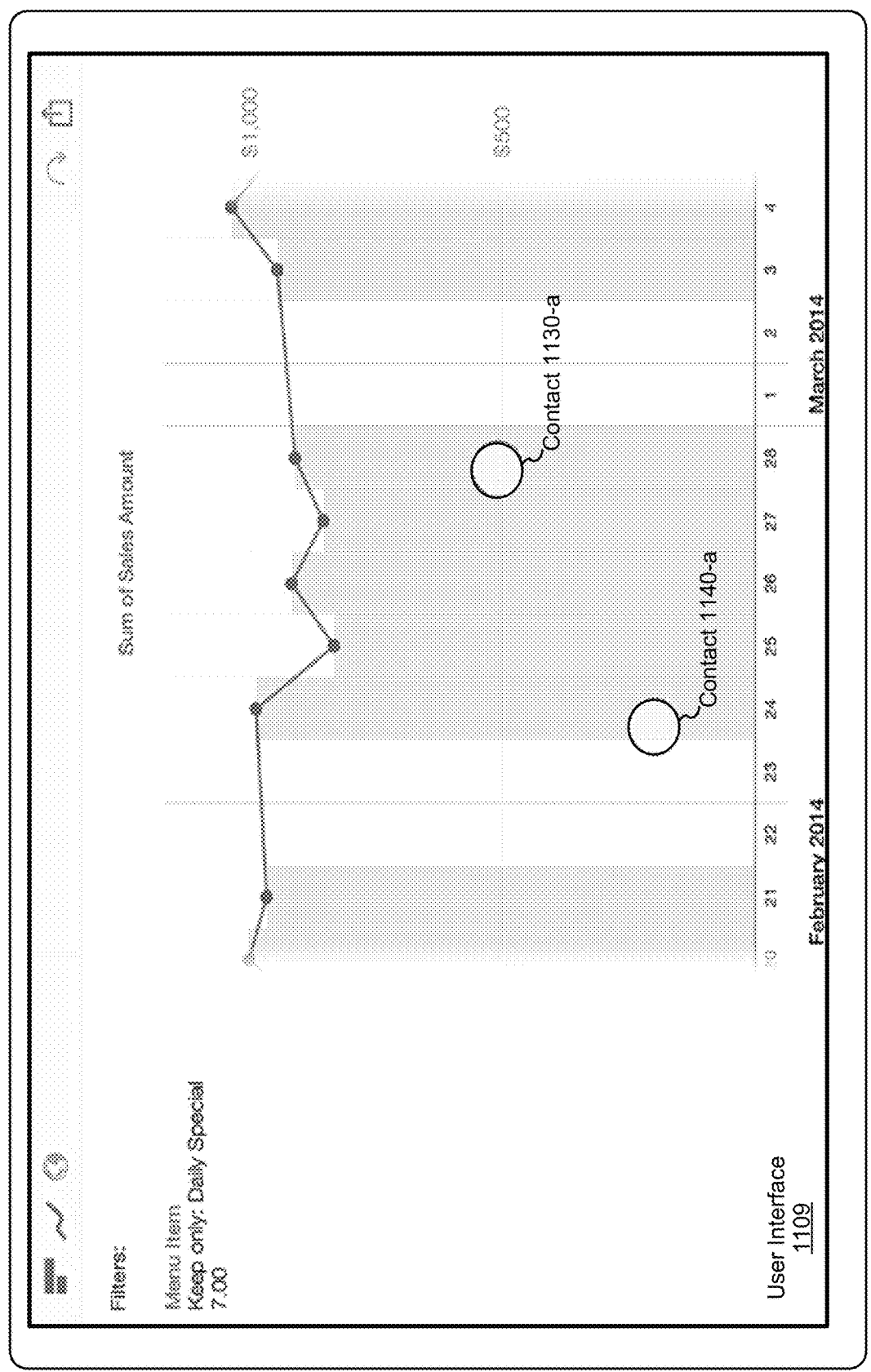
Figure 11F:
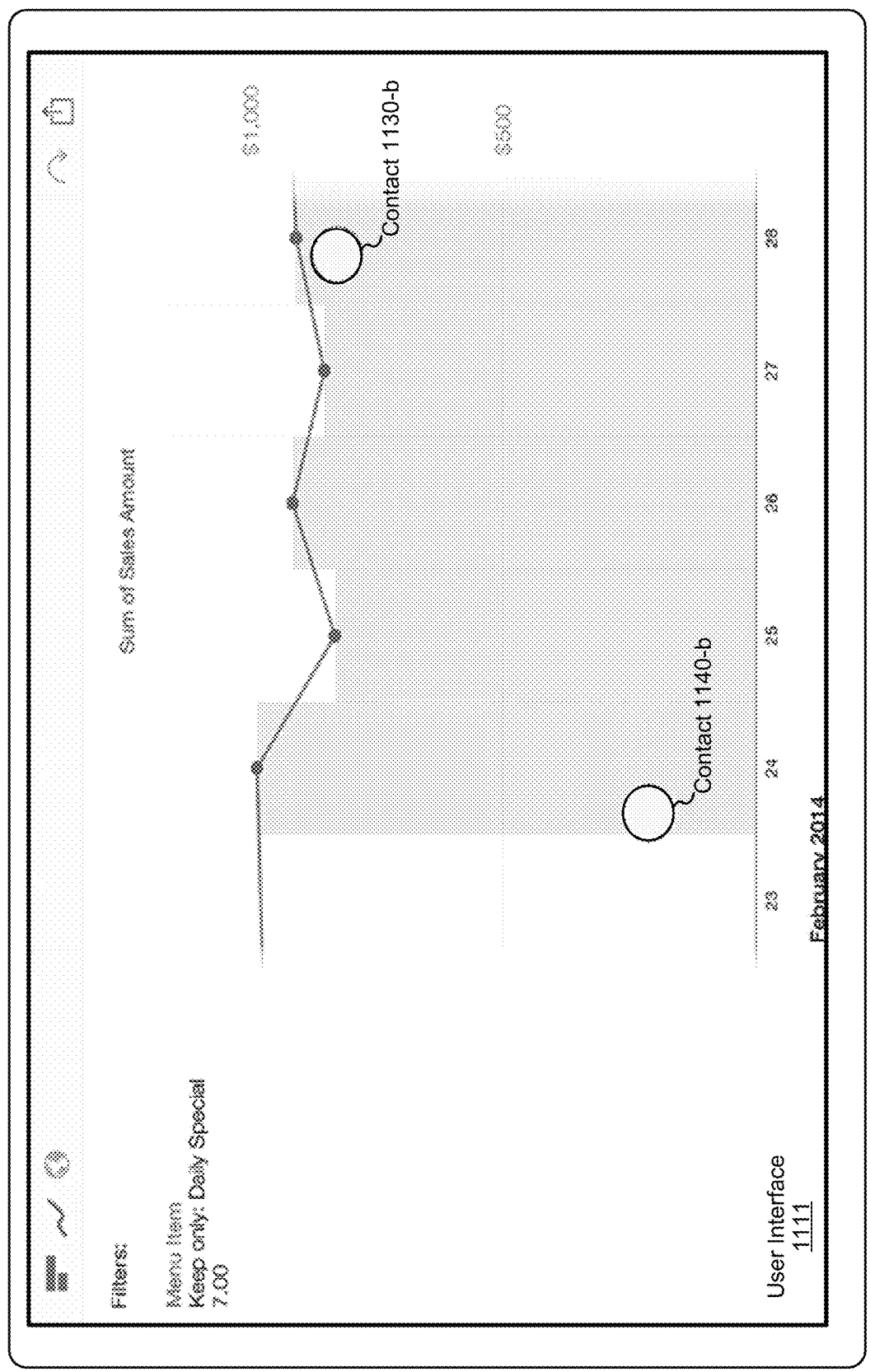

FIG. 11E shows UI 1109 including the chart at a fourth magnification. FIG. 11E also shows contacts 1130 and 1140 detected at positions 1130-a and 1140-a respectively. FIG. 11F shows contacts 1130 and 1140 detected at positions 1130-b and 1140-b respectively and shows UI 1111 including the chart at a fifth magnification (e.g., zoomed in from the fourth magnification).

Figure 11G:
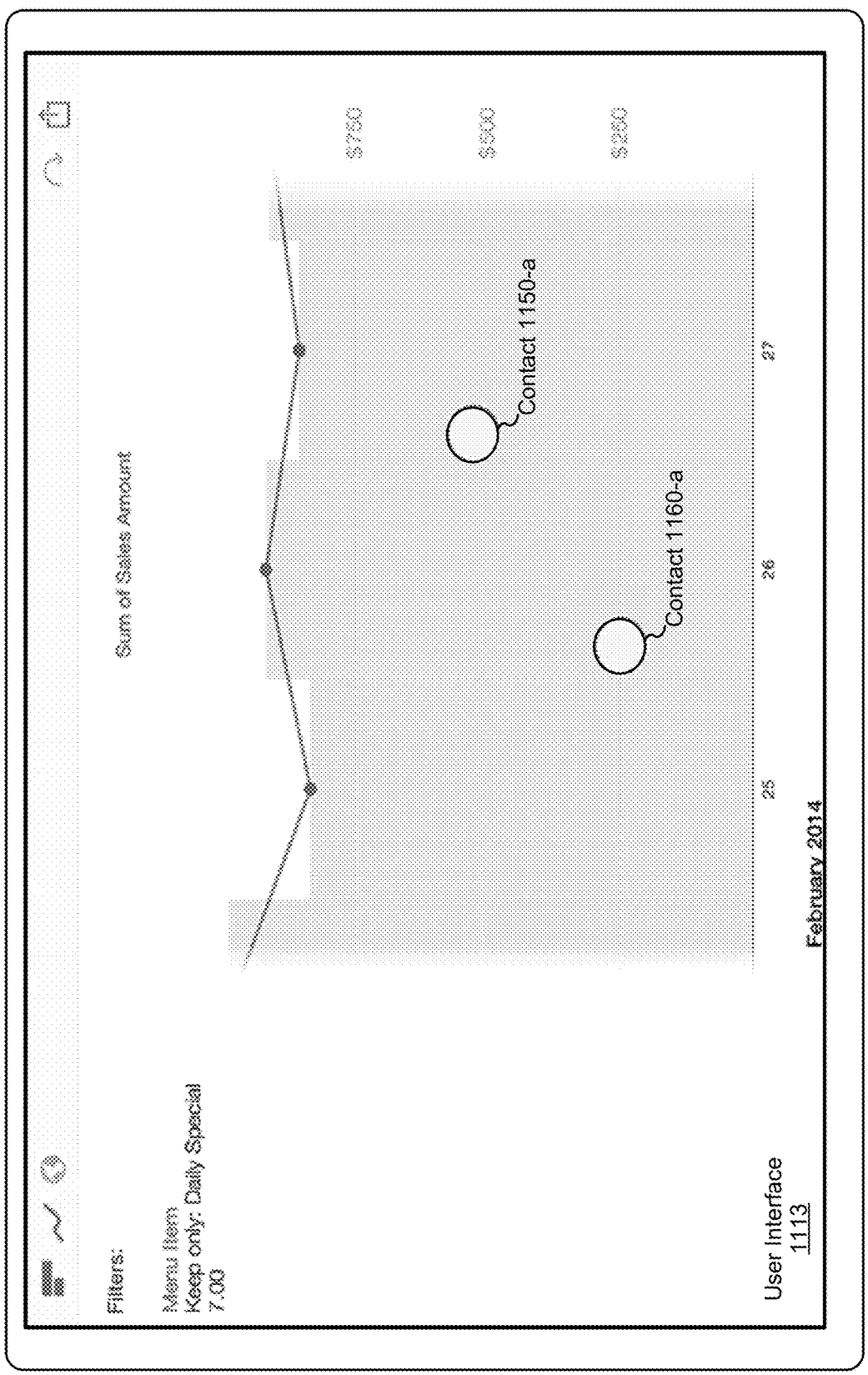
Figure 11H:
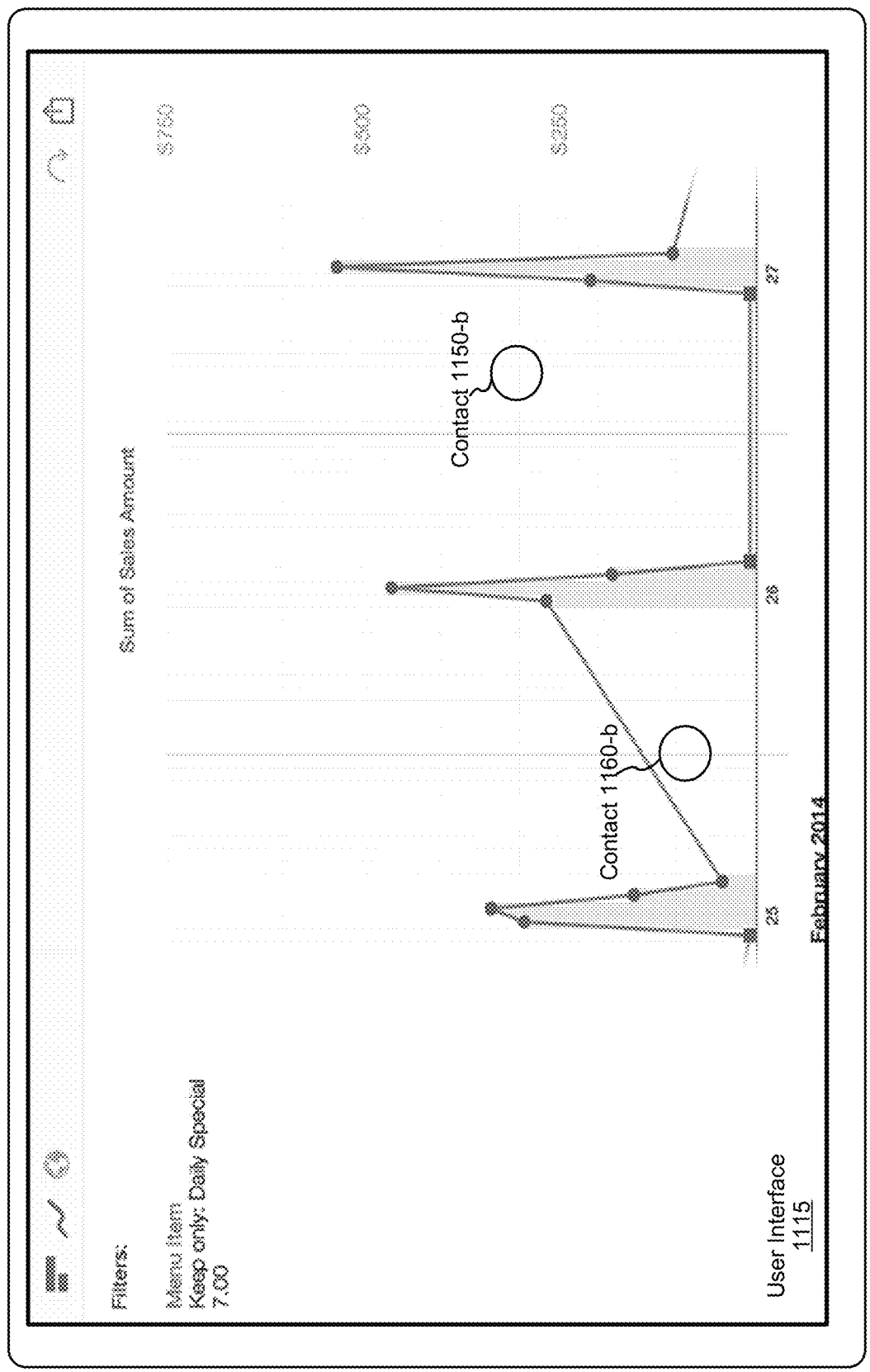

FIG. 11G shows UI 1113 including the chart at a sixth magnification. FIG. 11G also shows contacts 1150 and 1160 detected at positions 1150-a and 1160-a respectively. FIG. 11H shows contacts 1150 and 1160 detected at positions 1150-b and 1160-b respectively and shows UI 1115 including the chart at a seventh magnification (e.g., zoomed in from the sixth magnification).

Figure 11I:
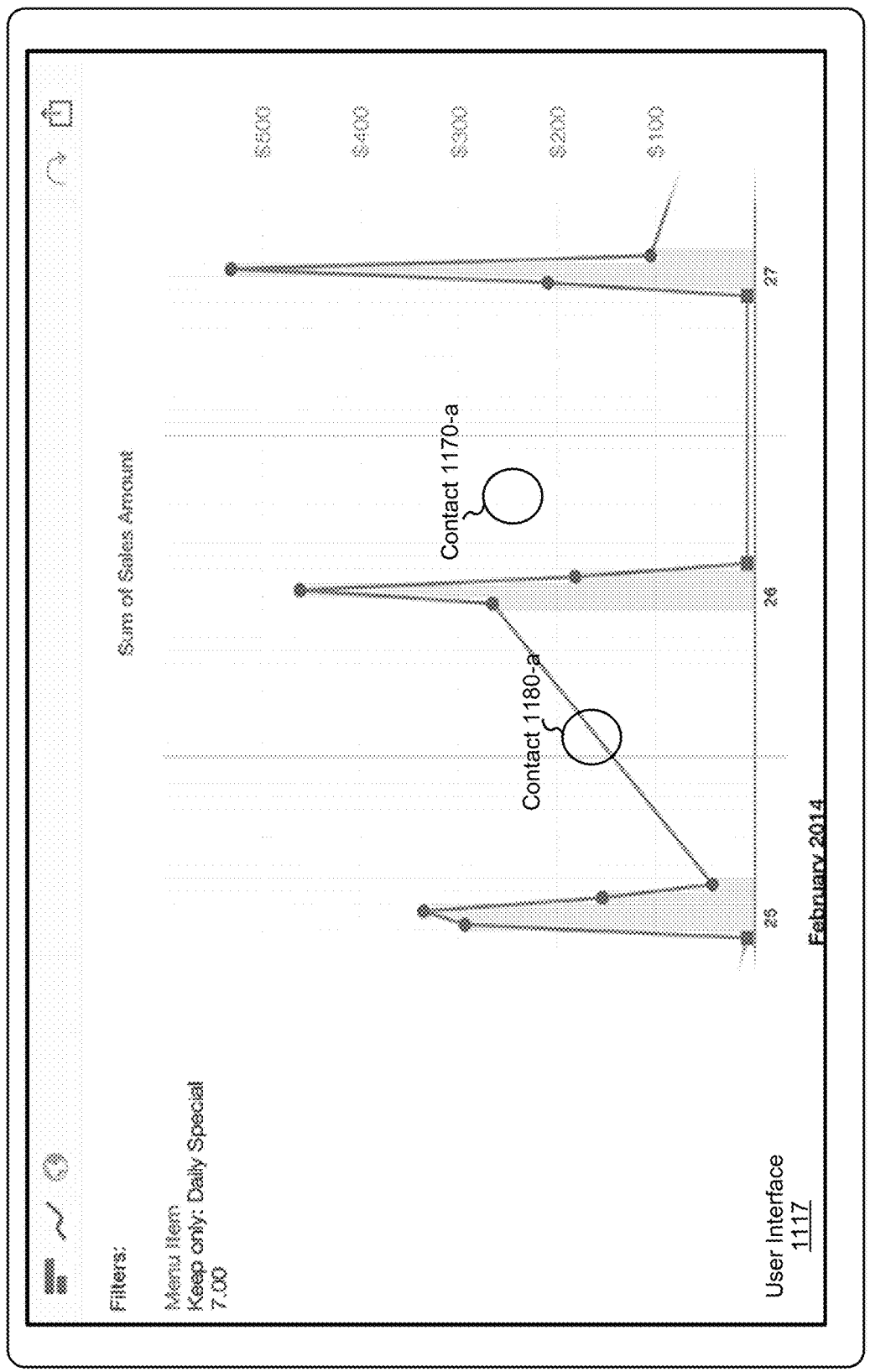
Figure 11J:
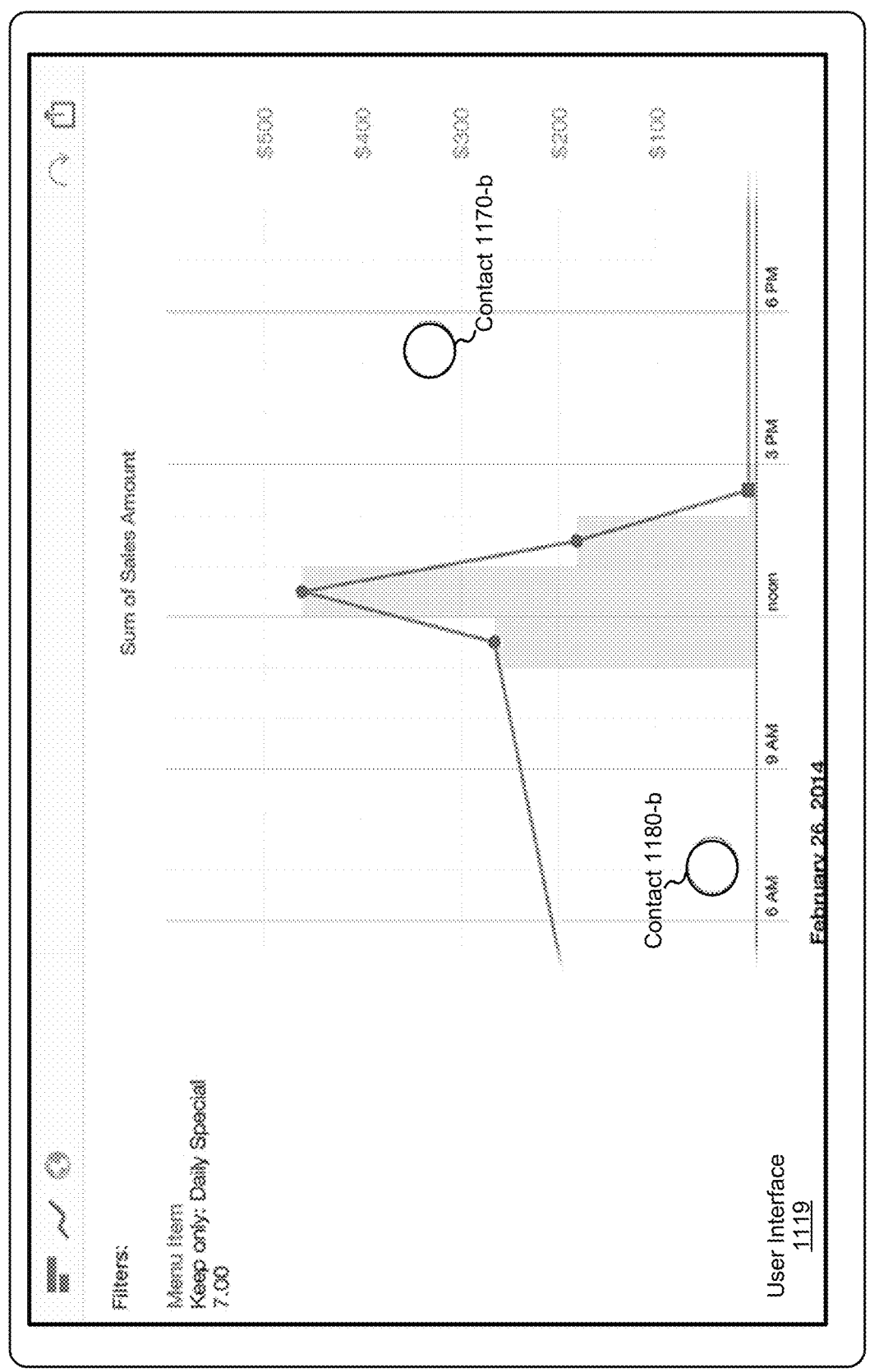

FIG. 11I shows UI 1117 including the chart at an eighth magnification. FIG. 11I also shows contacts 1170 and 1180 detected at positions 1170-a and 1180-a respectively. FIG. 11J shows contacts 1170 and 1180 detected at positions 1170-*b* and 1180-*b* respectively and shows UI 1119 including the chart at a ninth magnification (e.g., zoomed in from the eighth magnification).

Figure 12A:
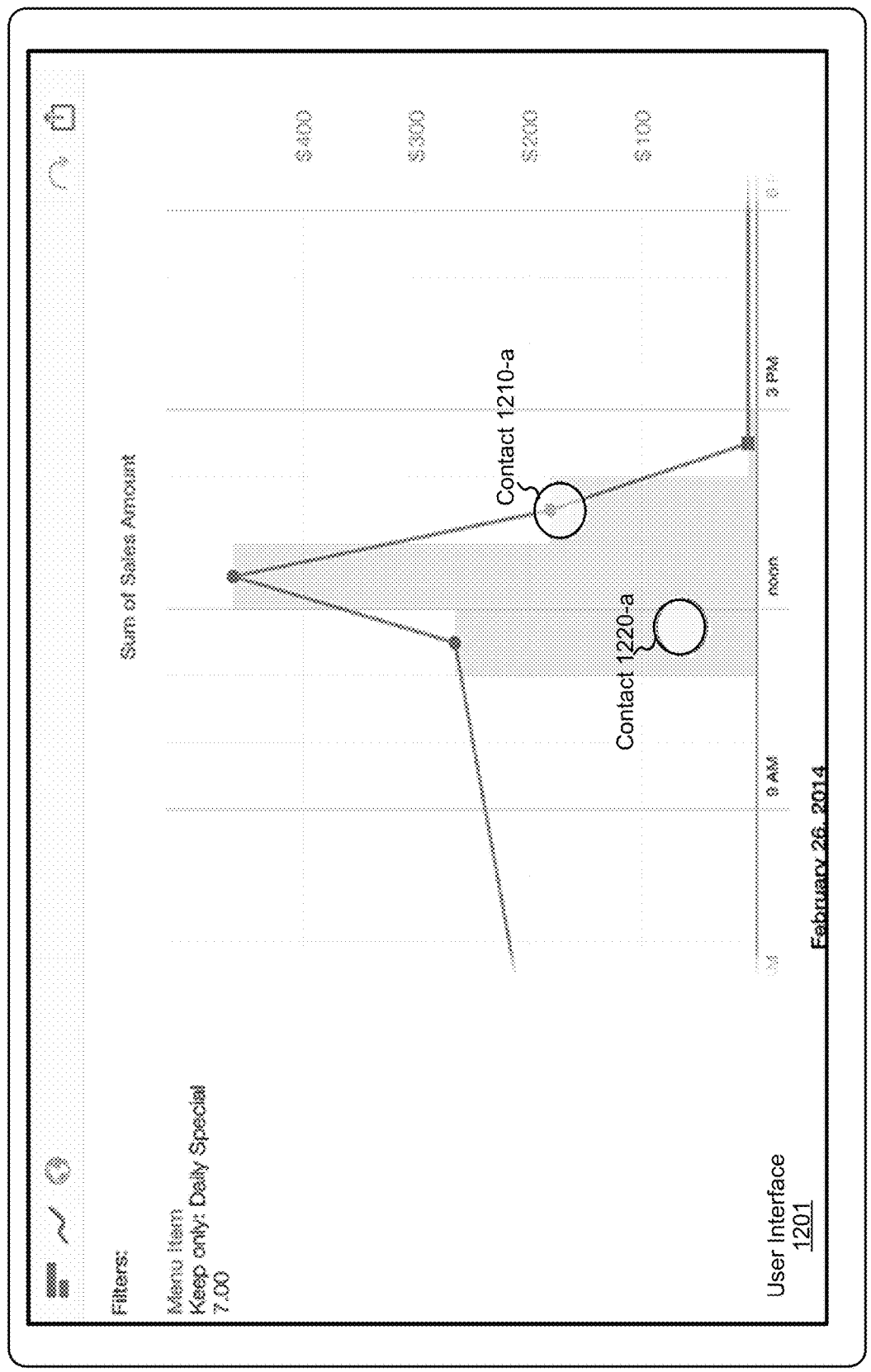
FIGS. 12A-12D illustrate user interfaces for adjusting chart magnification, in accordance with some embodiments.
Figure 12B:
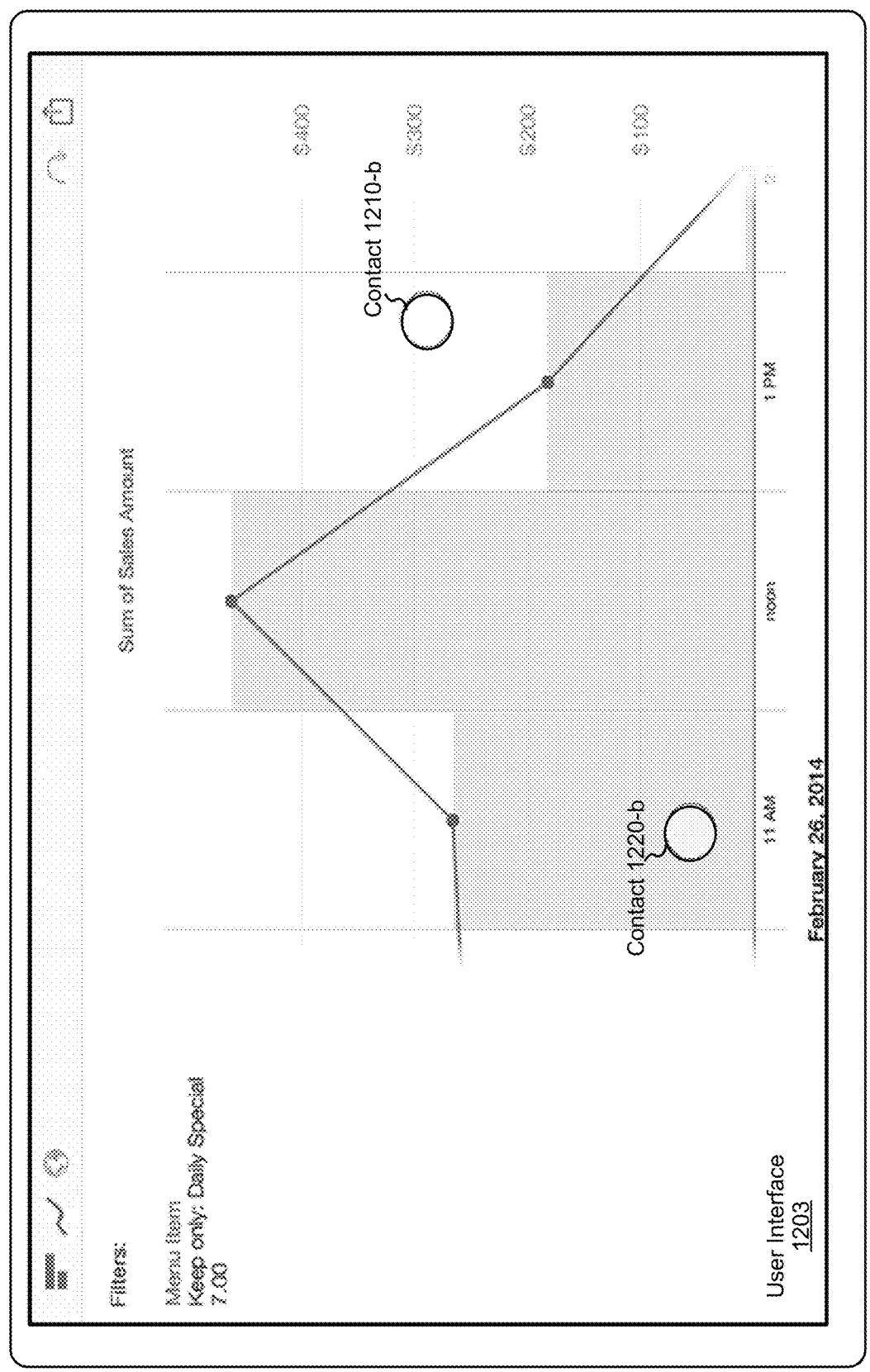
Figure 12C:
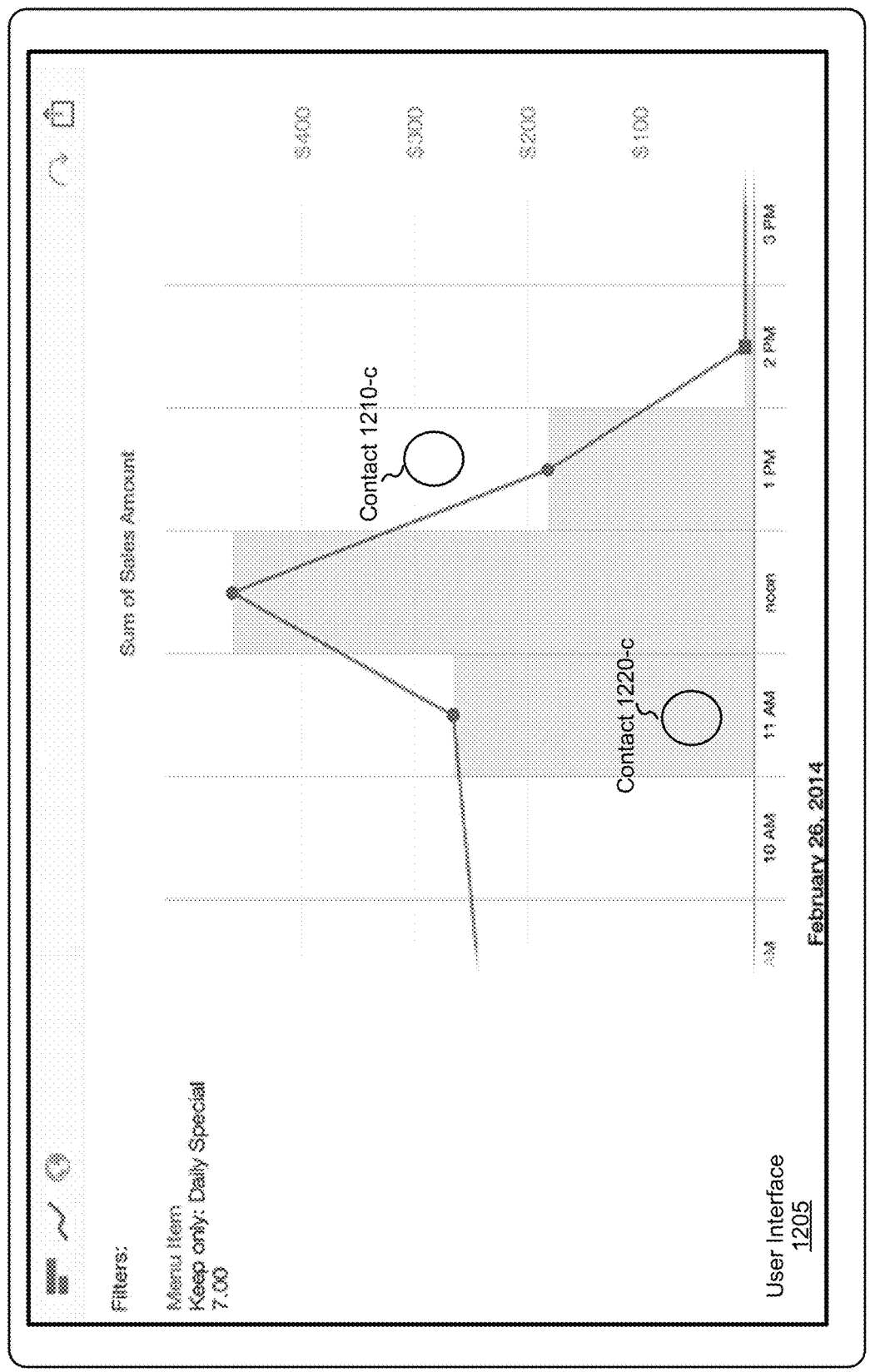
Figure 12D:
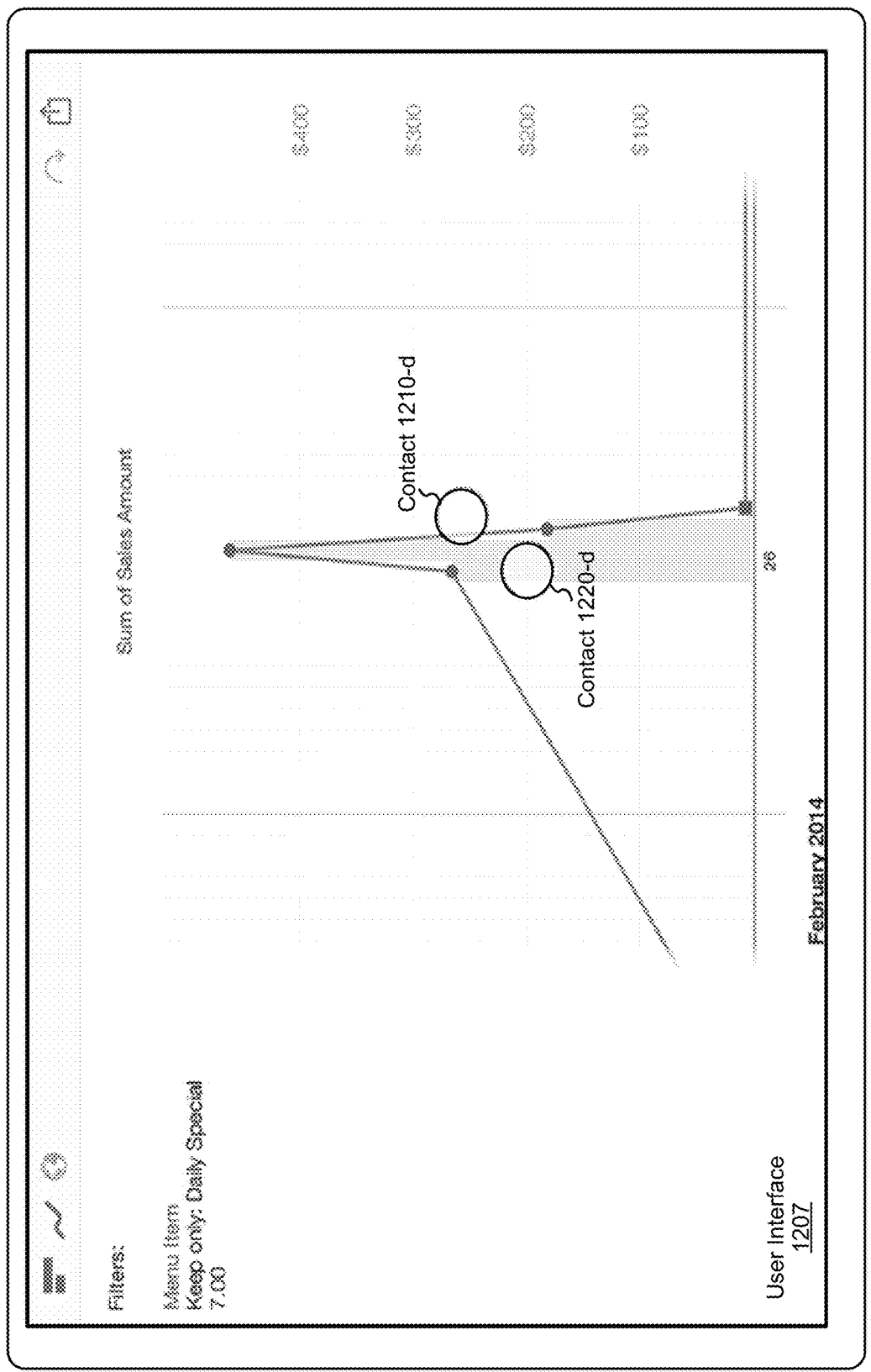

FIGS. 12A-12D illustrate user interfaces for adjusting chart magnification, in accordance with some embodiments. FIG. 12A shows UI 1201 including a chart at an initial magnification. FIG. 12A also shows contacts 1210 and 1220 detected at positions 1210-*a* and 1220-*a* respectively. FIG. 12B shows contacts 1210 and 1220 detected at positions 1210-*b* and 1220-*b* respectively and shows UI 1203 including the chart at a second magnification (e.g., zoomed in from the initial magnification). The relative positions of contacts 1210 and 1220 in FIG. 12B are further apart than the positions of contacts 1210 and 1220 in FIG. 12A and represent a de-pinch gesture on the touch screen. FIG. 12C shows contacts 1210 and 1220 detected at positions 1210-*c* and 1220-*c* respectively and shows UI 1205 including the chart at a third magnification (e.g., zoomed out from the second magnification). The relative positions of contacts 1210 and 1220 in FIG. 12C are closer together than the positions of contacts 1210 and 1220 in FIG. 12B and represent a pinch gesture on the touch screen. FIG. 12D shows contacts 1210 and 1220 detected at positions 1210-*d* and 1220-*d* respectively and shows UI 1207 including the chart at a fourth magnification (e.g., zoomed out from the third magnification). The relative positions of contacts 1210 and 1220 in FIG. 12D are closer together than the positions of contacts 1210 and 1220 in FIG. 12A and represent a pinch gesture on the touch screen.

Figure 13A:
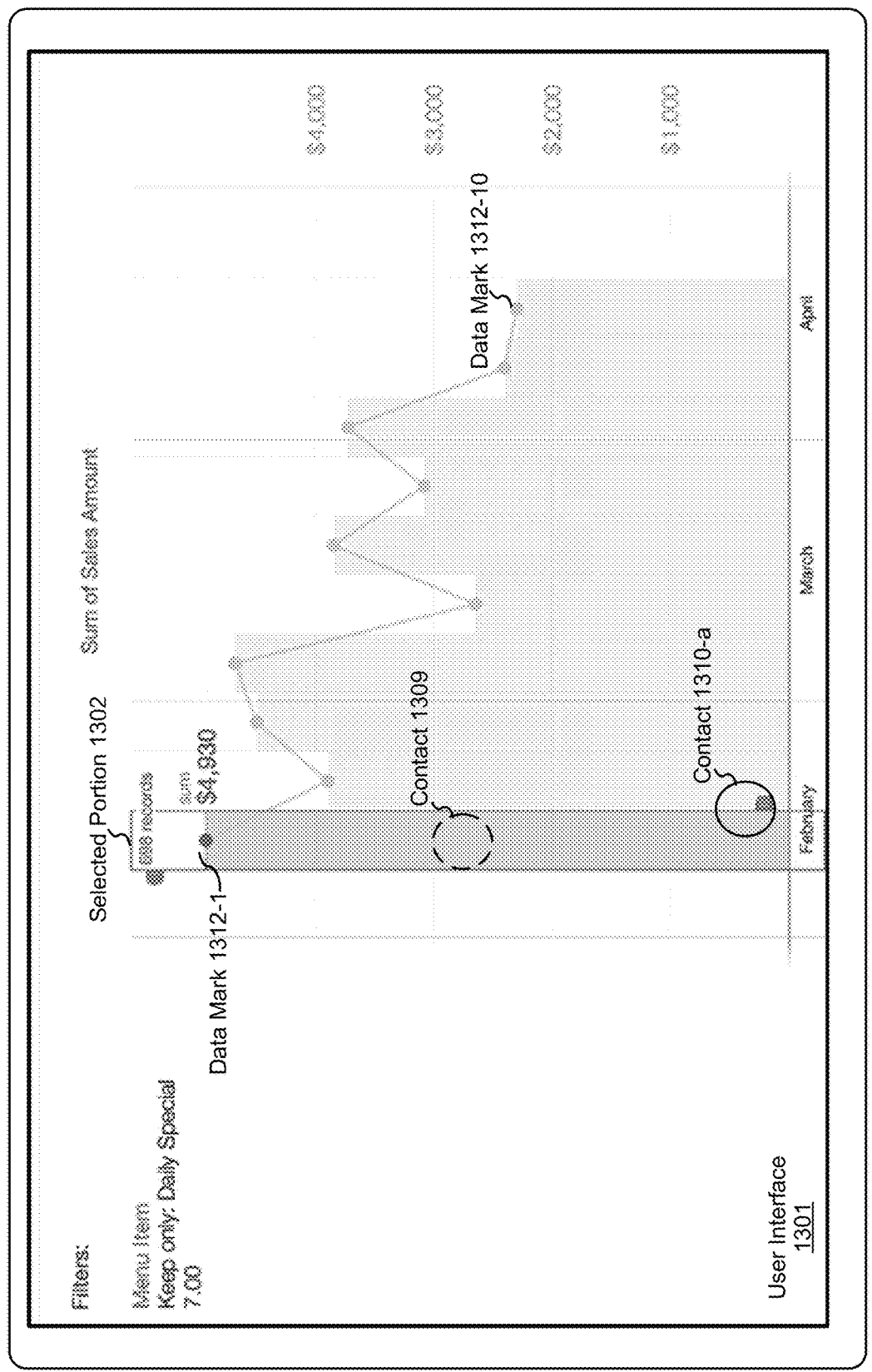
FIGS. 13A-13D illustrate user interfaces for selecting chart areas, in accordance with some embodiments.
Figure 13B:
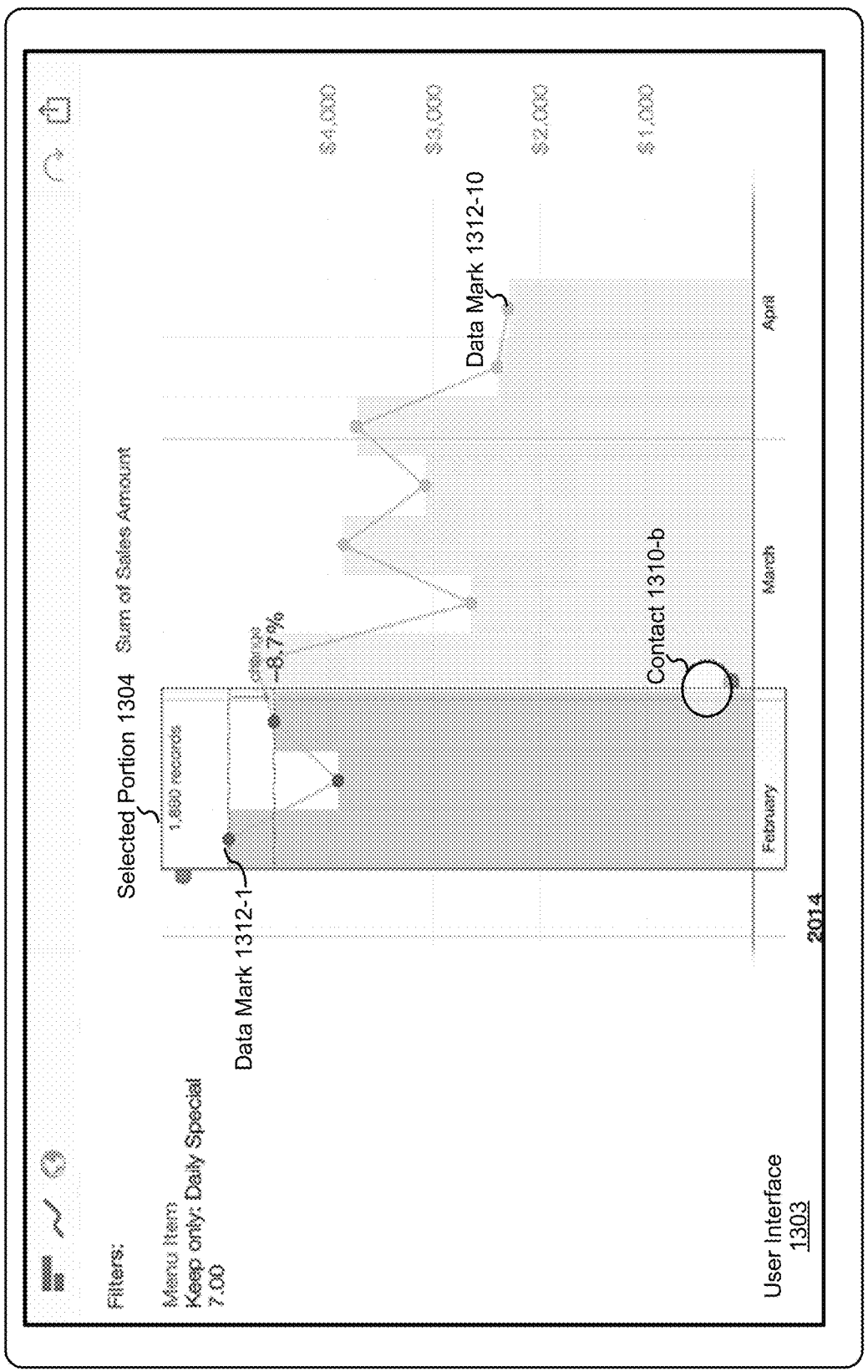
Figure 13C:
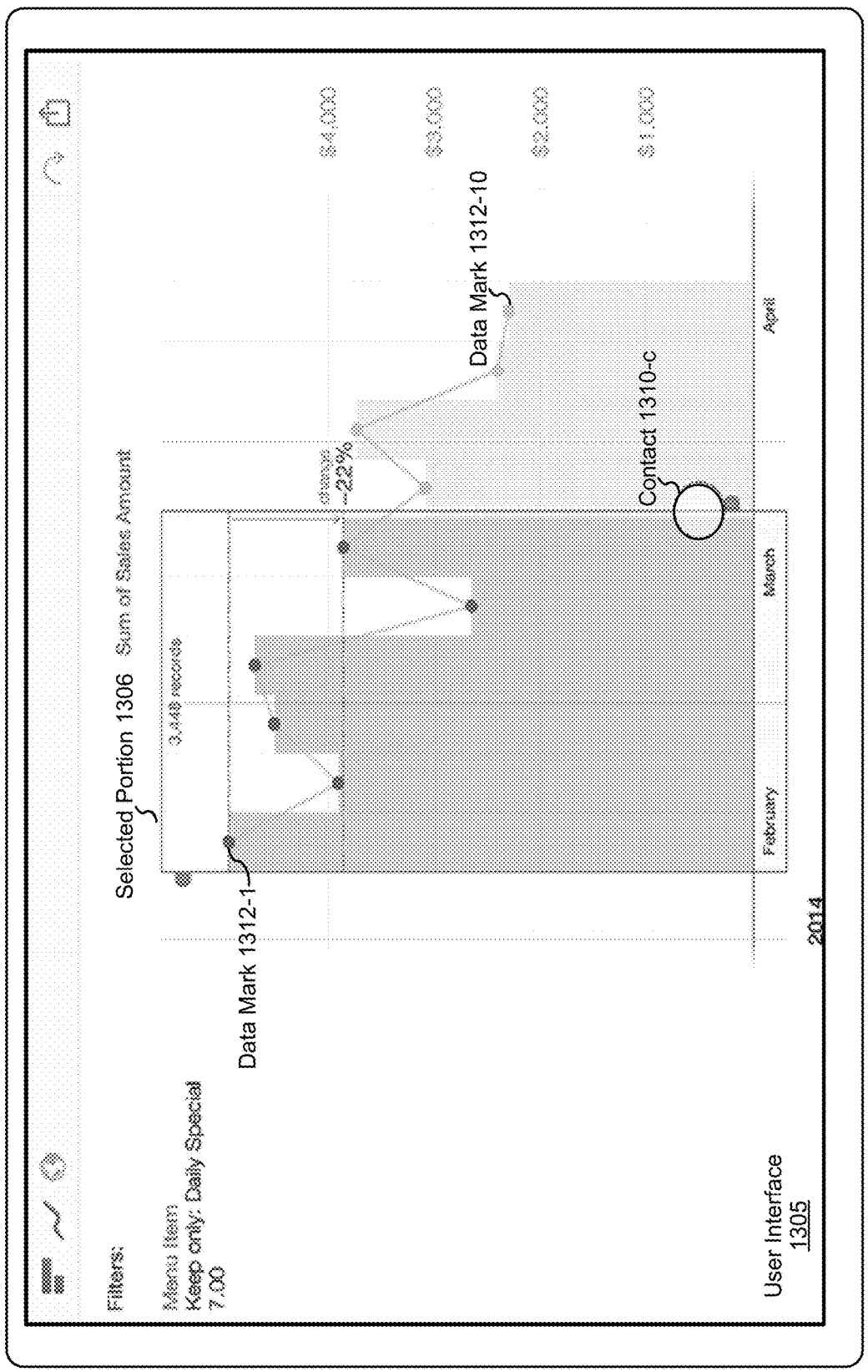
Figure 13D:
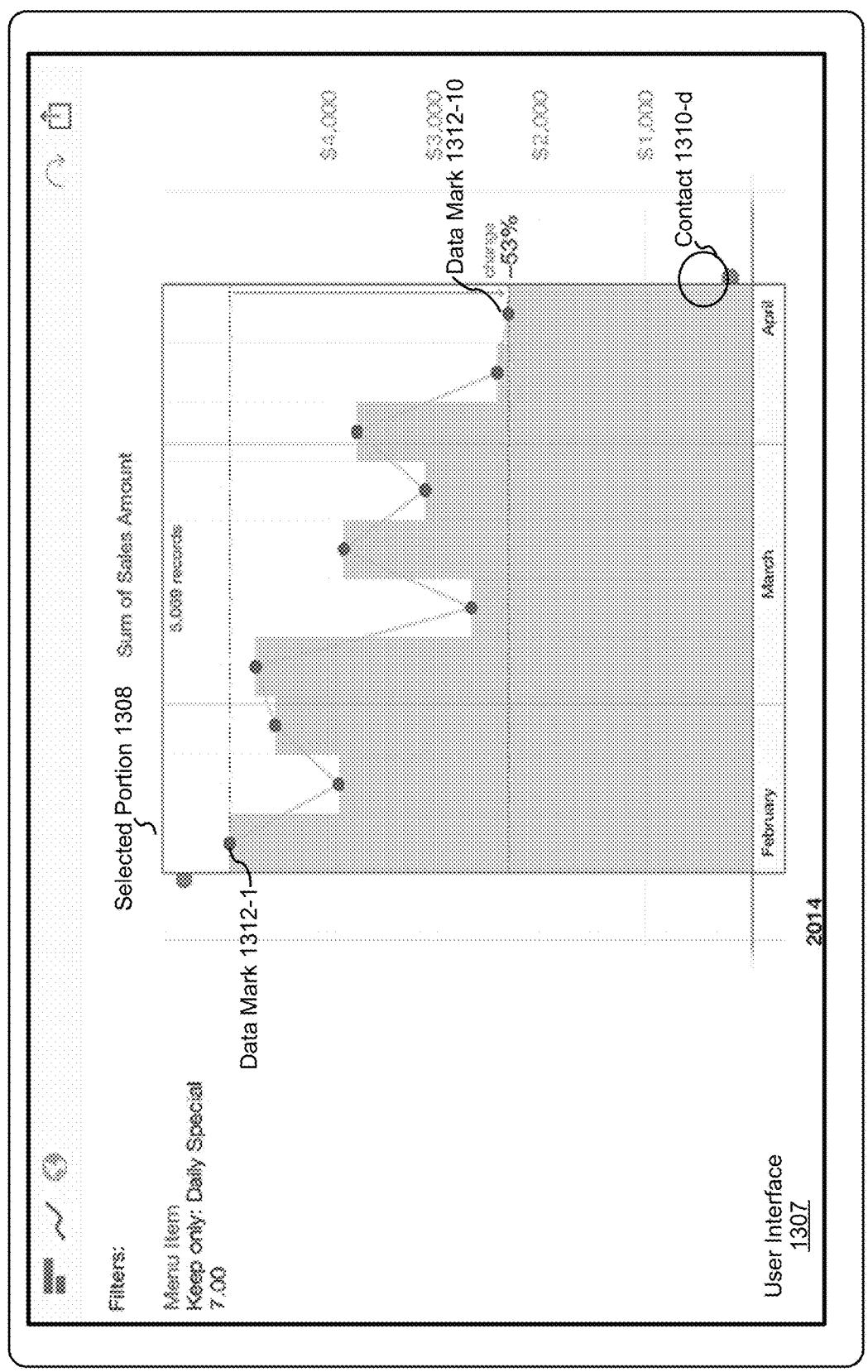

FIGS. 13A-13D illustrate user interfaces for selecting chart areas, in accordance with some embodiments. FIG. 13A shows UI 1301 including a chart with selected portion 1302 and information regarding selected portion 1302. For example, FIG. 13A show information regarding the number of records in selected portion 1302. FIG. 13A also shows contact 1310 detected at position 1310-*a* corresponding to selected portion 1302. FIG. 13B shows UI 1303 and contact 1310 at position 1310-*b* and the chart with selected portion 1304 corresponding to the movement of contact 1310. FIG. 13B also shows the chart including information regarding selected portion 1304 (e.g., information showing a difference between selected portion 1302 and selected portion 1304). FIG. 13C shows UI 1305 and contact 1310 at position 1310-*c* and the chart with selected portion 1306 corresponding to the continued movement of contact 1310. FIG. 13C also shows the chart including information regarding selected portion 1306. FIG. 13D shows UI 1307 and contact 1310 at position 1310-*d* and the chart with selected portion 1308 corresponding to the continued movement of contact 1310. FIG. 13D also shows the chart including information regarding selected portion 1308.

Figure 14A:
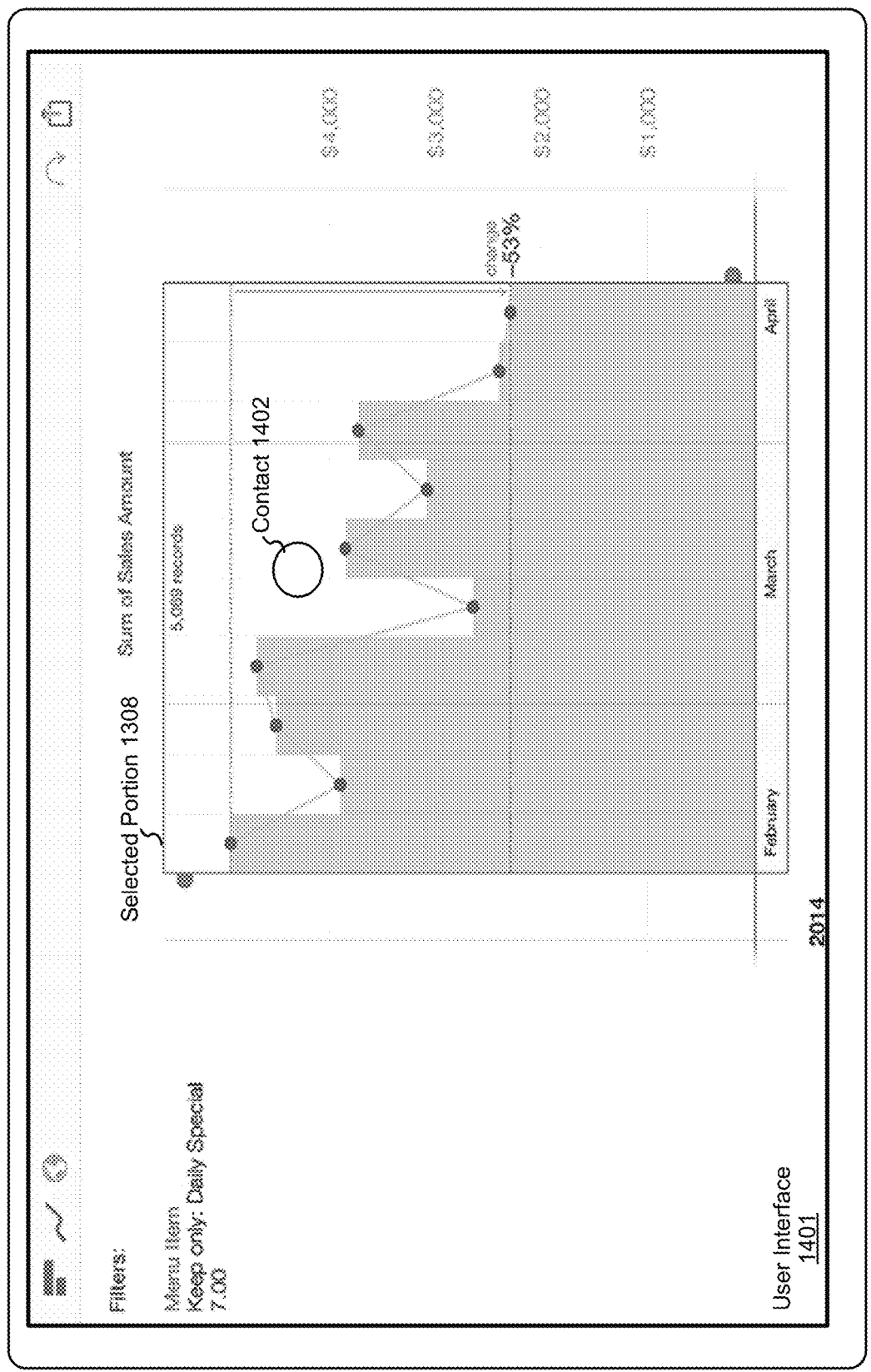
FIGS. 14A-14D illustrate user interfaces for exporting data visualizations, in accordance with some embodiments.
Figure 14B:
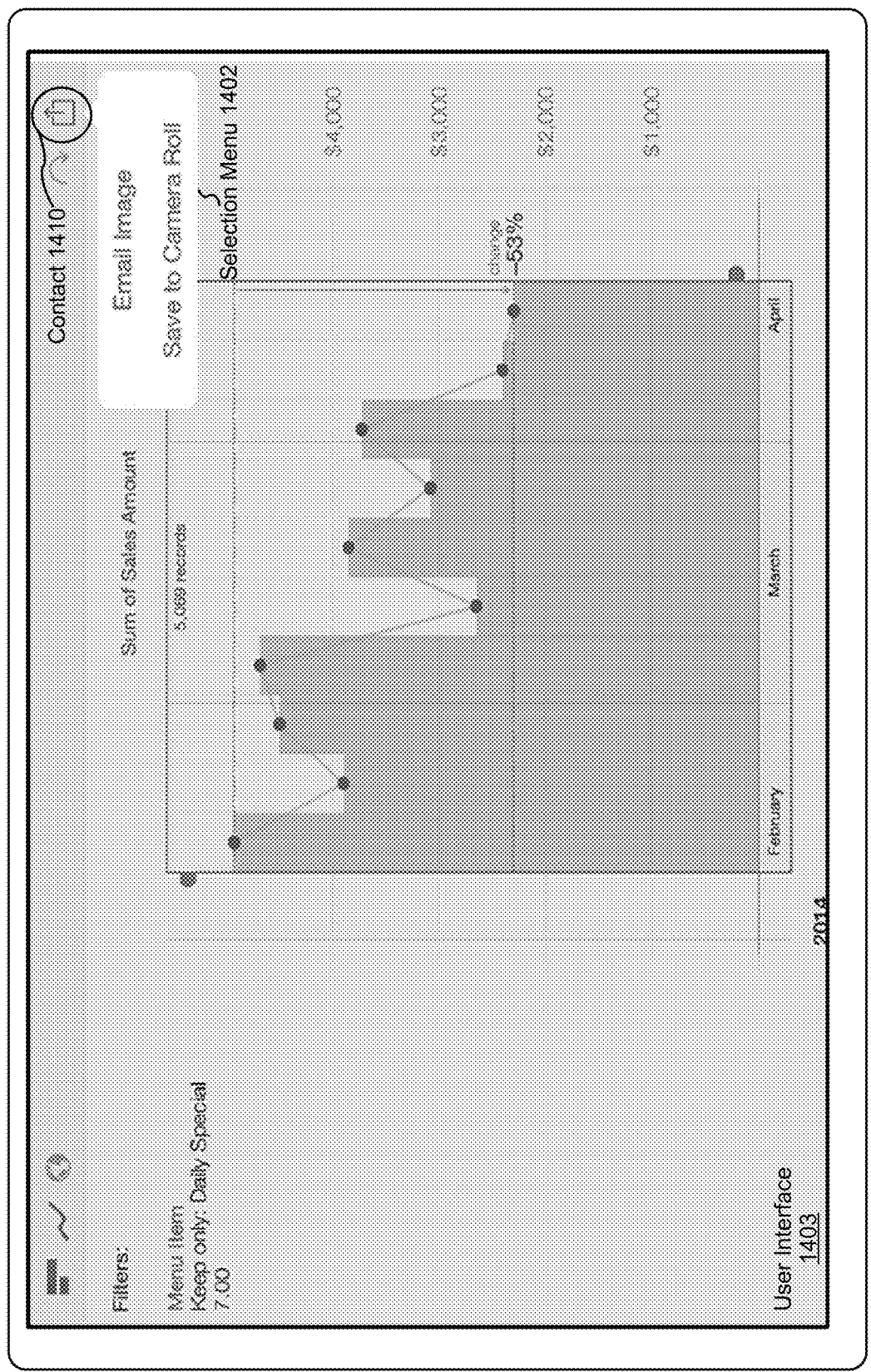
Figure 14C:
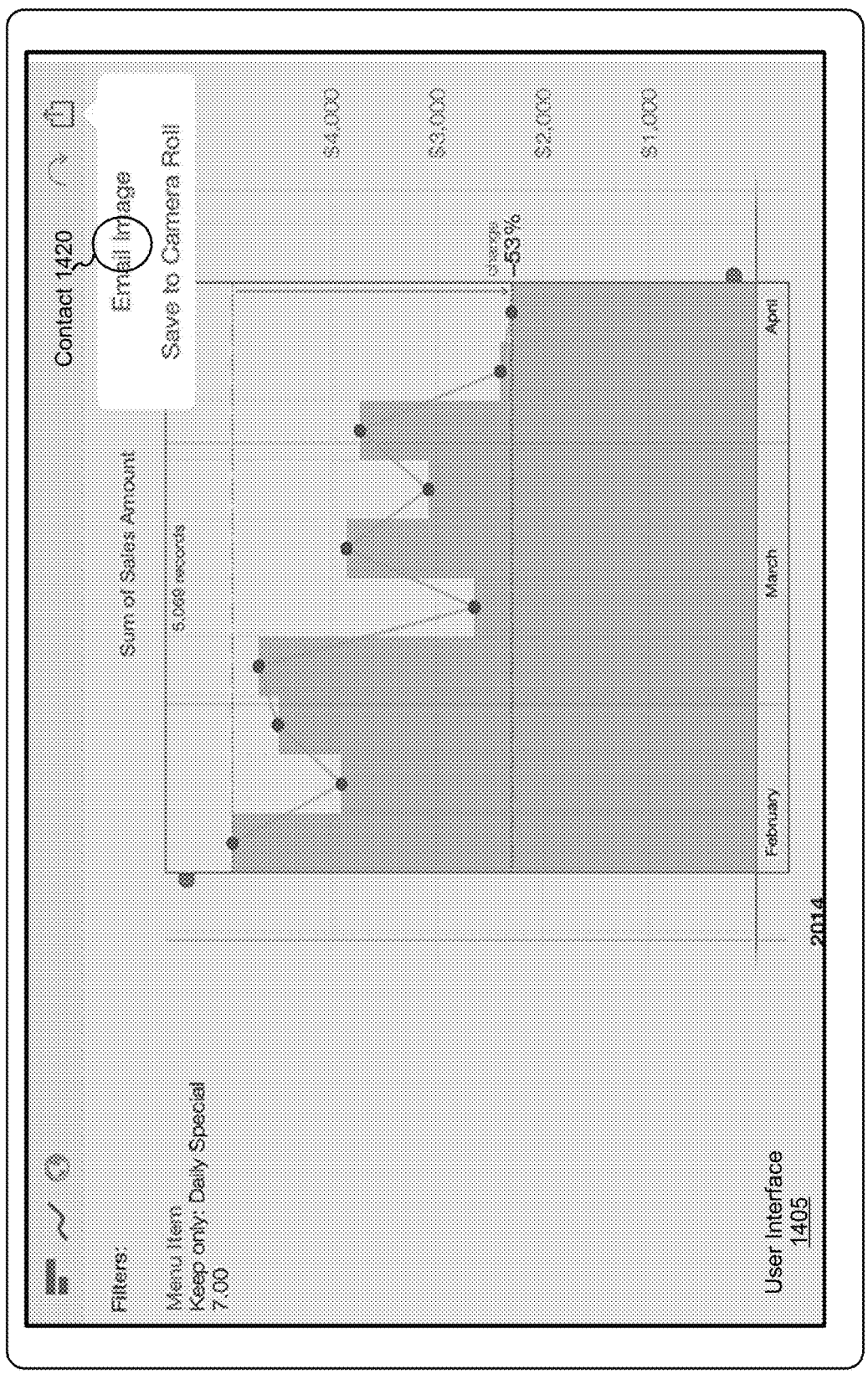
Figure 14D:
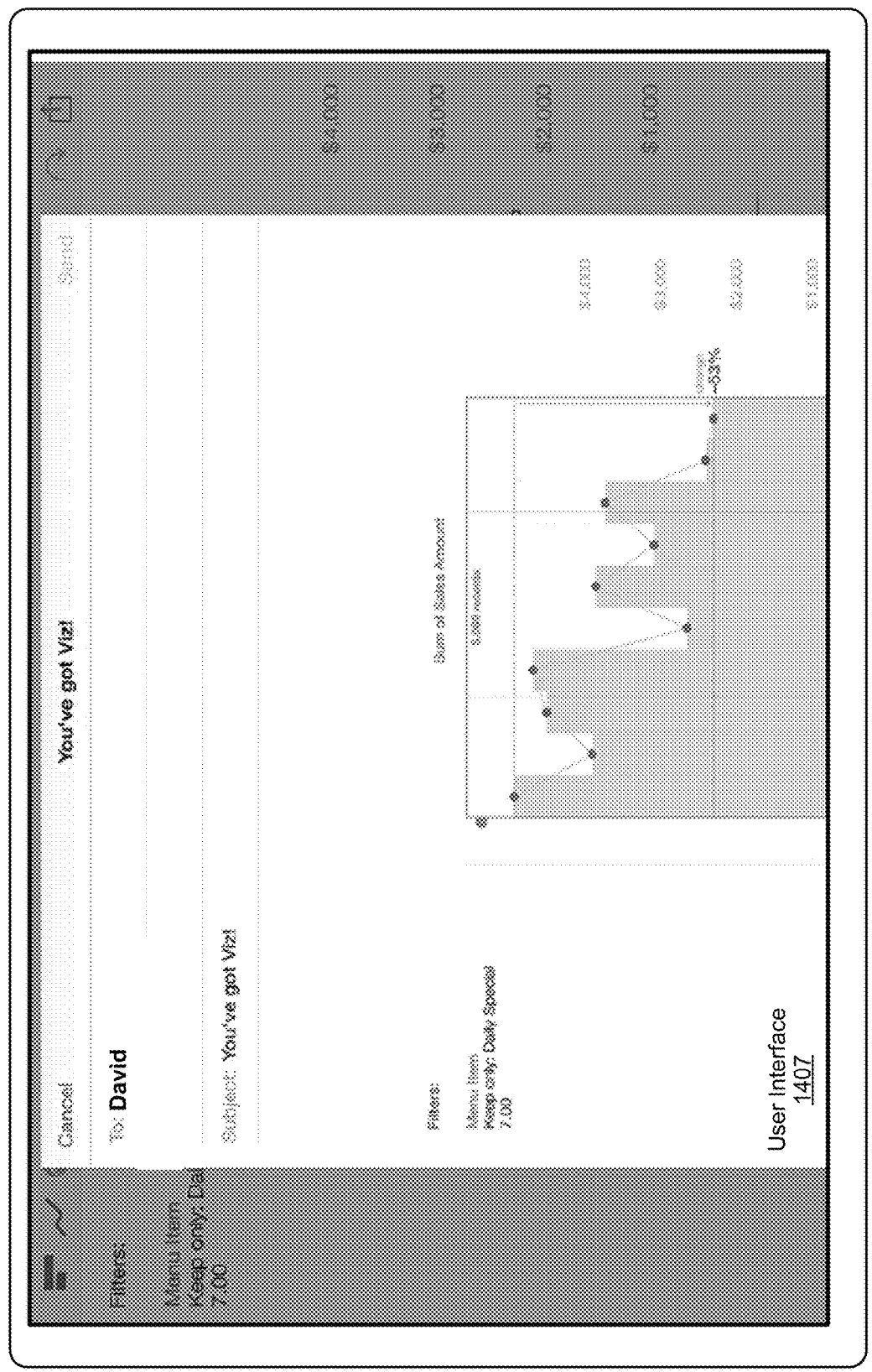

FIGS. 14A-14D illustrate user interfaces for exporting data visualizations, in accordance with some embodiments. FIG. 14A shows UI 1401 including a chart with selected portion 1308. FIG. 14B shows UI 1403 including the chart with selected portion 1308 and selection menu 1402. FIG. 14B also shows contact 1410 detected at a position corresponding to an icon for selection menu 1402. In some embodiments, selection menu 1402 is shown in response to contact 1410 being detected over the icon for selection menu 1402. FIG. 14C shows UI 1405 including the chart with selected portion 1308 and selection menu 1402. FIG. 14C also shows contact 1420 detected at a position corresponding to a menu option (Email Image) in selection menu 1402. FIG. 14D shows UI 1407 with an email that includes information from the chart. In some embodiments, UI 1407 in FIG. 14D is shown in response to detecting contact 1420 at a position corresponding to the Email Image menu option in selection menu 1402.

FIGS. 15A-15C illustrate user interfaces for adjusting a chart view, in accordance with some embodiments. FIG. 15A shows UI 1501 including a chart. FIG. 15A also shows contact 1510 detected at position 1510-*a* on UI 1501. FIG. 15B shows UI 1503 and contact 1510 at position 1510-*b*. FIG. 15B also shows movement of the chart in concert with movement of contact 1510. For example, FIG. 15B shows both contact 1510 and the chart moving to the right from their respective positions in FIG. 15A. FIG. 15C shows UI 1505 and contact 1510 at position 1510-*c*. FIG. 15C also shows movement of the chart in concert with movement of contact 1510. For example, FIG. 15C shows both contact 1510 and the chart moving to the left from their respective positions in FIG. 15B.

Figure 16A:
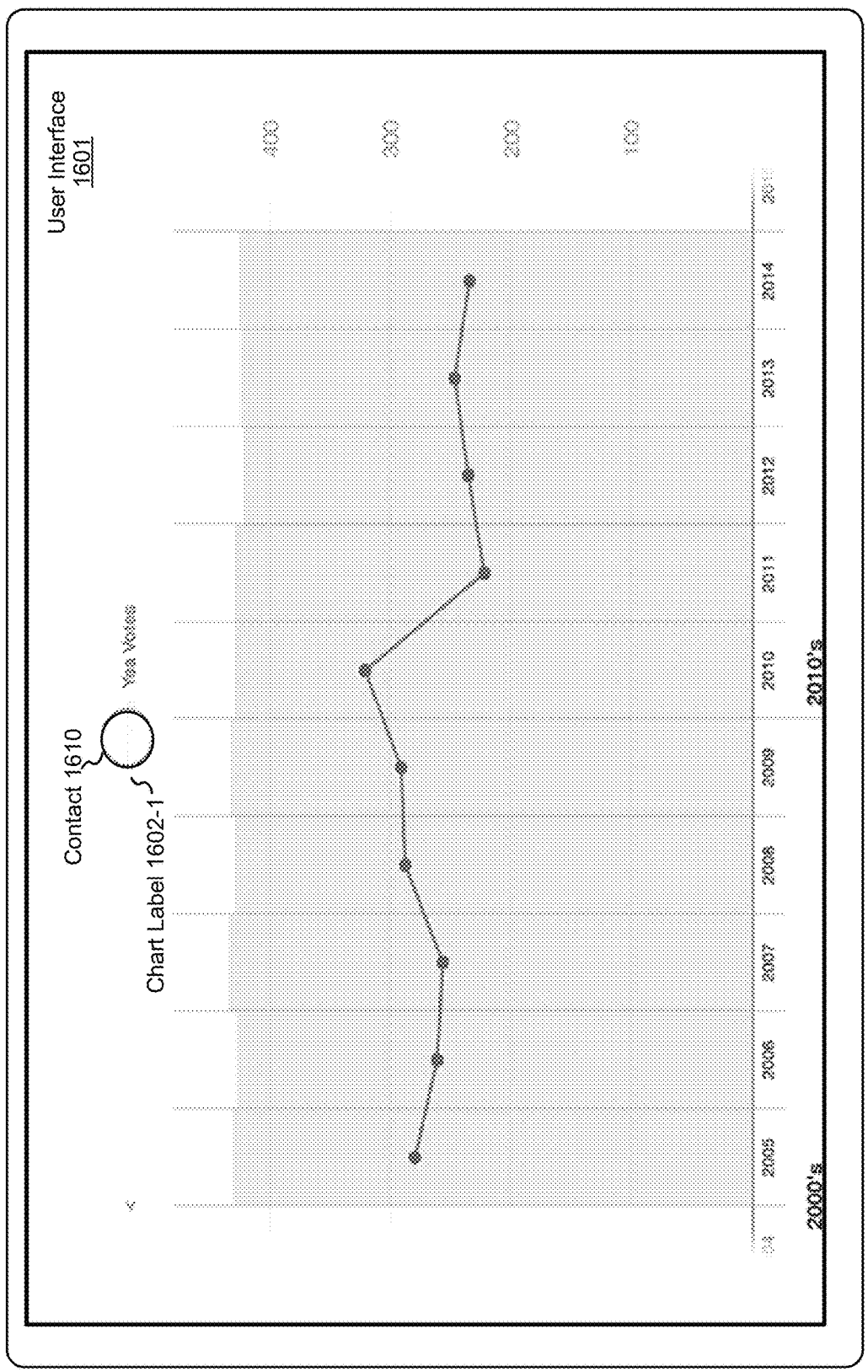
FIGS. 16A-16D illustrate user interfaces for changing chart categories, in accordance with some embodiments.
Figure 16B:
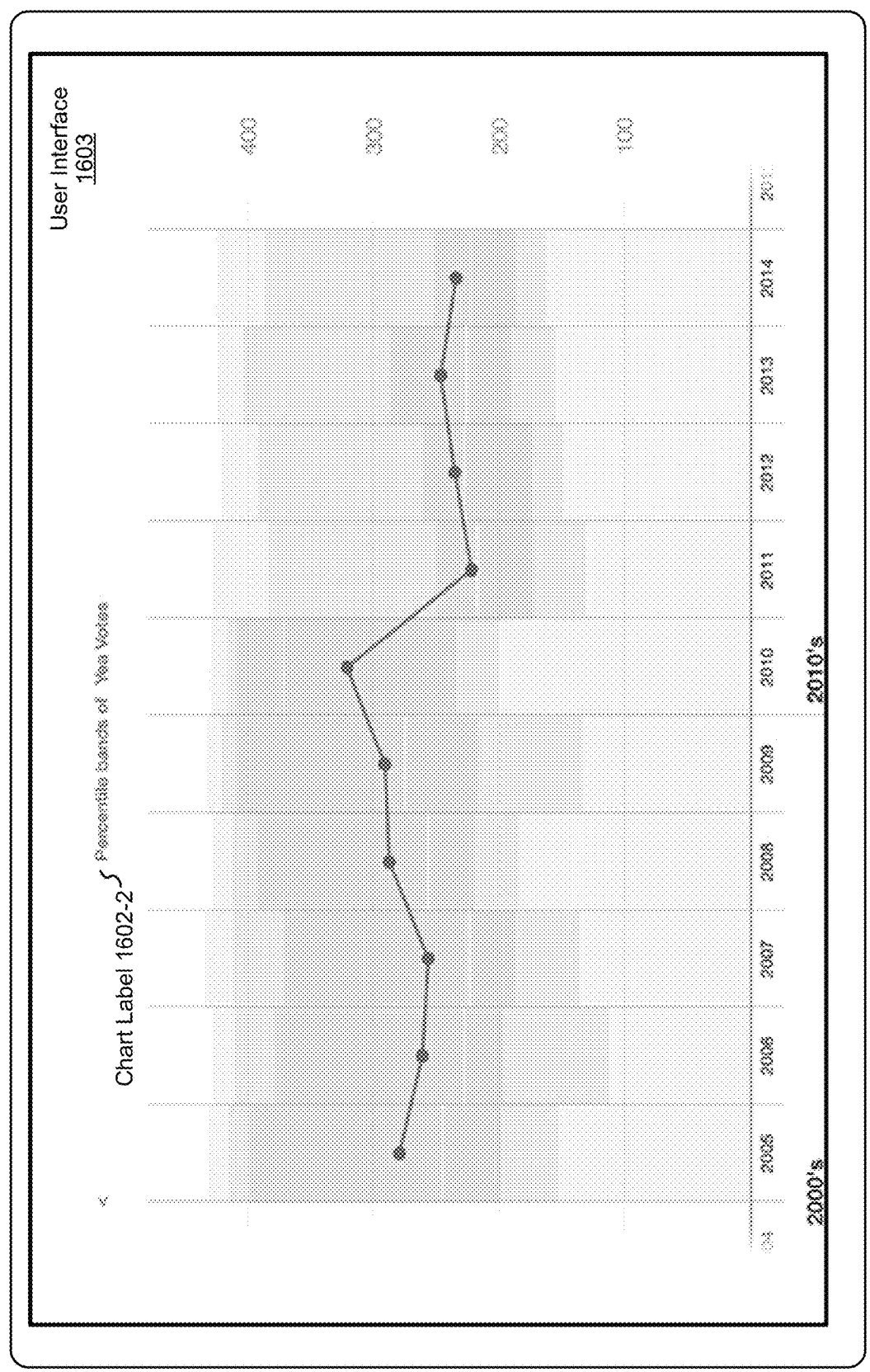

FIGS. 16A-16D illustrate user interfaces for changing chart categories, in accordance with some embodiments. FIG. 16A shows UI 1601 including a chart with chart label 1602-1 (Average). FIG. 16A also shows contact 1610 detected at a position corresponding to chart label 1602-1. FIG. 16B shows UI 1603 including a chart with chart label 1602-2 (Percentile Bands). In some embodiments, the chart shown in FIG. 16B replaces the chart shown in FIG. 16A in response to the detection of contact 1610 at a position on the chart label.

Figure 16C:
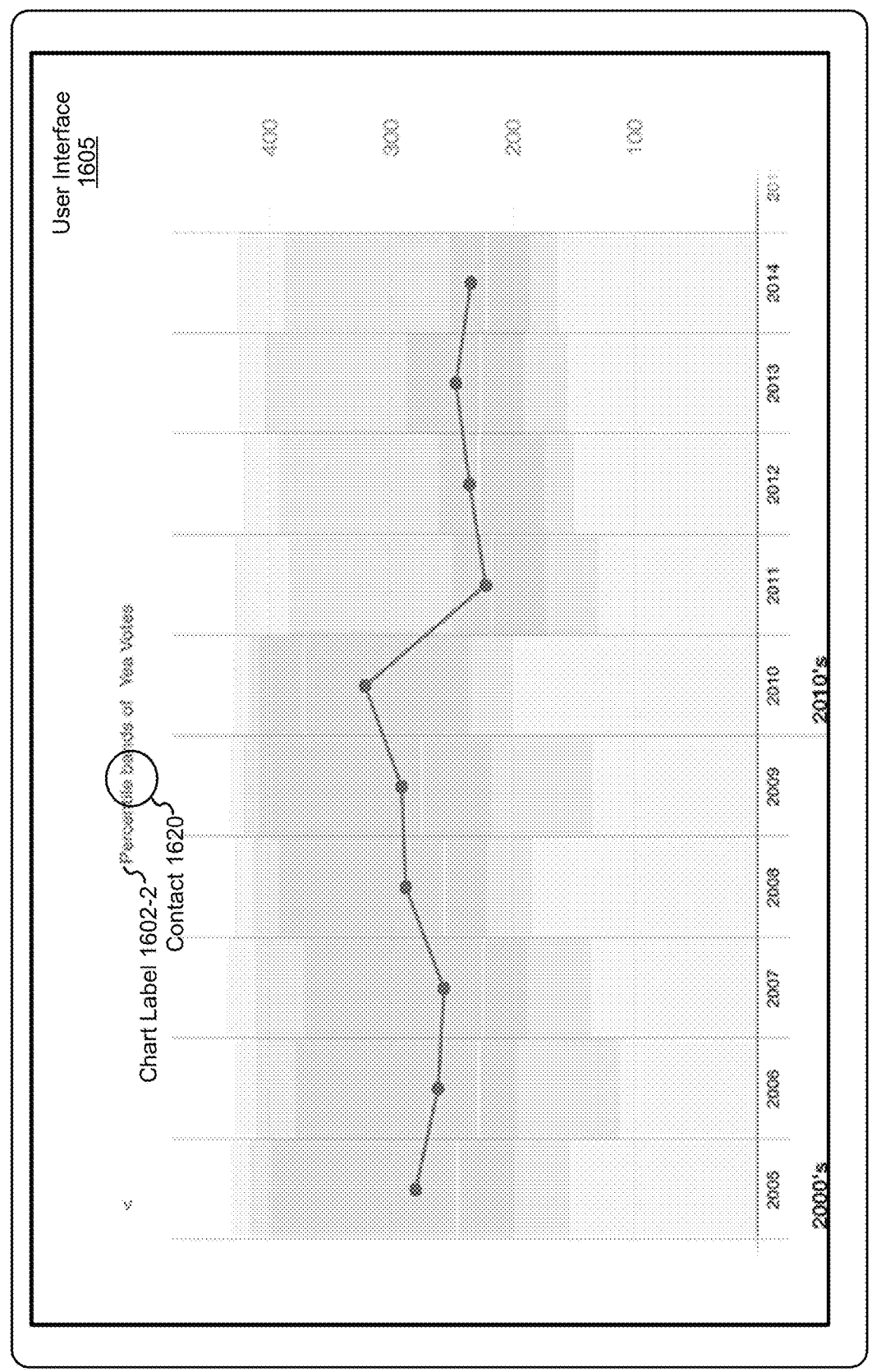
Figure 16D:
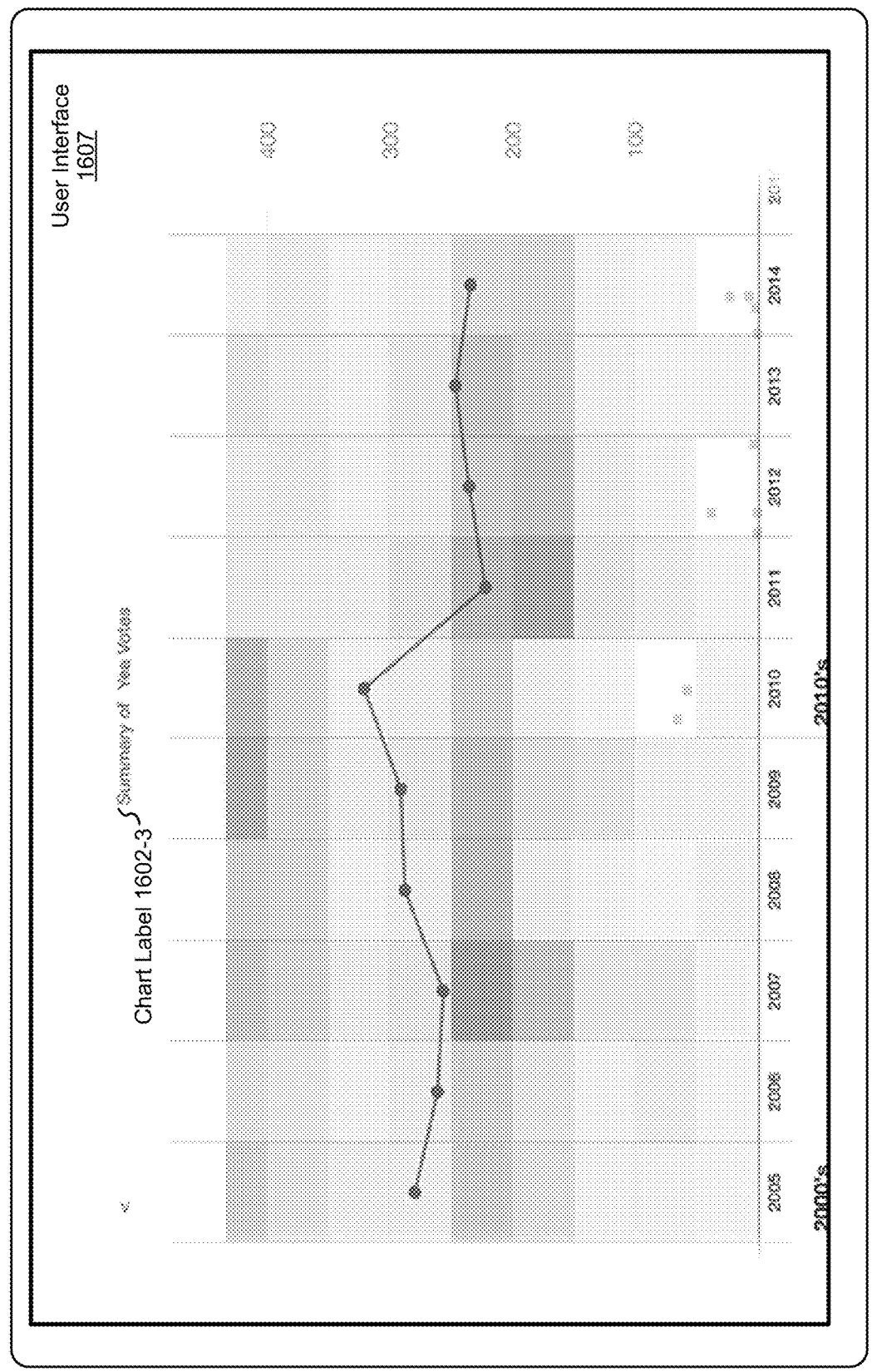

FIG. 16C shows UI 1605 including a chart with chart label 1602-2 (Percentile Bands). FIG. 16C also shows contact 1620 detected at a position corresponding to chart label 1602-2. FIG. 16D shows UI 1607 including a chart with chart label 1602-3 (Summary). In some embodiments, the chart shown in FIG. 16D replaces the chart shown in FIG. 16C in response to the detection of contact 1620 at a position on the chart label.

Figure 17A:
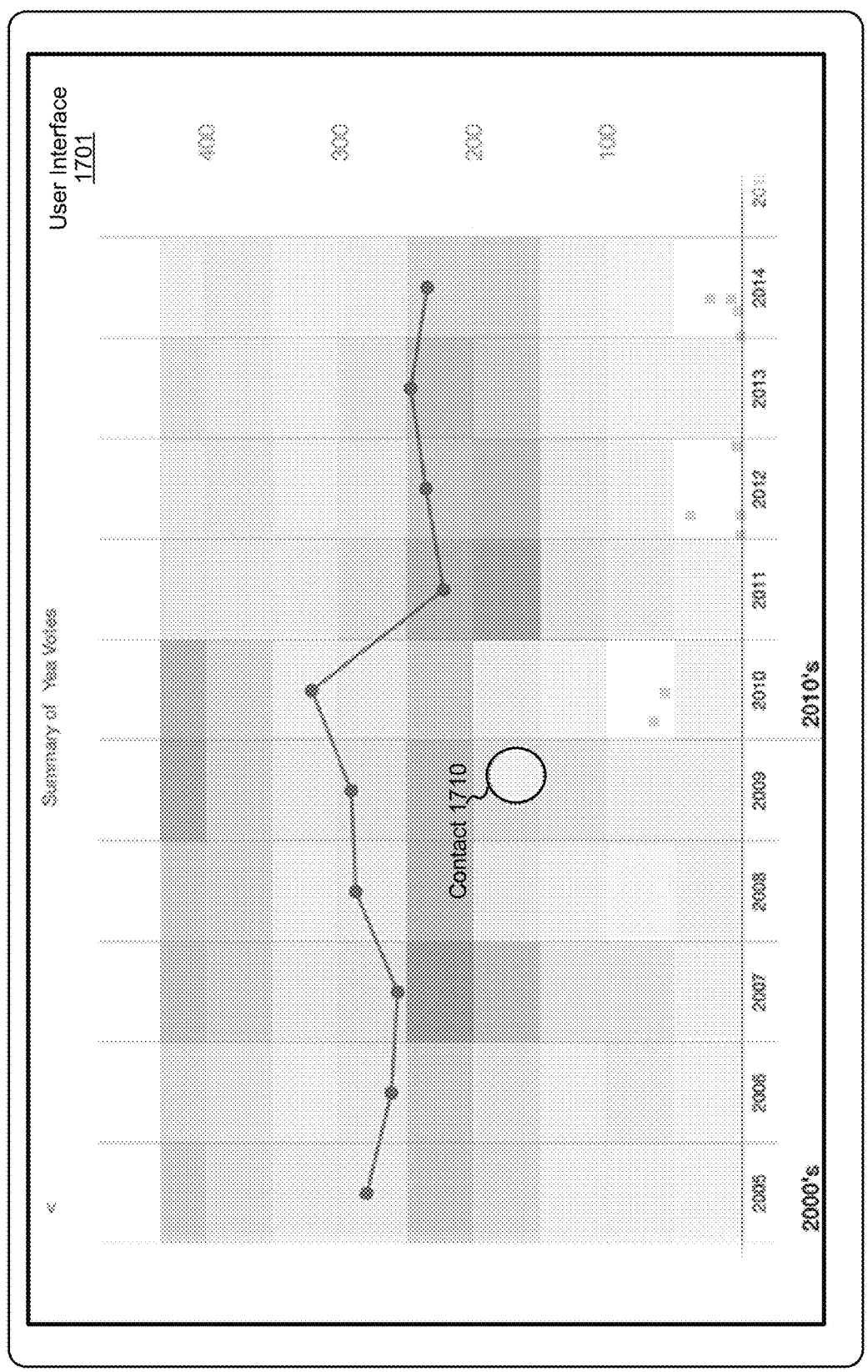
FIGS. 17A-17B illustrate user interfaces for selecting chart areas, in accordance with some embodiments.
Figure 17B:
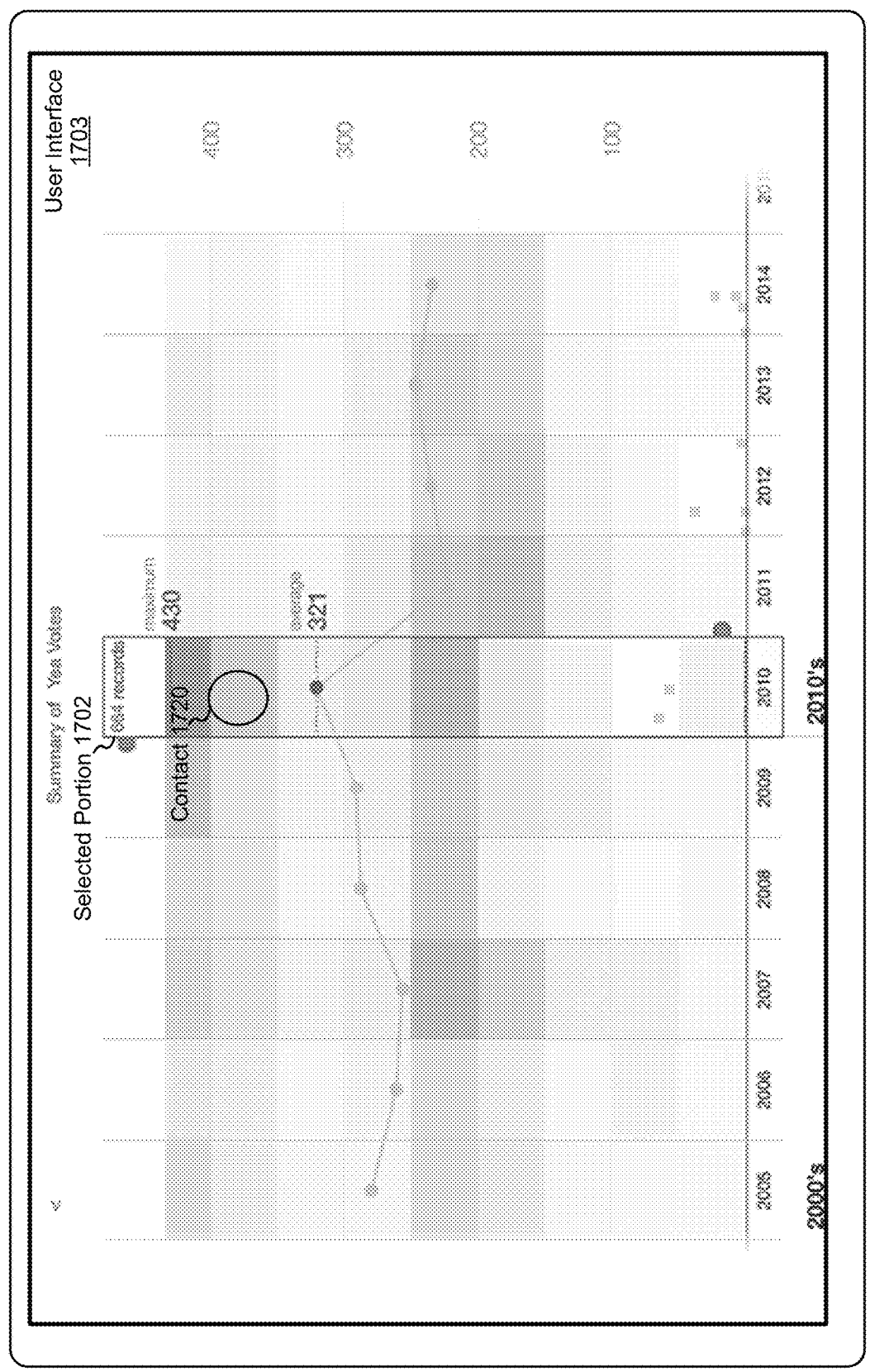

FIGS. 17A-17B illustrate user interfaces for selecting chart areas, in accordance with some embodiments. FIG. 17A shows UI 1701 including a chart. FIG. 17A also shows contact 1710 detected at a position corresponding to a portion of the chart. FIG. 17B shows UI 1703 including a chart with selected portion 1702 and information regarding selected portion 1702. For example, FIG. 17B shows information regarding the number of records in selected portion 1702. FIG. 17B also shows contact 1720 detected at a position corresponding to selected portion 1702. In some embodiments, selected portion 1702 is selected in response to detecting contact 1720. In some embodiments, contact 1710 detected in FIG. 17A represents a first type of touch input (e.g., a swipe gesture) and contact 1720 detected in FIG. 17B represents a second type of touch input (e.g., a tap gesture).

Figure 18A:
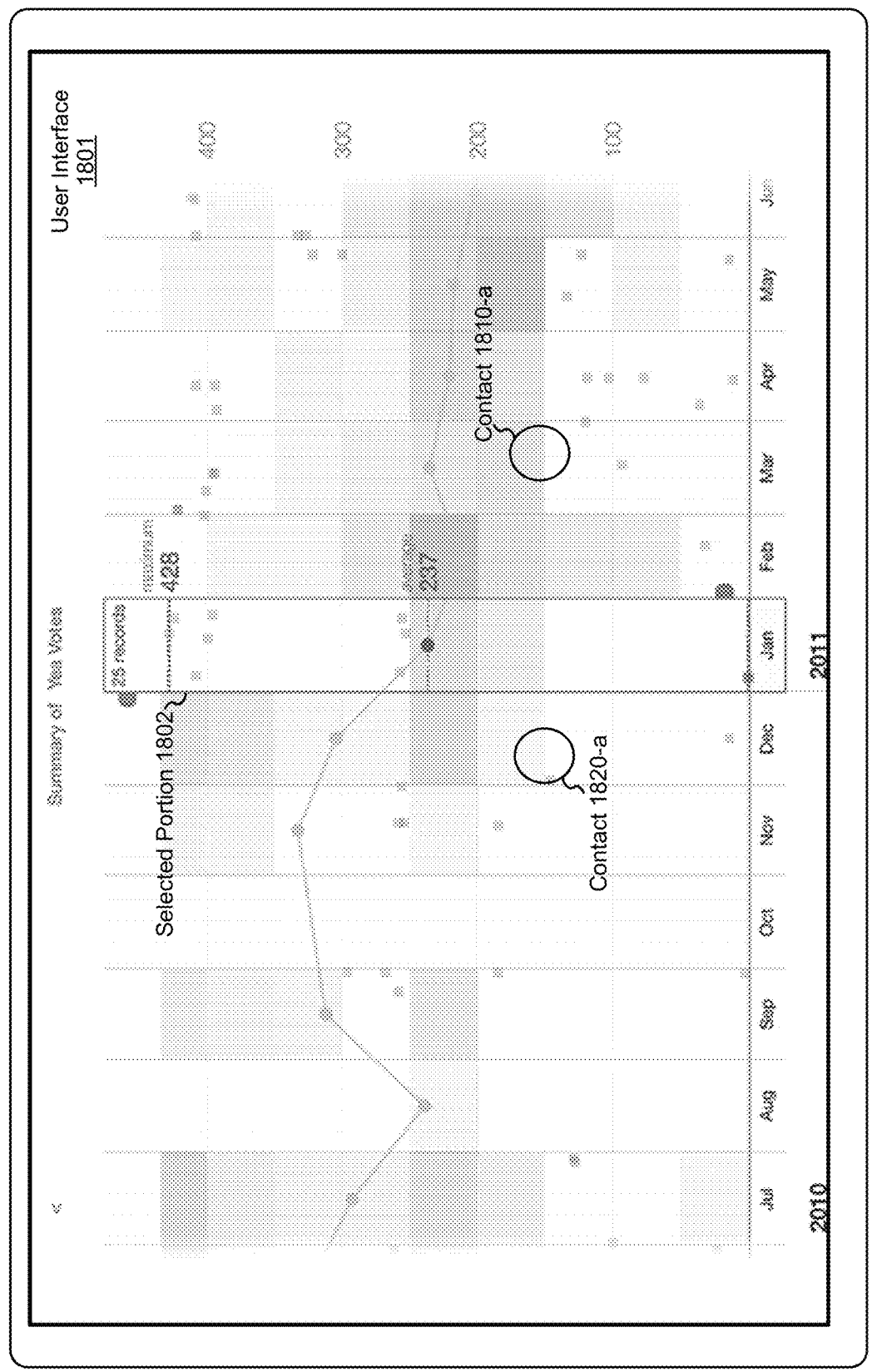
FIGS. 18A-18E illustrate user interfaces for adjusting chart magnification, in accordance with some embodiments.
Figure 18B:
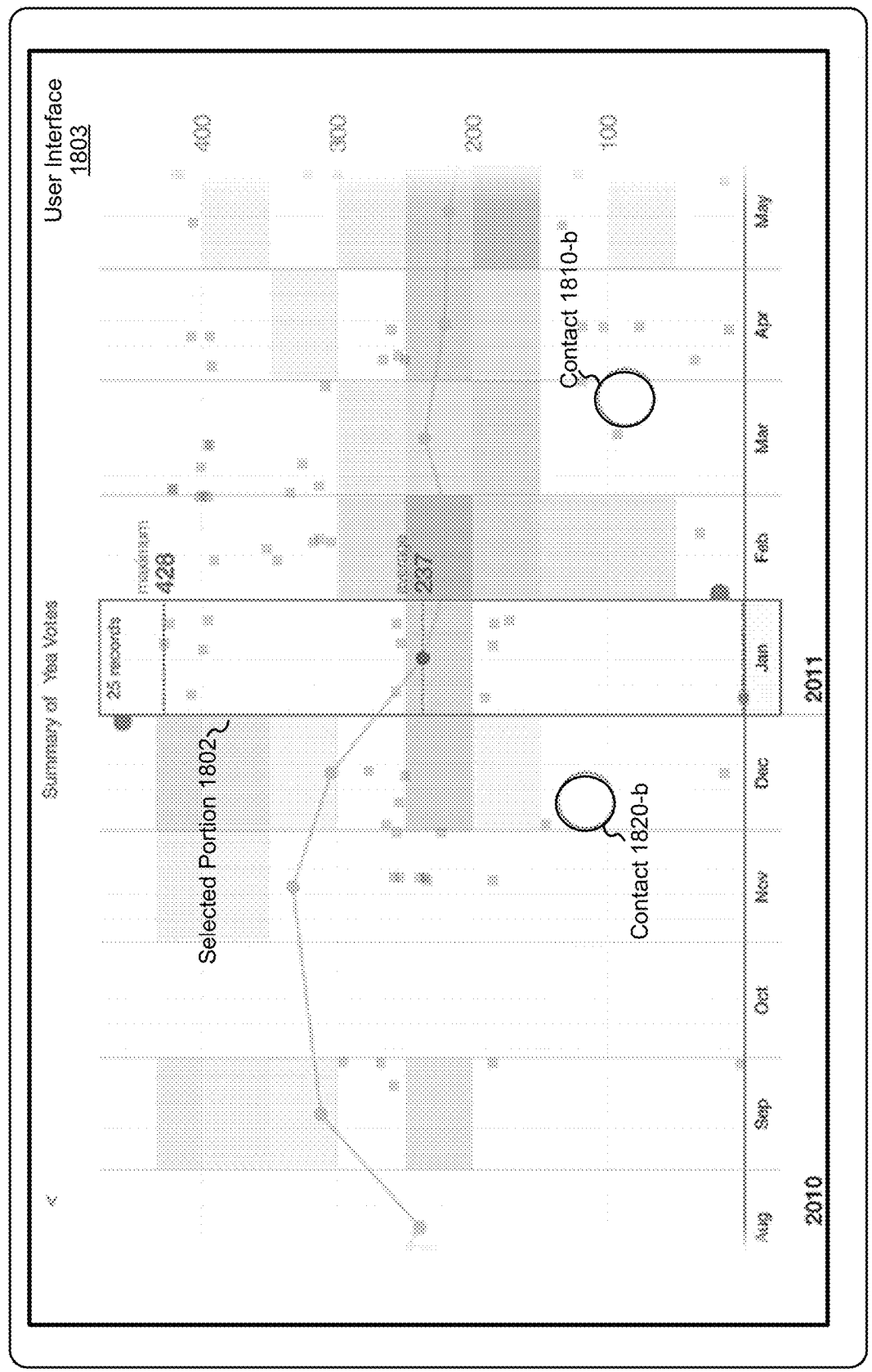
Figure 18C:
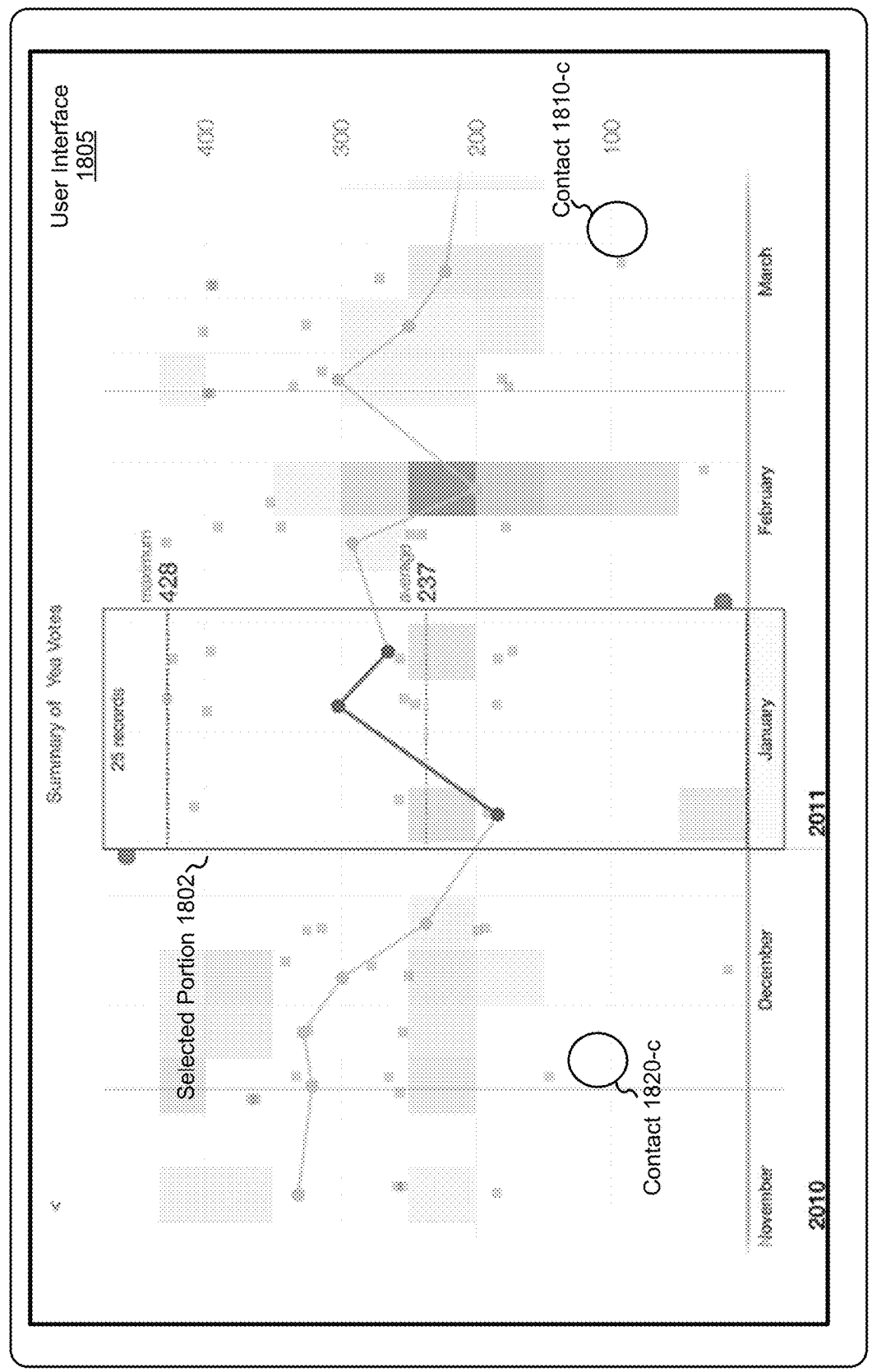

FIGS. 18A-18E illustrate user interfaces for adjusting chart magnification, in accordance with some embodiments. FIG. 18A shows UI 1801 including a chart with selected portion 1802 at an initial magnification. FIG. 18A also shows contacts 1810 and 1820 detected at positions 1810-*a* and 1820-*a* respectively. FIG. 18B shows contacts 1810 and 1820 detected at positions 1810-*b* and 1820-*b* respectively and shows UI 1803 including the chart at a second magnification (e.g., zoomed in from the initial magnification). The relative positions of contacts 1810 and 1820 in FIG. 18B are further apart than the positions of contacts 1810 and 1820 in FIG. 18A and represent a de-pinch gesture on the touch screen. FIG. 18C shows contacts 1810 and 1820 detected at positions 1810-*c* and 1820-*c* respectively and shows UI 1805 including the chart at a third magnification (e.g., zoomed in from the second magnification).

Figure 18D:
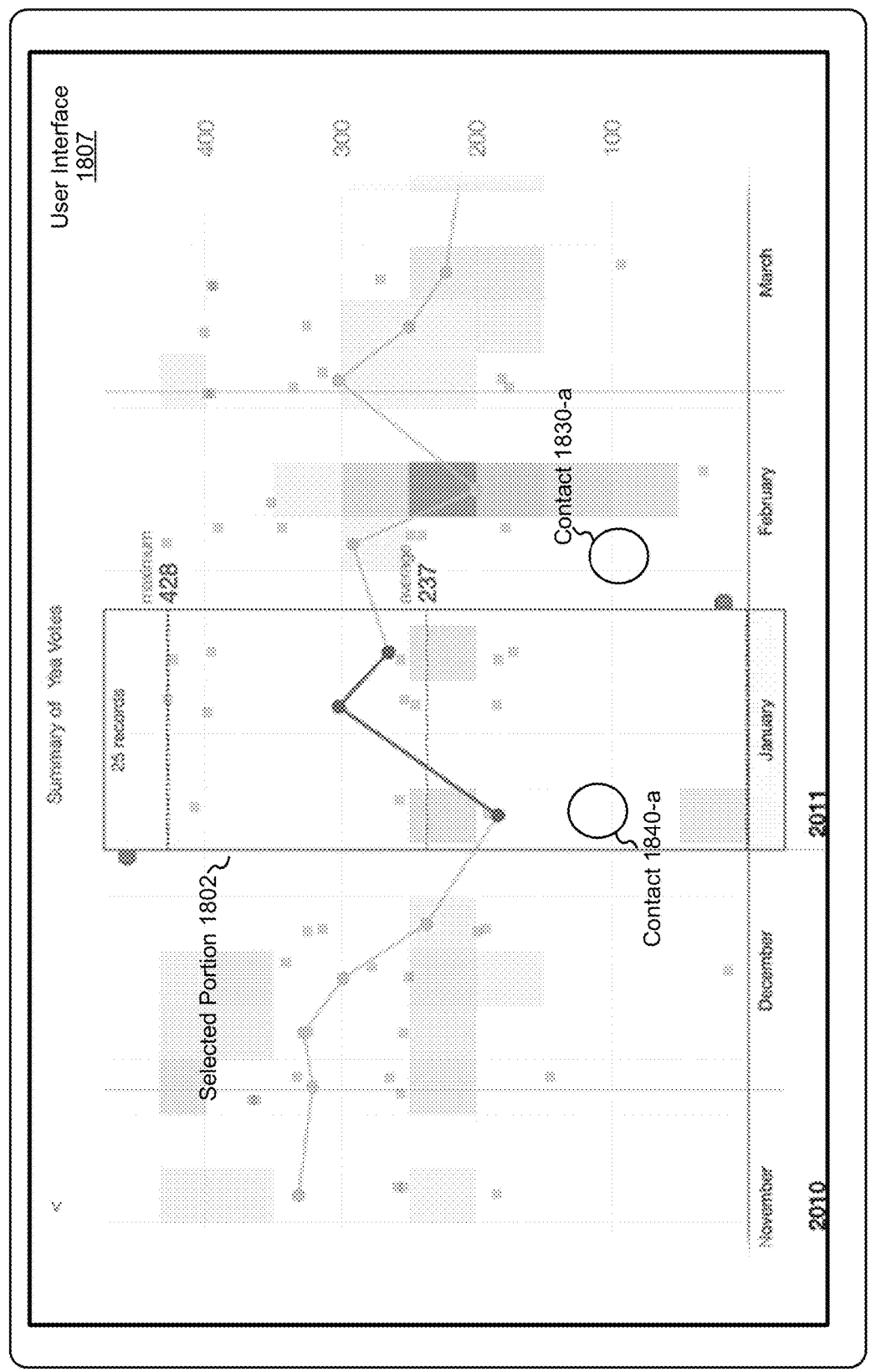
Figure 18E:
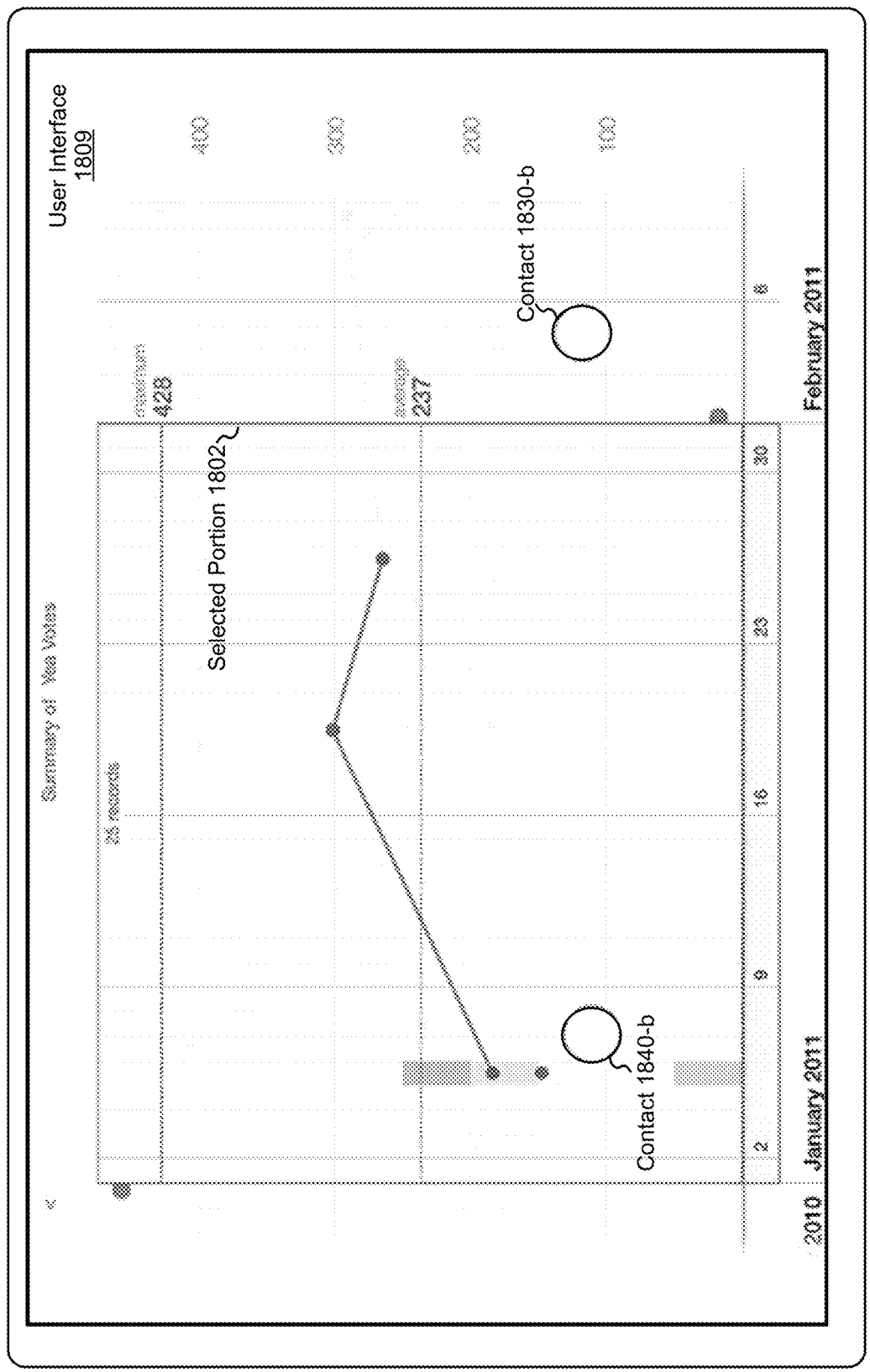

FIG. 18D shows UI 1807 including the chart at a fourth magnification. FIG. 18D also shows contacts 1830 and 1840 detected at positions 1830-a and 1840-a respectively. FIG. 18E shows contacts 1830 and 1840 detected at positions 1830-b and 1840-b respectively and shows UI 1809 including the chart at a fifth magnification (e.g., zoomed in from the fourth magnification).

Figure 19A:
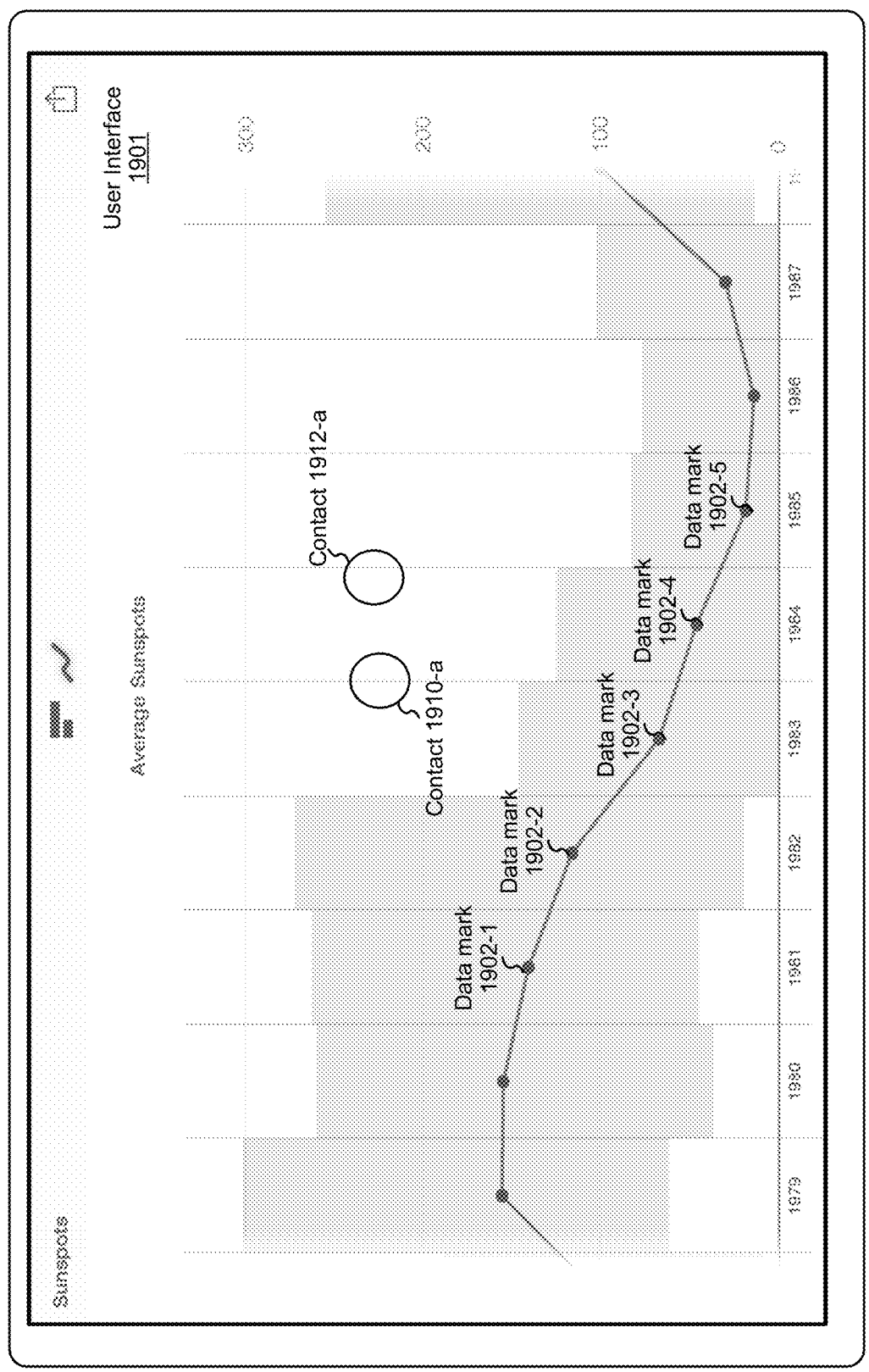
FIGS. 19A-19D illustrate user interfaces for adjusting chart magnification, in accordance with some embodiments.
Figure 19B:
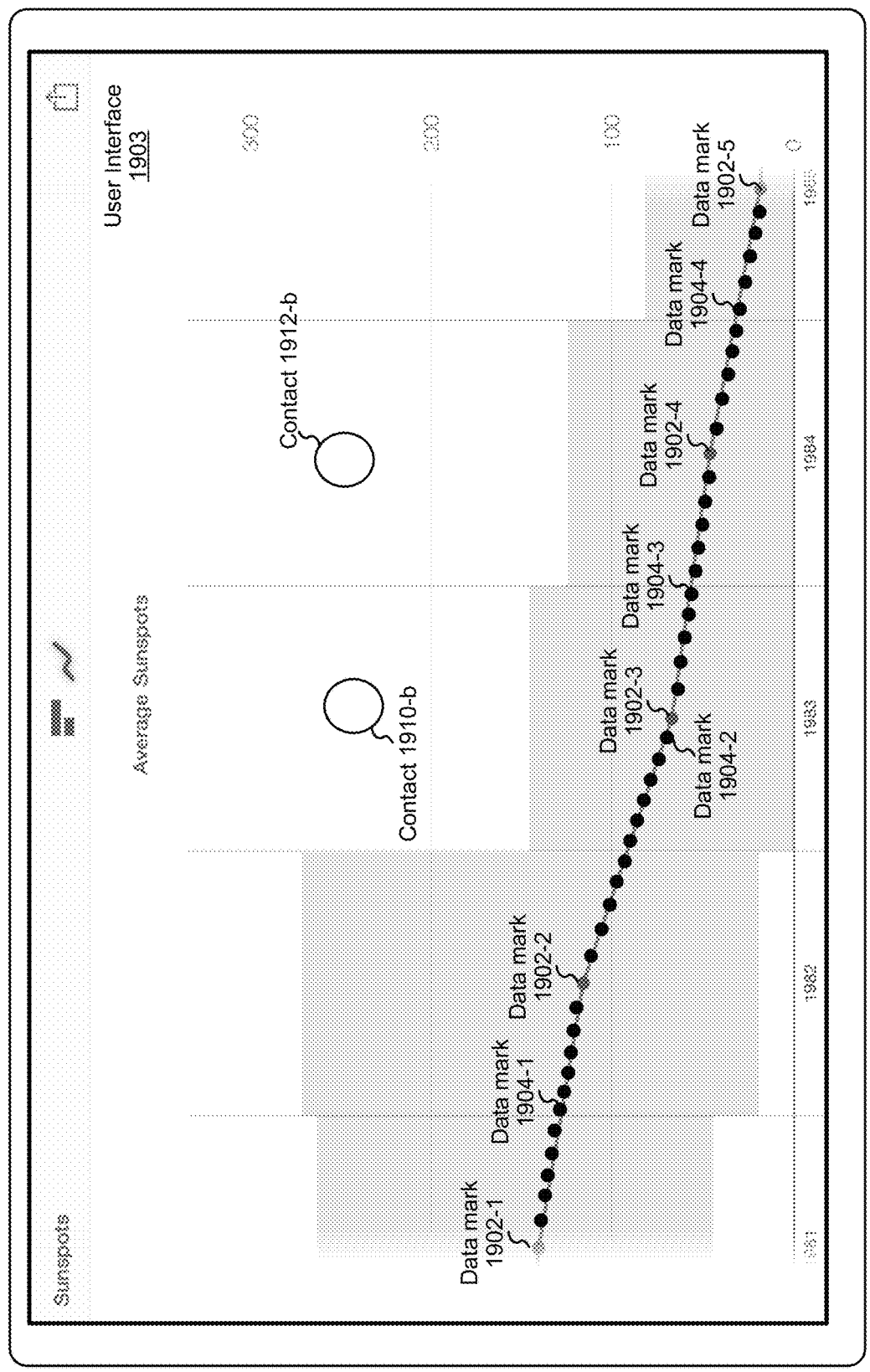
Figure 19C:
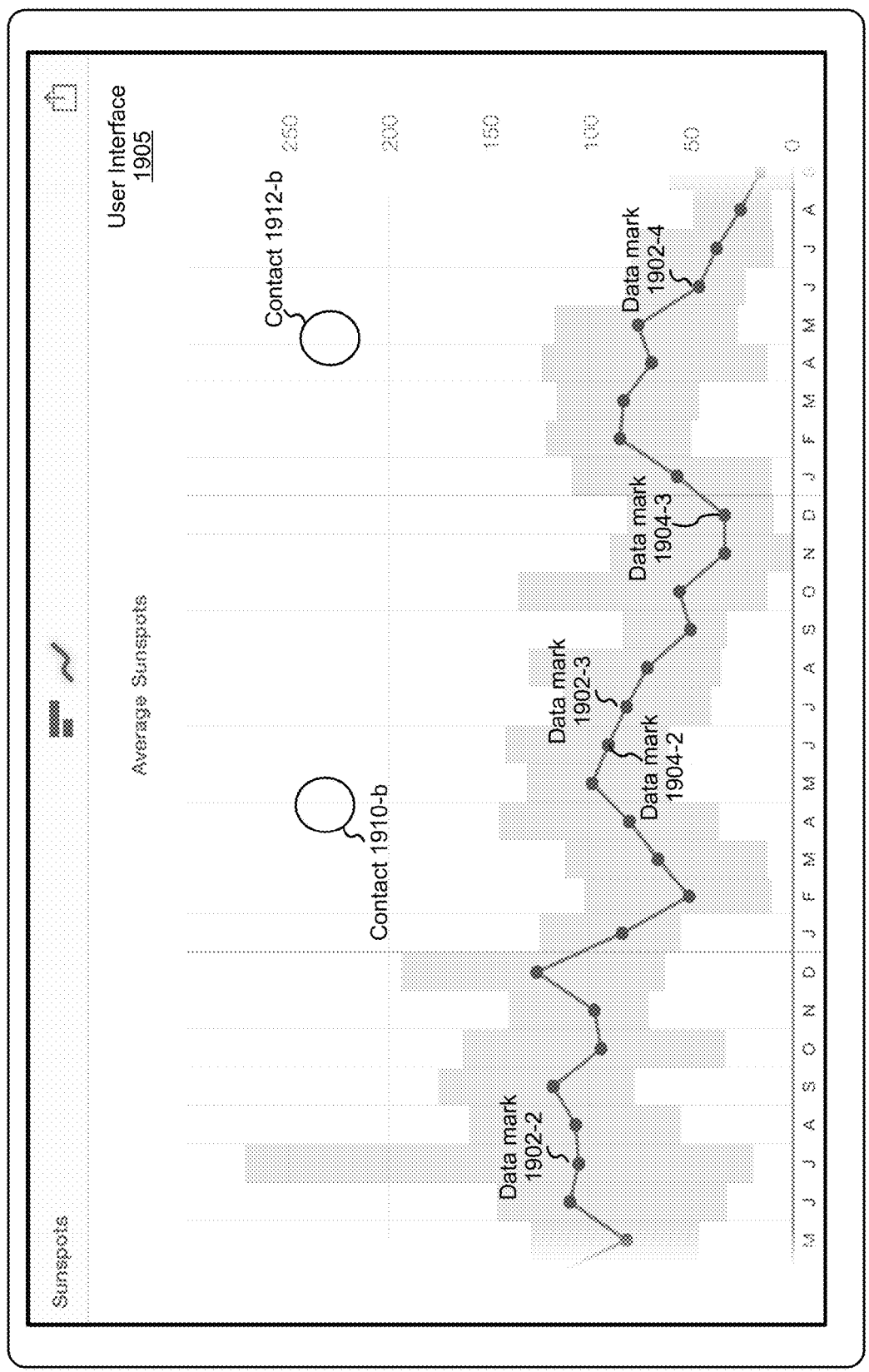
Figure 19D:
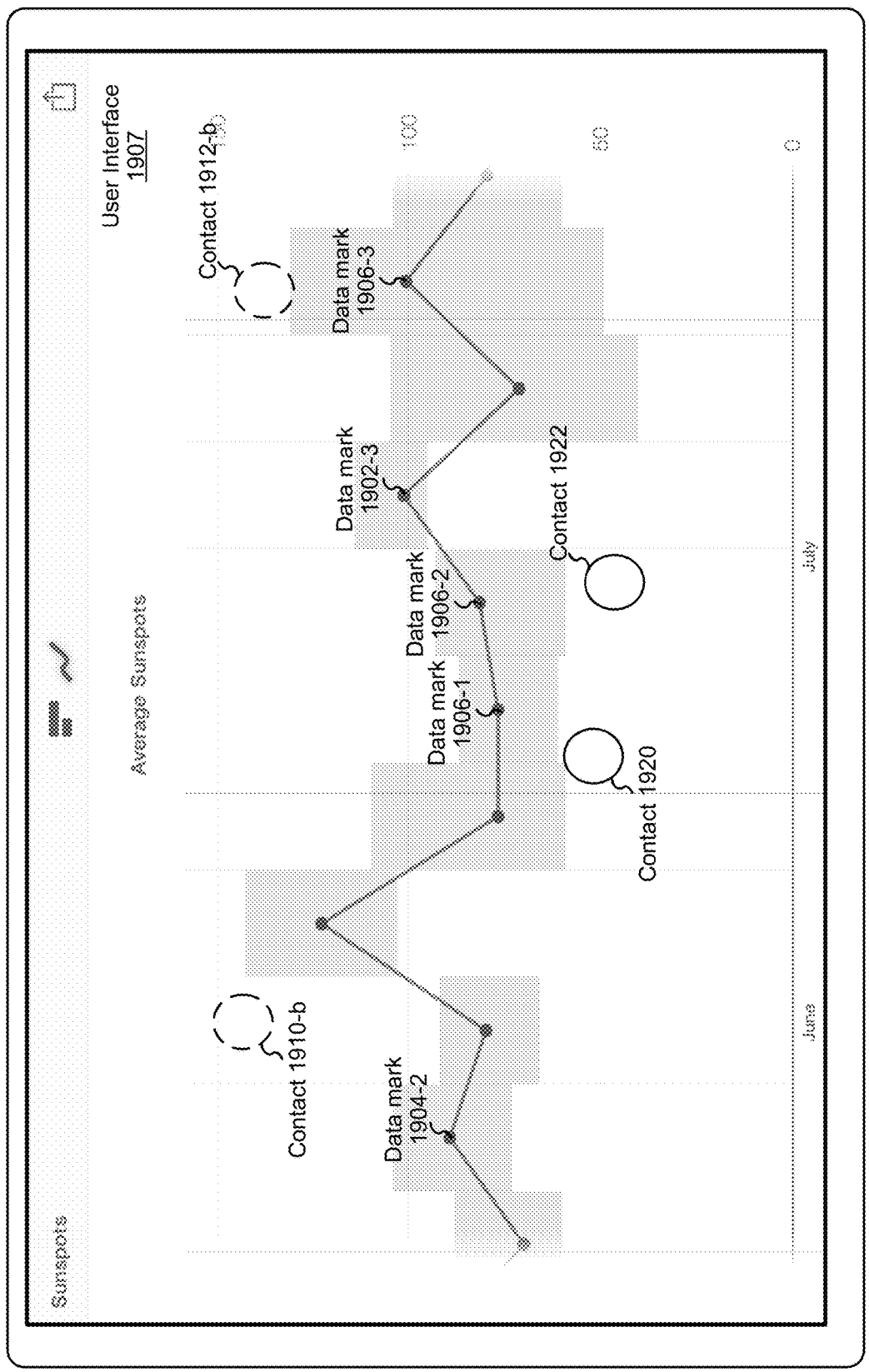

FIGS. 19A-19D illustrate user interfaces for adjusting chart magnification, in accordance with some embodiments. FIG. 19A shows UI 1901 including a chart at an initial magnification. FIG. 19A also shows the chart including data marks 1902 (e.g., data marks 1902-1 through 1902-5). FIG. 19B shows UI 1903 including the chart at a second magnification (e.g., zoomed in from the initial magnification). FIG. 19B also shows the chart including data marks 1902 (e.g., a subset of data marks 1902 shown in FIG. 19A) and data marks 1904. FIG. 19C shows UI 1905 including the chart at a third magnification (e.g., zoomed in from the second magnification). FIG. 19C also shows the chart including data marks 1902 and data marks 1904. In some embodiments, data marks 1904 are initially placed on the line connecting data marks 1902 as shown in FIG. 19B and are animatedly moved (e.g., using continuous motion rather than a jump) to their respective ordinates as shown in FIG. 19C. FIG. 19D shows UI 1907 including the chart with data marks 1902 and data marks 1904 at a fourth magnification (e.g., zoomed in from the third magnification).

Figure 19E:
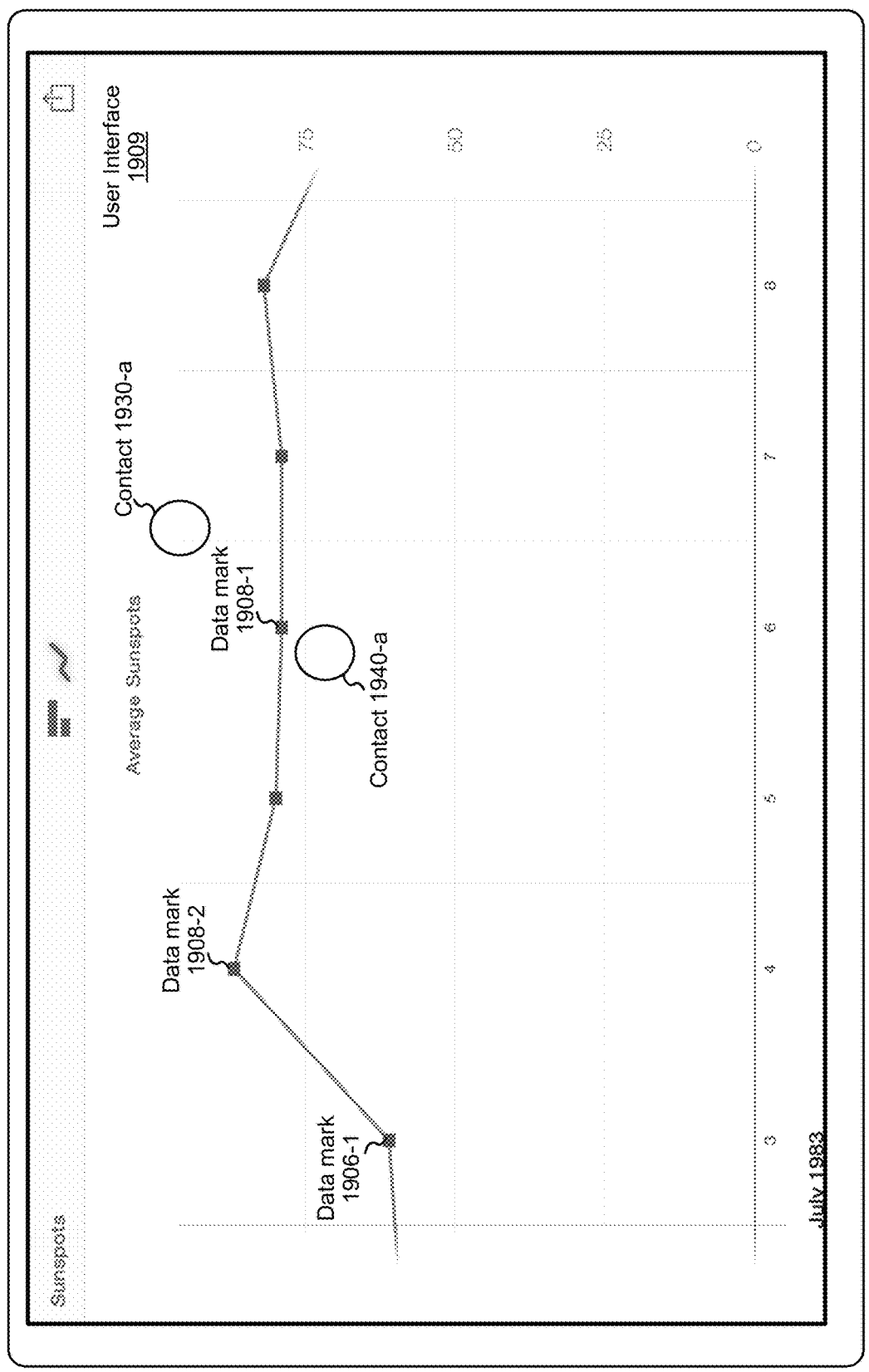
FIGS. 19E-19L illustrate user interfaces for displaying information about a data mark, in accordance with some embodiments.
Figure 19F:
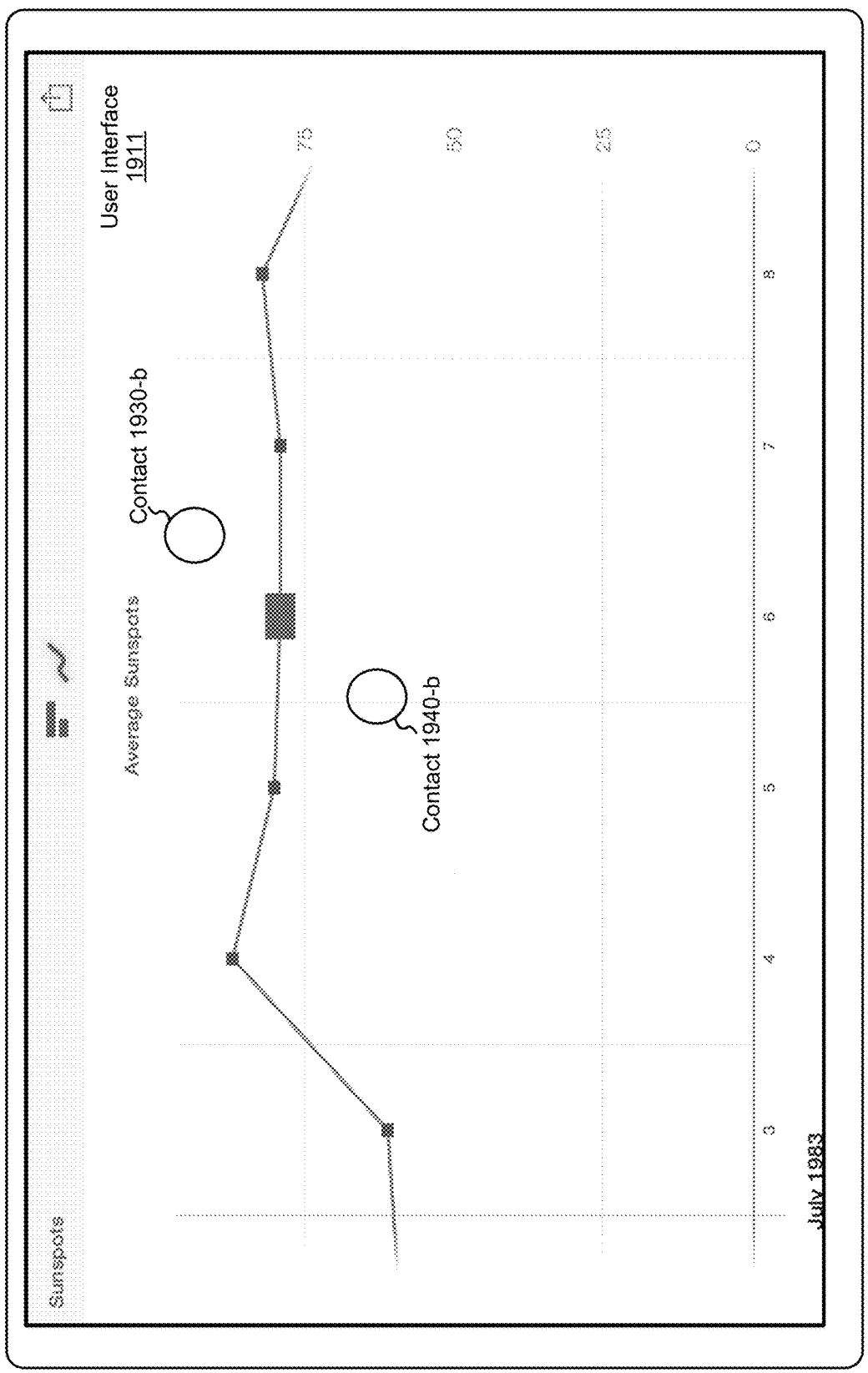
Figure 19G:
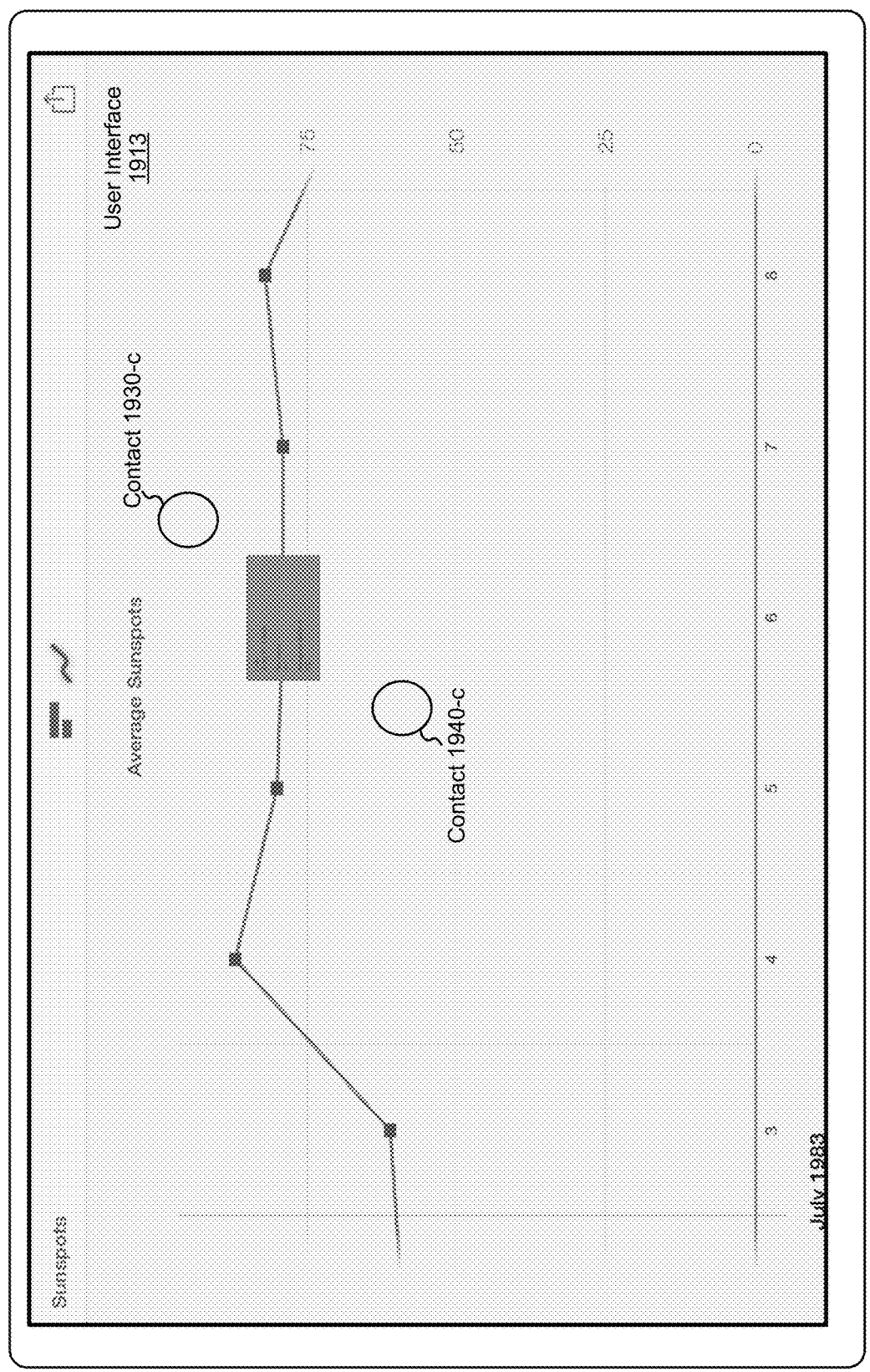
Figure 19H:
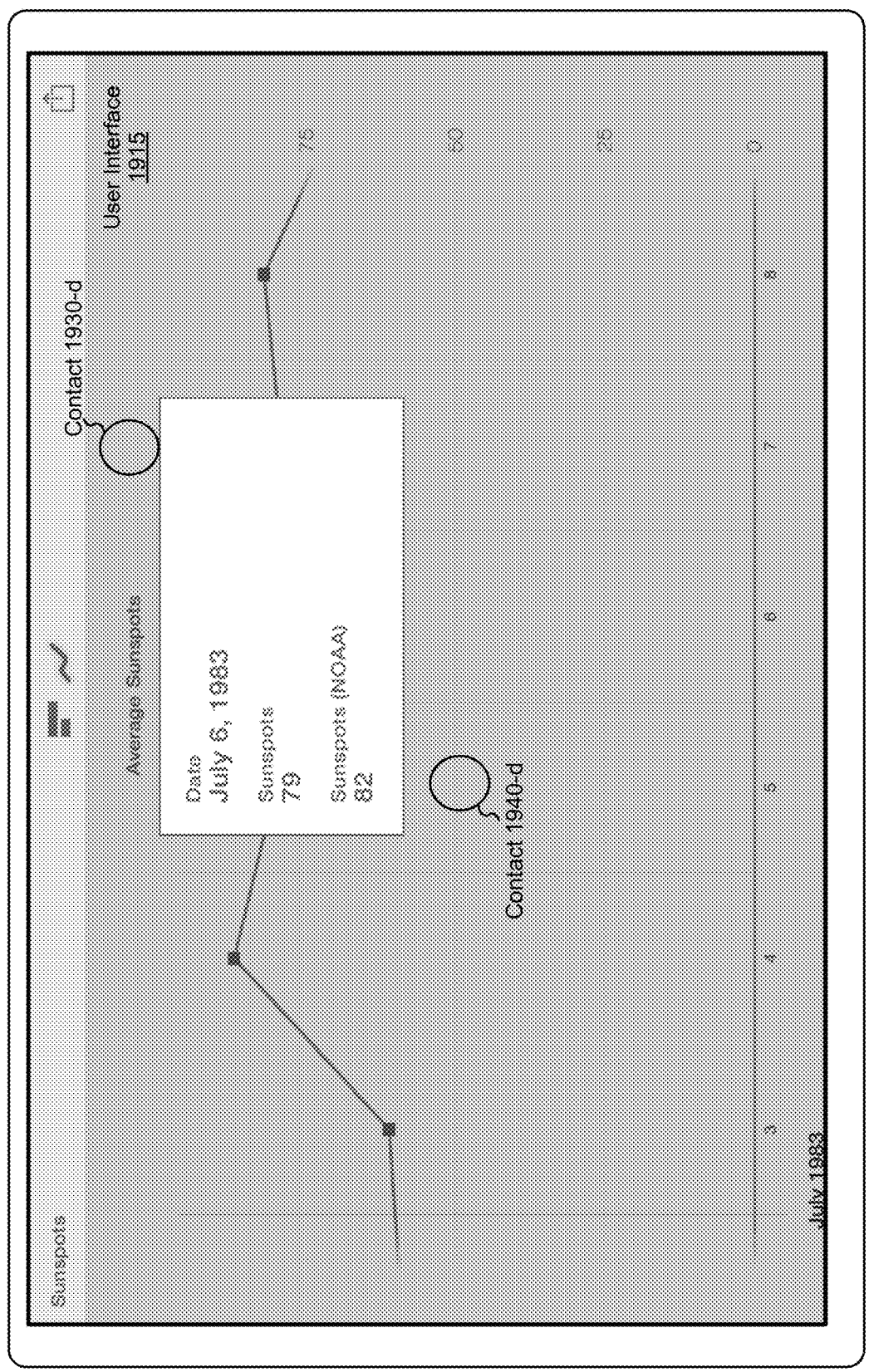
Figure 19I:
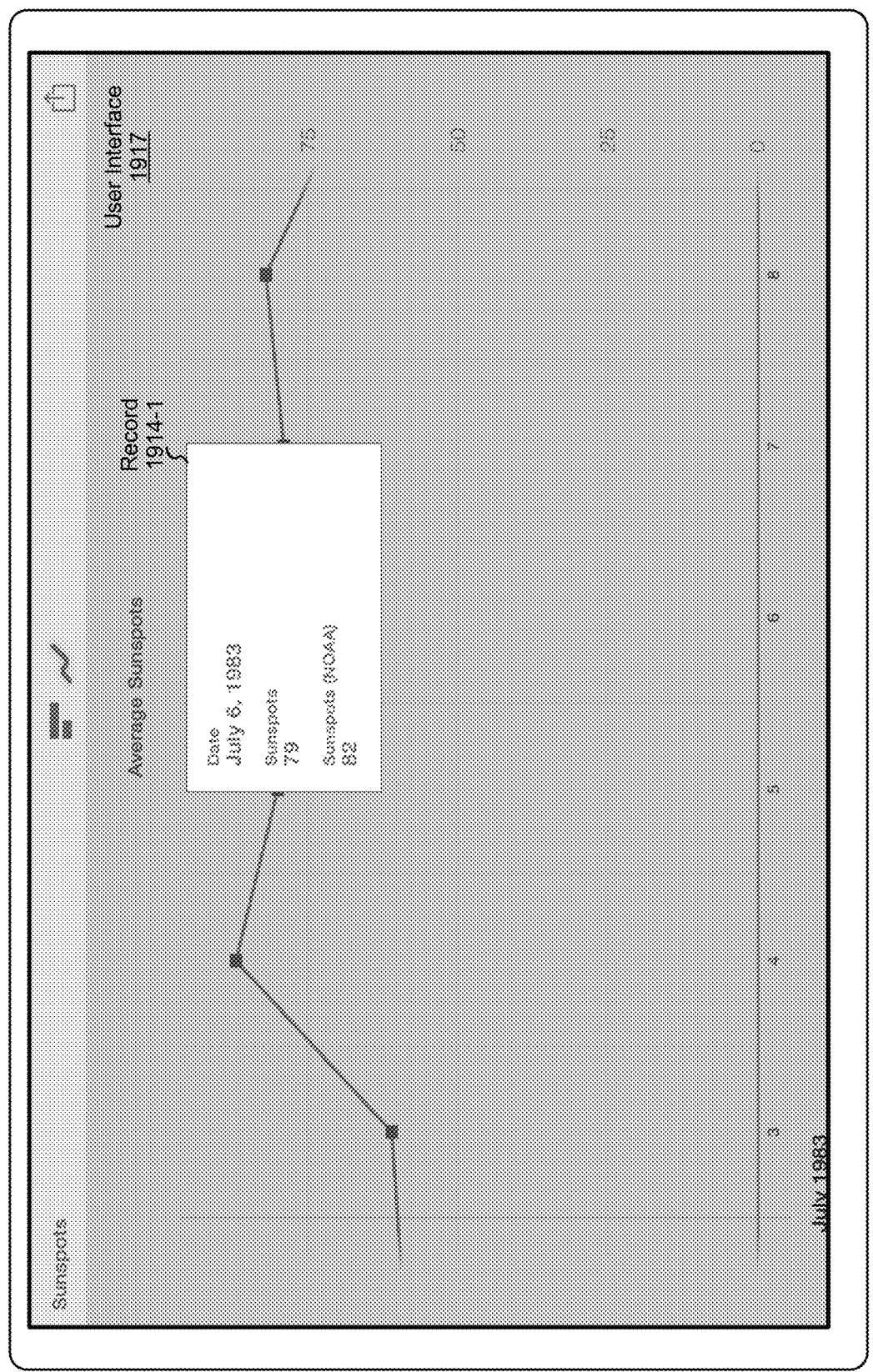

FIGS. 19E-19L illustrate user interfaces for displaying information about a data mark, in accordance with some embodiments. FIG. 19E shows UI 1909 including a chart at an initial magnification. FIG. 19E also shows the chart including data marks 1908 (e.g., including data marks 1908-1 and 1908-2). FIG. 19E also shows contacts 1930 and 1940 detected at positions 1930-a and 1940-a respectively. FIGS. 19F-19I show an animated transition from data mark 1908-1 to record 1914-1 in concert with movement of contacts 1930 and 1940 (e.g., the movement of contacts 1930 and 1940 represent a de-pinch gesture). Specifically, FIG. 19F shows UI 1911 including contacts 1930 and 1940 detected at positions 1930-b and 1940-b respectively and an animated transition (e.g., using continuous movement) from data mark 1908-1 to record 1914-1 in concert with movement of contacts 1930 and 1940. FIG. 19G shows UI 1913 including contacts 1930 and 1940 detected at positions 1930-c and 1940-c respectively and a continued animated transition from data mark 1908-1 to record 1914-1 in concert with movement of contacts 1930 and 1940. FIG. 19H shows UI 1915 including contacts 1930 and 1940 detected at positions 1930-d and 1940-d respectively and a continued animated transition from data mark 1908-1 to record 1914-1 in concert with movement of contacts 1930 and 1940. FIG. 19I shows UI 1917 including record 1914-1. In some embodiments, UI 1917 shown in FIG. 19I is displayed in response to ceasing to detect contacts 1930 and 1940 after completion of a de-pinch gesture (e.g., detecting lift of the contacts).

Figure 19J:
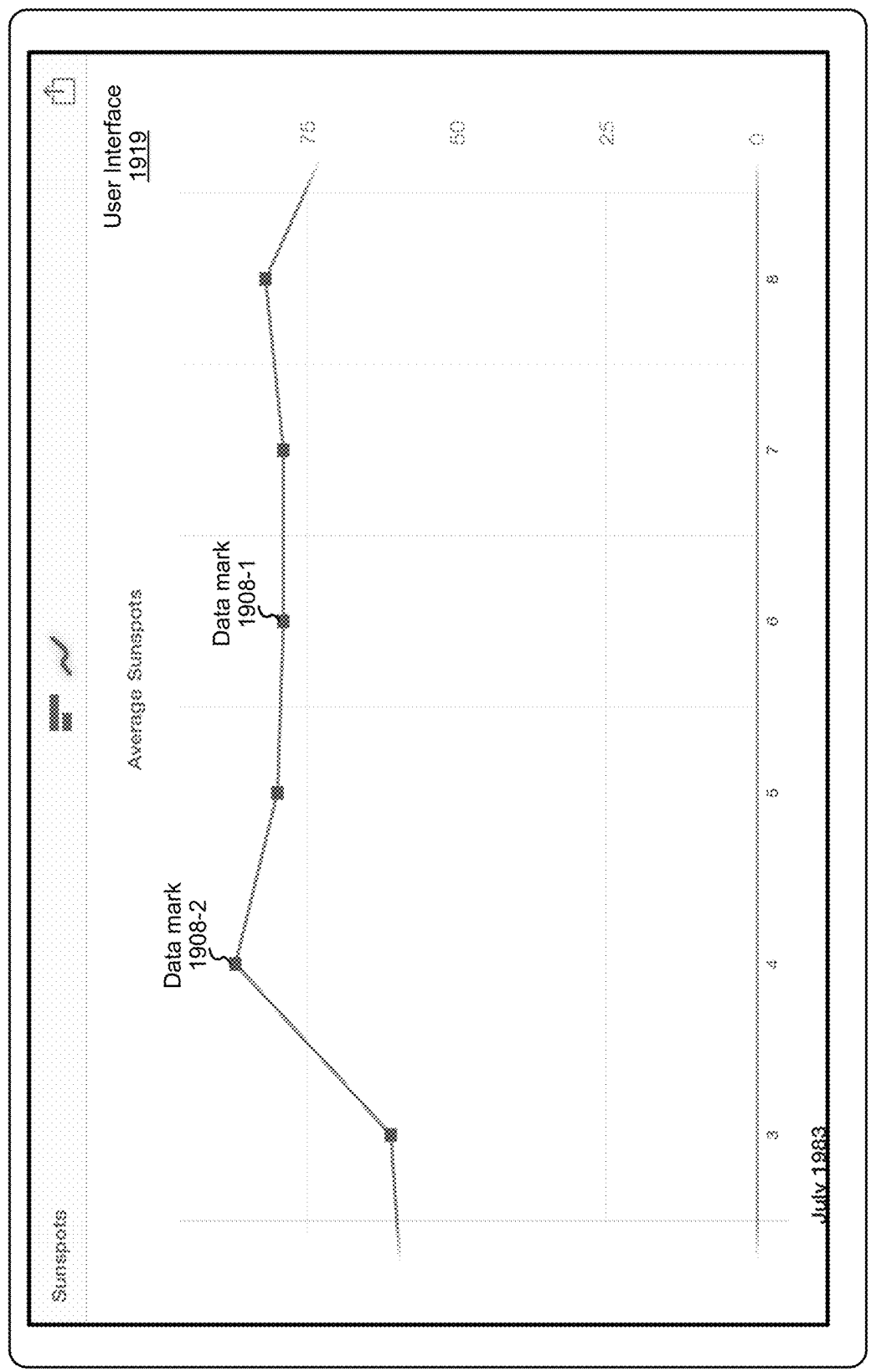
Figure 19K:
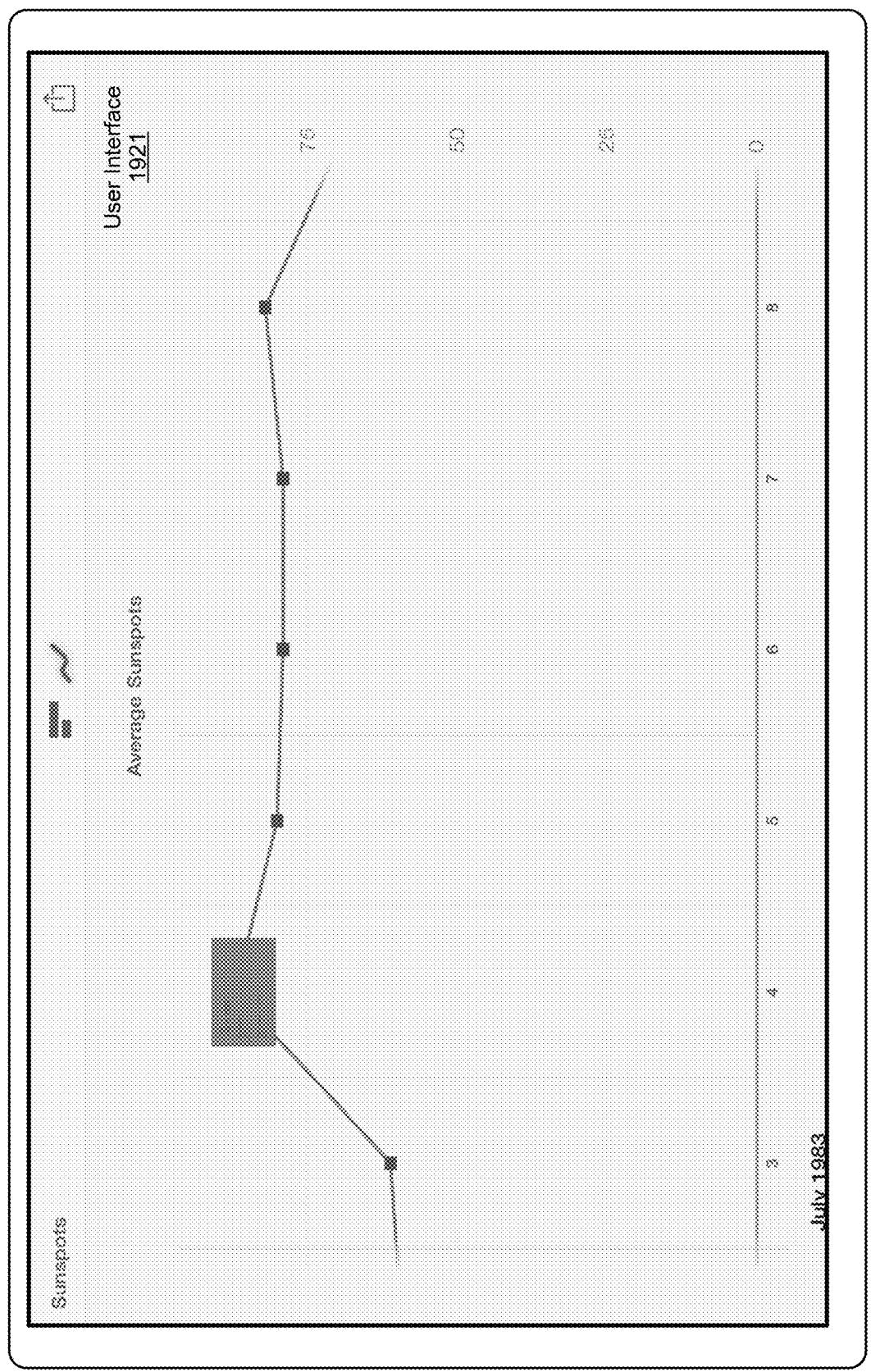
Figure 19L:
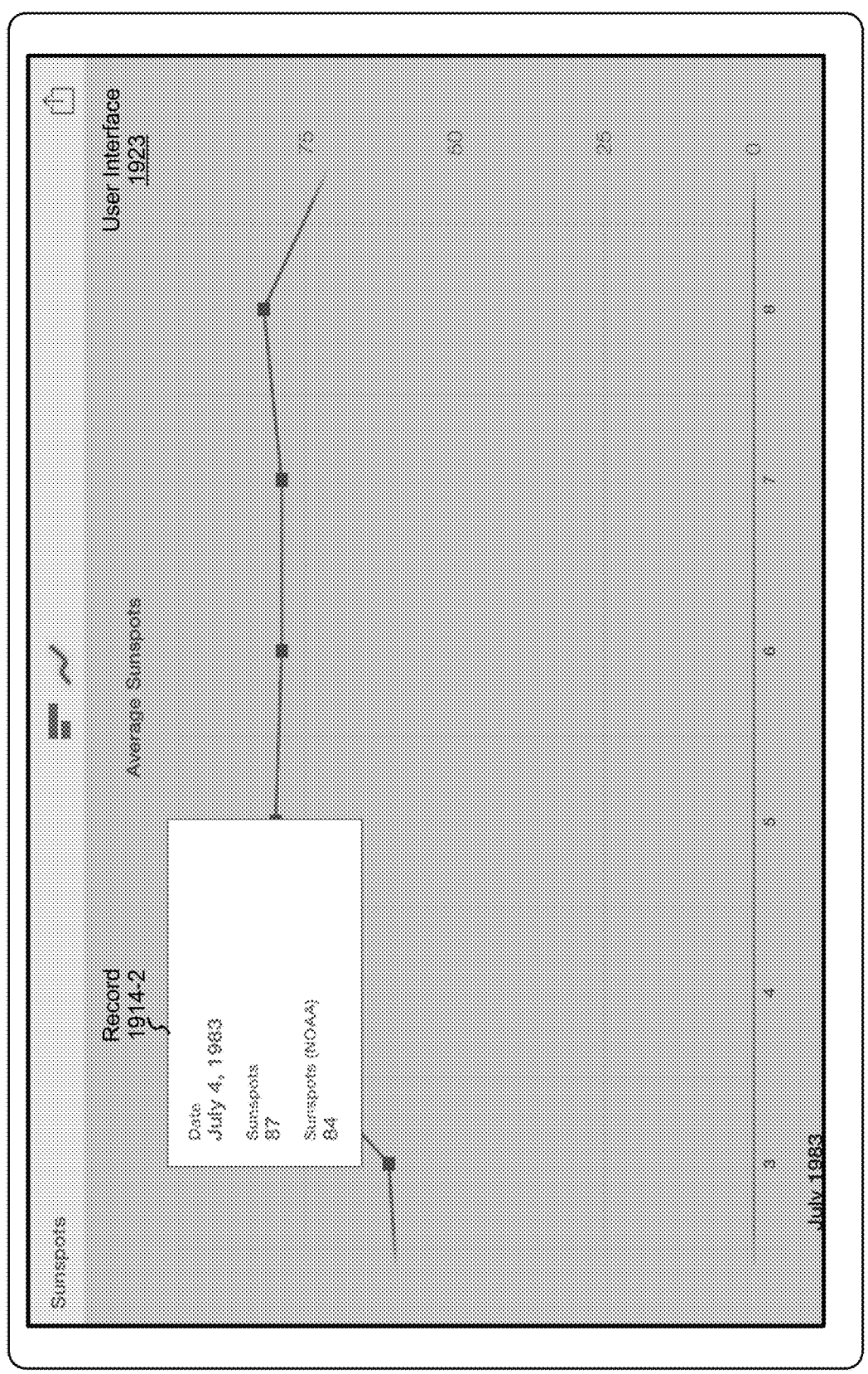

FIG. 19J shows UI 1919 including a chart at an initial magnification. FIG. 19J also shows the chart including data marks 1908 (e.g., including data marks 1908-1 and 1908-2). FIGS. 19K and 19L show an animated transition from data mark 1908-2 to record 1914-2. In some embodiments, the animated transition from data mark 1908-2 to record 1914-2 is in concert with a touch input (e.g., a de-pinch gesture).

Attention is now directed towards methods that are, optionally, implemented on portable multifunction device 100 or device 200.

FIGS. 20A-20B provide a flow diagram illustrating method 2000 of data visualization, in accordance with some embodiments. Method 2000 is performed at an electronic device (e.g., portable multifunction device 100, FIG. 1, or device 200, FIG. 2) with a display and a touch-sensitive surface. In some embodiments, the display is a touch screen display and the touch-sensitive surface is on the display. In some embodiments, the display is separate from the touch-sensitive surface. In some embodiments, method 2000 is governed by instructions that are stored in a non-transitory computer readable storage medium and that are executed by one or more processors of a device, such as the one or more processors 302 of portable multifunction device 100 and/or the one or more processors 352 of multifunction device 200, as shown in FIGS. 3A-3B. Some operations in method 2000 are, optionally, combined and/or the order of some operations is, optionally, changed.

As described below, method 2000 provides an intuitive way to adjust chart magnification (e.g., zooming in and/or zooming out the chart view). This method is particularly useful when the user is interacting with a portable device and/or a compact device with a smaller screen. The method reduces the cognitive burden on the user when adjusting chart magnification, thereby creating a more efficient human-machine interface. For battery-operated electronic devices, enabling a user to adjust magnification faster and more efficiently conserves power and increases the time between battery charges.

The device displays (2002) a first chart on the display. For example, FIG. 11A shows UI 1101 including a chart.

The chart has (2004) a horizontal axis and a vertical axis. For example, the chart in FIG. 11A has a vertical axis (Money) and a horizontal axis (Time).

The horizontal axis includes (2006) first horizontal scale markers. For example, the chart in FIG. 11A has a horizontal axis (Time) with Month markers (e.g., February and March).

The vertical axis includes (2008) first vertical scale markers. For example, the chart in FIG. 11A has a vertical axis (Money) with thousand dollar markers (e.g., $1,000 through $4,000).

The device detects (2010) a first touch input at a location on the touch-sensitive surface that corresponds to a location on the display of the chart. For example, FIG. 11A shows the device detecting contact 1110 at position 1110-a and contact 1120 at position 1120-a.

In some embodiments, the first touch input is (2012) a de-pinch gesture. For example, the movement of contacts 1110 and 1120 shown in FIGS. 11A and 11B represents a de-pinch gesture.

While detecting the first touch input, the device: horizontally expands (2014) a portion of the chart such that a distance between first horizontal scale markers increases; and maintains a vertical scale of the chart such that a distance between first vertical scale markers remains the same. For example, FIG. 11A shows UI 1101 including a chart with a vertical axis (Money) and a horizontal axis (Time). FIG. 11A also shows the device detecting contact 1110 at position 1110-a and contact 1120 at position 1120-a. FIG. 11B shows the device detecting contact 1110 at position 1110-b and contact 1120 at position 1120-b and also shows the distance between the horizontal markers (e.g., month markers) increasing while the distance between the vertical markers remains the same. In some embodiments, the method further includes detecting a second touch input; and, while detecting the second touch input: horizontally shrinking a portion of the chart such that a distance between first horizontal scale markers decreases; and maintaining a vertical scale of the chart such that a distance between first vertical scale markers remains the same. For example, FIG. 12B shows UI 1207 including a chart with a vertical axis (Money) and a horizontal axis (Time). FIG. 12B also shows the device detecting contact 1210 at position 1210-*b* and contact 1220 at position 1220-*b*. FIGS. 12C and 12D show the device detecting contact 1110 at positions 1210-*c* and 1210-*d* and contact 1220 at positions 1220-*c* and 1220-*d* respectively. FIGS. 12C and 12D also show the distance between the horizontal markers (e.g., hour markers) decreasing while the distance between the vertical markers remains the same. In some embodiments, the second touch input is a pinch gesture. For example, the movement of contacts 1210 and 1220 shown in FIGS. 12B-12D represents a pinch gesture. In some embodiments, the method further includes detecting a third touch input; and, while detecting the third touch input, adjusting the chart view and the horizontal axis of the chart corresponding to the third touch input. In some embodiments, the third touch input is a drag gesture and the method includes: detecting movement of a finger contact in the drag gesture across the touch-sensitive surface and adjusting the chart view and horizontal axis of the chart accordingly. For example, FIG. 15B shows UI 1503 including a chart with a first chart view. FIG. 15B also shows the device detecting contact 1510 at position 1510-*b*. FIG. 15C shows the device detecting contact 1510 at position 1510-*c* (to the left of position 1510-*b*). FIG. 15C also shows UI 1505 including a chart with a second chart view (e.g., shifted to the left compared to the first chart view).

In some embodiments, after horizontally expanding the portion of the chart and maintaining the vertical scale of the chart while detecting the first touch input, the device ceases (2016) to detect the first touch input. For example, FIG. 11B shows UI 1103 with a horizontally expanded portion of the chart shown in FIG. 11A. FIG. 11B also shows the device detecting contacts 1110 and 1120 and the vertical scale of the chart remaining the same as the scale shown in FIG. 11A.

In some embodiments, in response to ceasing to detect the first touch input (e.g., detecting lift off of the fingers in the first touch input), the device changes (2018) a vertical scale of the chart. In some embodiments, the vertical scale is adjusted so that all of the data marks are visible within a predefined margin. For example, in FIGS. 11C and 11D, the device ceases to detect contacts 1110 and 1120 and the vertical scale of the chart is adjusted such that the distance between the vertical markers increases.

In some embodiments, after horizontally expanding the portion of the chart such that the distance between first horizontal scale markers increases (2020), the device, while continuing to detect the first touch input: continues (2022) to horizontally expand a portion of the chart; displays second horizontal scale markers, the second horizontal scale markers being at a finer scale than the first horizontal scale markers; and continues to maintain the vertical scale of the chart. In some embodiments, the horizontal scale markers change from years to months, months to weeks, weeks to days, or days to hours, as shown in FIGS. 11A-11J. In other embodiments, the second scale markers are displayed in addition to the first scale markers. For example, the original first scale makers may be years, but when the horizontal scale is expanded, month scale markers are shown as well. For example, FIG. 11A shows a chart with horizontal markers denoting months. FIG. 11B shows a chart with horizontal markers denoting months and horizontal markers denoting days.

In some embodiments, after horizontally expanding the portion of the chart such that the distance between first horizontal scale markers increases (2024), the device, while continuing to detect the first touch input: continues (2026) to horizontally expand a portion of the chart; replaces a first set of displayed data marks with a second set of displayed data marks, where for at least some of the data marks in the first set of data marks, an individual data mark in the first set of data marks corresponds to a plurality of data marks in the second set of data marks; and continues to maintain the vertical scale of the chart. For example, FIG. 11A shows a chart including data marks 1102 (e.g., data mark 1102-1 and data mark 1102-3). FIG. 11B shows a chart including data marks 1102 (e.g., data mark 1102-1 and data mark 1102-3) and data marks 1104 (e.g., data mark 1104-1). In some embodiments, a single data mark (e.g., a circle, square, triangle, bar, or other representation of data points), displayed in the chart prior to horizontally expanding the chart, actually corresponds to a plurality of data points. In some embodiments, during horizontal expansion, a single data mark that corresponds to multiple data points is replaced by a plurality of data marks that correspond to the multiple data points. In some embodiments, the first set of data marks is replaced with the second set of data marks at the same time that the first horizontal scale marks are replaced with the second, finer horizontal scale marks. Thus, the data in a portion of the chart can be displayed at successively finer levels of granularity as a portion of the chart expands horizontally.

FIGS. 21A-21F illustrate how some embodiments allow scrolling through filter selections, with the data visualization updated immediately as the filter changes. These figures provide bar charts showing total sales for a three month period in 2014, and the data is filtered by region. In this example, the four regions are Central, East, South, and West.

Figure 21A:
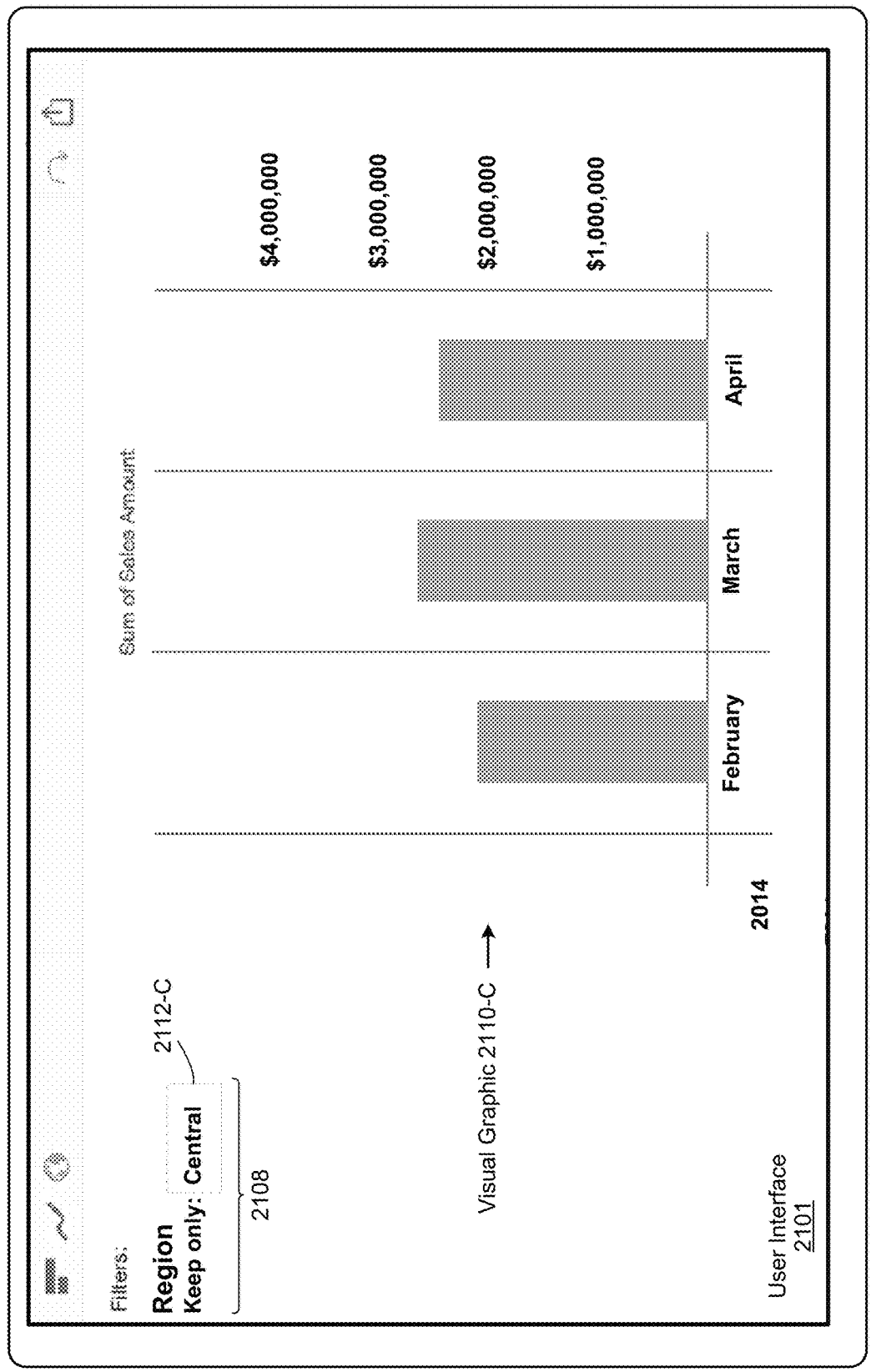
FIGS. 21A-21F illustrate scrolling filters in accordance with some embodiments.
Figure 21B:
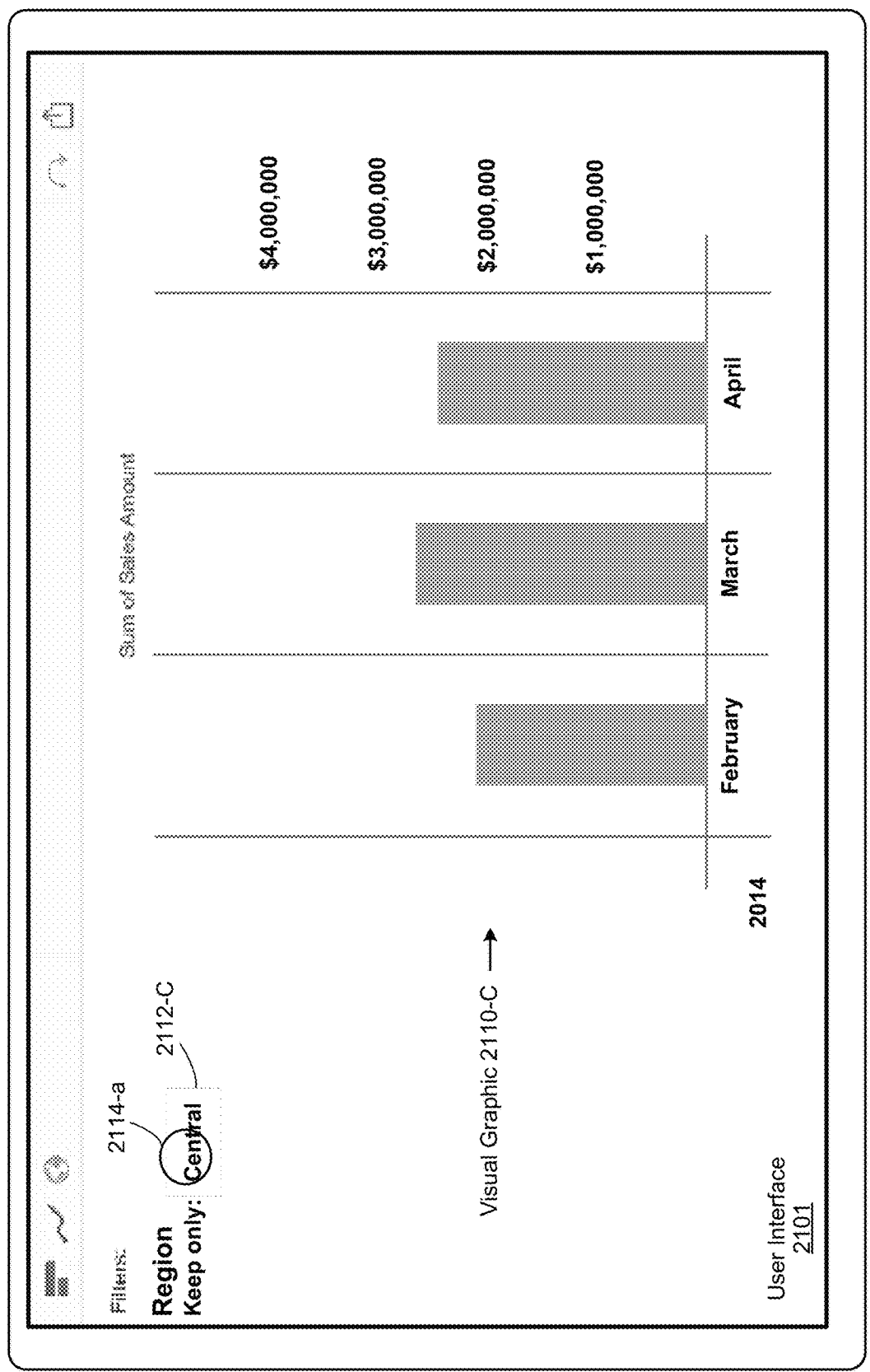

Initially, the user has filtered the data to display sales data for just the Central region, as shown in FIG. 21A. Filter indicia 2108 include a scrollable region indicator that indicates Central selection 2112-C. Corresponding to this filter selection, user interface 2101 displays visual graphic 2110-C, which shows data for the Central region. In FIG. 21B, the user wants to compare the Central region to the other regions, and the device detects contact 2114 at position 2114-*a* corresponding to Central selection 2112-C. At this time user interface 2101 still displays the visual graphic 2110-C for the Central region.

Figure 21C:
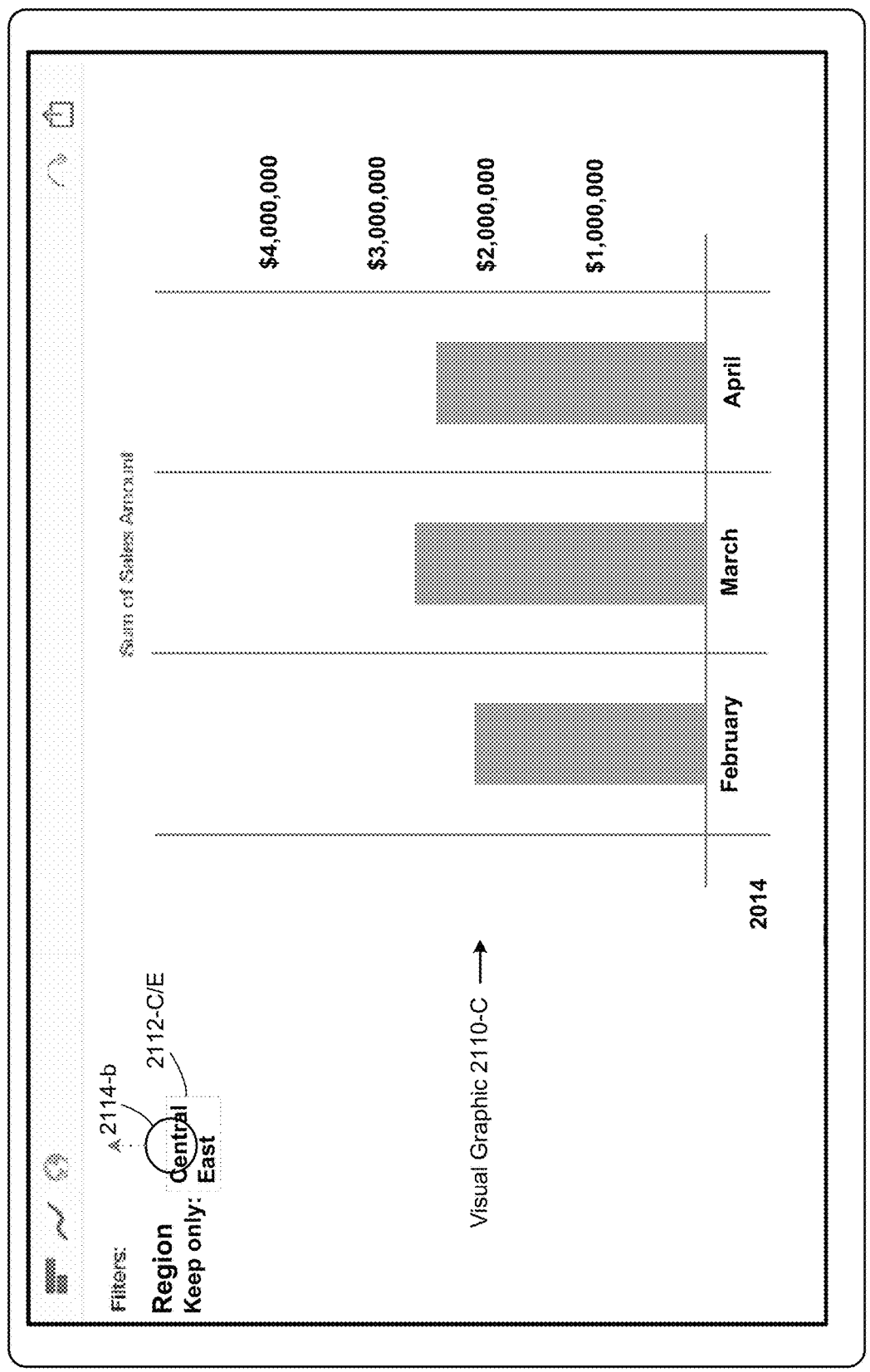
Figure 21D:
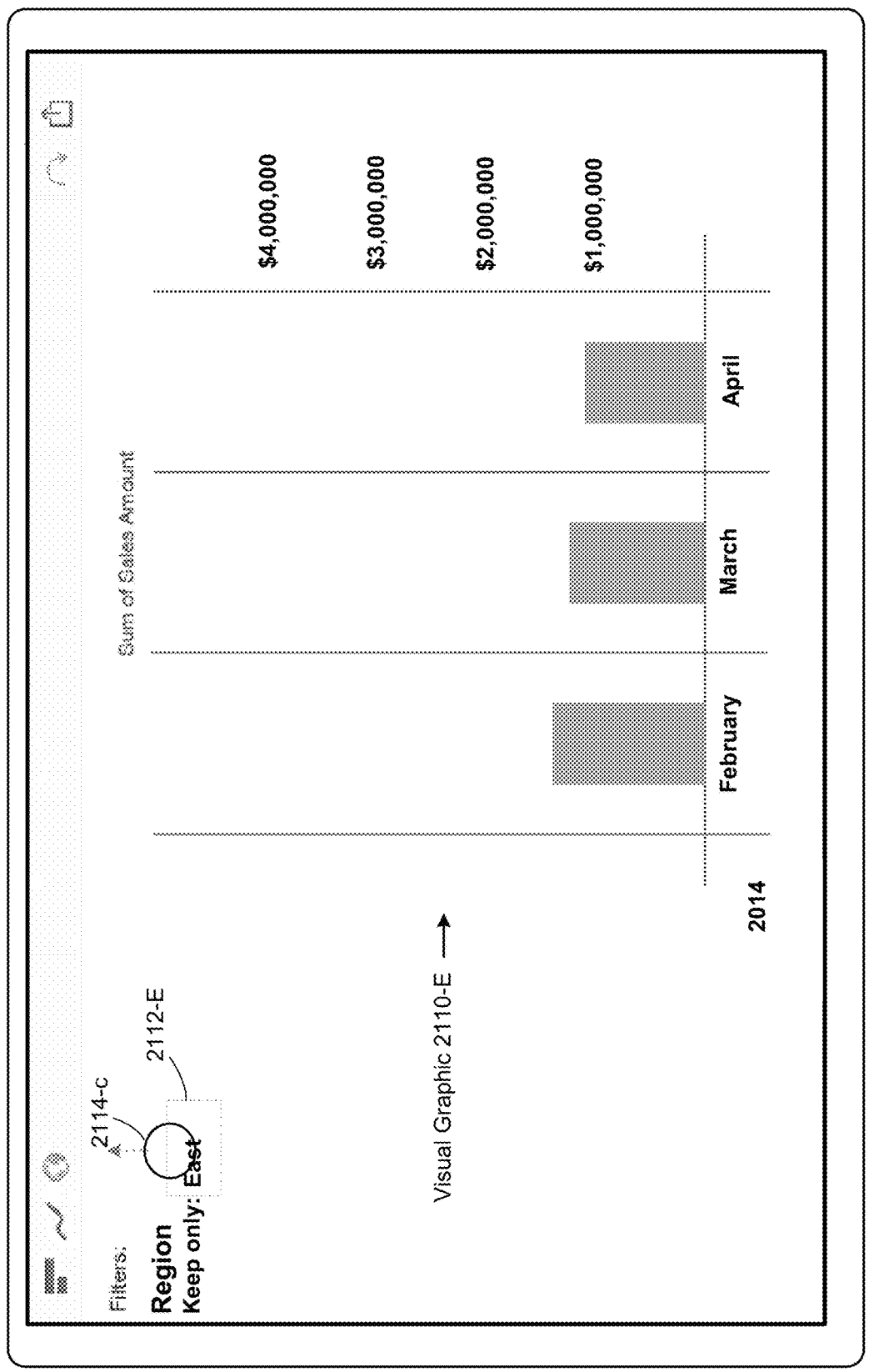
Figure 21E:
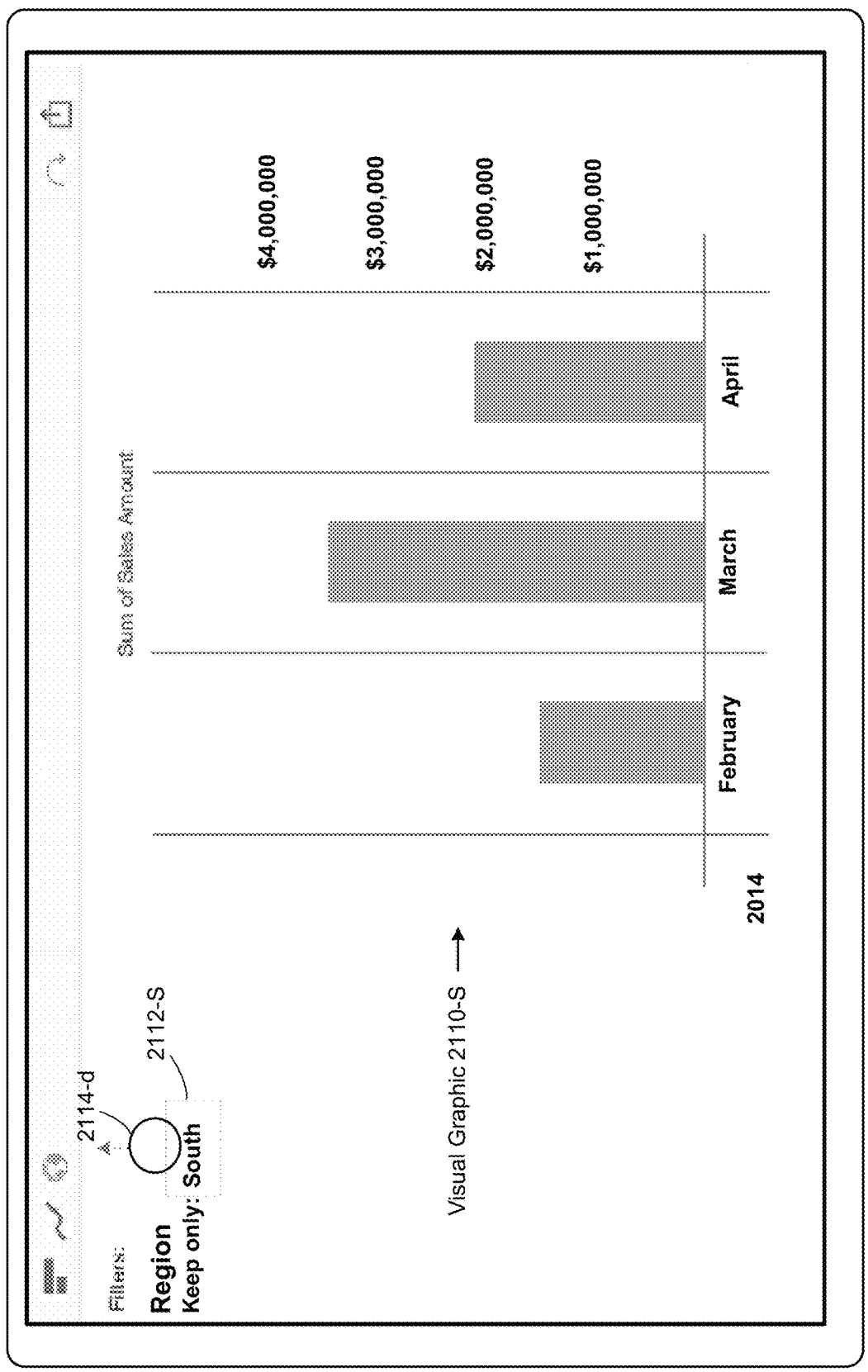

In FIG. 21C, the user has started scrolling upwards (e.g., using a swipe gesture), so contact 2114 is moving upwards to position 2114-*b*. At this time, the scrollable region indicator is transitioning from "Central" to "East," so selection 2112-C/E is in an interim state. Visual graphic 2110-C is still the graphic for the Central region. When the scrollable region indicator displays East selection 2112-E, as illustrated in FIG. 21D, visual graphic 2110-E, including data for the East region, is displayed. At this time, contact 2114 is still moving upwards to position 2114-*c*. As illustrated in FIG. 21E, contact 2114 has moved upward to position 2114-*d* and the indicator shows "South" region selection 2112-S. When the scrollable region indicator shows the South region, the user interface displays visual graphic 2110-S including data for the South region.

Figure 21F:
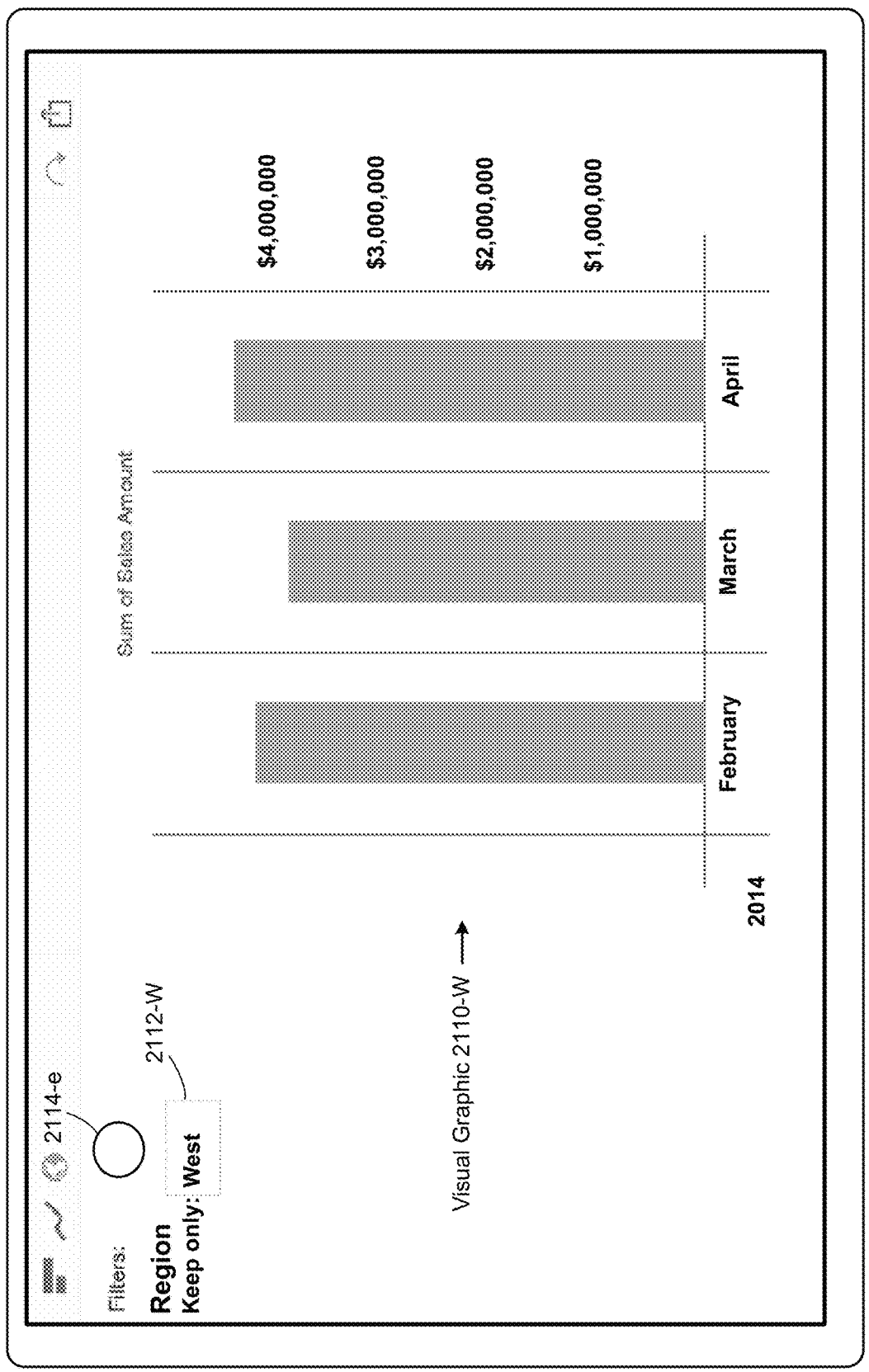

As illustrated in FIG. 21E, contact 2114 is still moving upwards to position 2114-*e*, so the scrollable region indicator comes to West region selection 2112-W, as illustrated in FIG. 21F. When this occurs, the user interface displays the data for the West region in visual graphic 2110-W.

As illustrated by FIGS. 21A-21F, a user can quickly scroll through filter values, and the visual graphic updates according to the filter as different filter values are selected. In some embodiments, the updates to the display depend on the scroll speed. For example, if the scrolling is performed slowly, the visual graphic is updated for each filter value as illustrated in FIGS. 21A-21F. On the other hand, if the values are scrolled quickly, a user is probably not interested in the intermediate values, and thus the visual graphic is not updated until the scrolling slows down or stops.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
   at an electronic device with a touch-sensitive surface and a display:
      displaying a chart on the display, wherein:
         the chart has a horizontal axis and a vertical axis;
         the horizontal axis includes first horizontal scale markers; and
         the vertical axis includes first vertical scale markers;
      detecting a first touch input at a location on the touch-sensitive surface that corresponds to a location on the display of the chart;
      while detecting the first touch input:
         horizontally expanding a portion of the chart such that a distance between first horizontal scale markers increases; and
         maintaining positions of the first vertical scale markers along the vertical axis;
      after horizontally expanding the portion of the chart and maintaining the positions of the first vertical scale markers while detecting the first touch input, ceasing to detect the first touch input; and,
      in response to ceasing to detect the first touch input, changing a vertical scale of the chart such that a distance between first vertical scale markers changes.

2. The method of claim 1, wherein the first touch input is a de-pinch gesture.

3. The method of claim 1, including, after horizontally expanding the portion of the chart such that the distance between first horizontal scale markers increases:
   while continuing to detect the first touch input:
      continuing to horizontally expand a portion of the chart;
      displaying second horizontal scale markers, the second horizontal scale markers being at a finer scale than the first horizontal scale markers; and
      continuing to maintain the positions of the first vertical scale markers.

4. The method of claim 1, including, after horizontally expanding the portion of the chart such that the distance between first horizontal scale markers increases:
   while continuing to detect the first touch input:
      continuing to horizontally expand a portion of the chart;
      replacing a first set of displayed data marks with a second set of displayed data marks, wherein for at least some of the data marks in the first set of data marks, an individual data mark in the first set of data marks corresponds to a plurality of data marks in the second set of data marks; and
      continuing to maintain the positions of the first vertical scale markers.

5. The method of claim 1, including:
   detecting a second touch input at a location on the touch-sensitive surface that corresponds to a location on the display of a portion of the chart that includes a first data mark; and
   in accordance with a determination that the first data mark corresponds to a single data record and the second touch input expands the chart horizontally, displaying a visual representation of the single data record, including information about the first data mark, wherein display of the visual representation of the single data record replaces display of the first data mark.

6. An electronic device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
      displaying a chart on the display, wherein:
         the chart has a horizontal axis and a vertical axis;
         the horizontal axis includes first horizontal scale markers; and
         the vertical axis includes first vertical scale markers;

detecting a first touch input at a location on the touch-sensitive surface that corresponds to a location on the display of the chart;
while detecting the first touch input:
horizontally expanding a portion of the chart such that a distance between first horizontal scale markers increases; and
maintaining positions of the first vertical scale markers along the vertical axis;
after horizontally expanding the portion of the chart and maintaining the positions of the first vertical scale markers while detecting the first touch input, ceasing to detect the first touch input; and,
in response to ceasing to detect the first touch input, changing a vertical scale of the chart such that a distance between first vertical scale markers changes.

7. The device of claim 6, wherein the first touch input is a de-pinch gesture.

8. The device of claim 6, the one or more programs further including instructions for, after horizontally expanding the portion of the chart such that the distance between first horizontal scale markers increases:
while continuing to detect the first touch input:
continuing to horizontally expand a portion of the chart;
displaying second horizontal scale markers, the second horizontal scale markers being at a finer scale than the first horizontal scale markers; and
continuing to maintain the positions of the first vertical scale markers.

9. The device of claim 6, the one or more programs further including instructions for, after horizontally expanding the portion of the chart such that the distance between first horizontal scale markers increases:
while continuing to detect the first touch input:
continuing to horizontally expand a portion of the chart;
replacing a first set of displayed data marks with a second set of displayed data marks, wherein for at least some of the data marks in the first set of data marks, an individual data mark in the first set of data marks corresponds to a plurality of data marks in the second set of data marks; and
continuing to maintain the positions of the first vertical scale markers.

10. The device of claim 6, the one or more programs further including instructions for:
detecting a second touch input at a location on the touch-sensitive surface that corresponds to a location on the display of a portion of the chart that includes a first data mark; and
in accordance with a determination that the first data mark corresponds to a single data record and the second touch input expands the chart horizontally, displaying a visual representation of the single data record, including information about the first data mark, wherein display of the visual representation of the single data record replaces display of the first data mark.

11. A non-transitory computer readable storage medium storing one or more programs, the one or more programs comprising instructions, which when executed by an electronic device with a display, and a touch-sensitive surface, cause the device to:
display a chart on the display, wherein:
the chart has a horizontal axis and a vertical axis;
the horizontal axis includes first horizontal scale markers; and
the vertical axis includes first vertical scale markers;
detect a first touch input at a location on the touch-sensitive surface that corresponds to a location on the display of the chart;
while detecting the first touch input:
horizontally expand a portion of the chart such that a distance between first horizontal scale markers increases; and
maintain positions of the first vertical scale markers along the vertical axis;
after horizontally expanding the portion of the chart and maintaining the positions of the first vertical scale markers while detecting the first touch input, cease to detect the first touch input; and,
in response to ceasing to detect the first touch input, change a vertical scale of the chart such that a distance between first vertical scale markers changes.

12. The storage medium of claim 11, wherein the first touch input is a de-pinch gesture.

13. The storage medium of claim 11, the one or more programs further including instructions for, after horizontally expanding the portion of the chart such that the distance between first horizontal scale markers increases:
while continuing to detect the first touch input:
continuing to horizontally expand a portion of the chart;
displaying second horizontal scale markers, the second horizontal scale markers being at a finer scale than the first horizontal scale markers; and
continuing to maintain the positions of the first vertical scale markers.

14. The storage medium of claim 11, the one or more programs further including instructions for, after horizontally expanding the portion of the chart such that the distance between first horizontal scale markers increases:
while continuing to detect the first touch input:
continuing to horizontally expand a portion of the chart;
replacing a first set of displayed data marks with a second set of displayed data marks, wherein for at least some of the data marks in the first set of data marks, an individual data mark in the first set of data marks corresponds to a plurality of data marks in the second set of data marks; and
continuing to maintain the positions of the first vertical scale markers.

15. The storage medium of claim 11, the one or more programs further including instructions for:
detecting a second touch input at a location on the touch-sensitive surface that corresponds to a location on the display of a portion of the chart that includes a first data mark; and
in accordance with a determination that the first data mark corresponds to a single data record and the second touch input expands the chart horizontally, displaying a visual representation of the single data record, including information about the first data mark, wherein display of the visual representation of the single data record replaces display of the first data mark.

* * * * *